(12) United States Patent
Akiyama et al.

(10) Patent No.: US 6,522,475 B2
(45) Date of Patent: *Feb. 18, 2003

(54) ZOOM LENS

(75) Inventors: Takeshi Akiyama, Yokohama (JP); Norihiro Nanba, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,934

(22) Filed: Feb. 11, 1997

(65) Prior Publication Data

US 2003/0007255 A1 Jan. 9, 2003

(30) Foreign Application Priority Data

| Feb. 15, 1996 | (JP) | ............................................. 8-054276 |
| Jul. 8, 1996 | (JP) | ............................................. 8-197061 |

(51) Int. Cl.⁷ ............................................. G02B 15/14
(52) U.S. Cl. ........................ 359/676; 359/729; 359/731; 359/733
(58) Field of Search ................................ 359/676–690, 359/727–736, 834, 850, 857–859, 668, 831, 832–833, 835–837

(56) References Cited

U.S. PATENT DOCUMENTS

| 3,674,334 A | | 7/1972 | Offner | 359/366 |
| 3,677,621 A | * | 7/1972 | Smith | 359/487 |
| 3,897,133 A | * | 7/1975 | Warner et al. | 359/730 |
| 4,249,793 A | * | 2/1981 | Uehara | 359/726 |
| 4,265,510 A | | 5/1981 | Cook | 359/366 |
| 4,443,068 A | * | 4/1984 | Itoh | 359/676 |
| 4,477,156 A | | 10/1984 | Gebelein et al. | 359/364 |
| 4,571,036 A | | 2/1986 | Gebelein et al. | 359/364 |
| 4,737,021 A | | 4/1988 | Korsch | 359/366 |
| 4,775,217 A | | 10/1988 | Ellis | 313/524 |
| 4,812,030 A | | 3/1989 | Pinson | 359/859 |
| 4,993,818 A | | 2/1991 | Cook | 359/366 |
| 5,034,764 A | | 7/1991 | Inabata | 354/223 |

(List continued on next page.)

FOREIGN PATENT DOCUMENTS

| EP | 0 722 106 | 7/1996 |
| EP | 0 730 180 | 9/1996 |
| JP | 2-297516 | 12/1990 |
| JP | 5-12704 | 1/1993 |
| JP | 6-139612 | 5/1994 |
| WO | WO 92/21054 | 11/1992 |

*Primary Examiner*—Jordan M. Schwartz
(74) *Attorney, Agent, or Firm*—Fitzpatrick, Cella, Harper & Scinto

(57) ABSTRACT

A zoom optical system comprises a plurality of optical elements. The plurality of optical elements include a first optical element having two refracting surfaces and a plurality of reflecting surfaces formed in a transparent body, being arranged such that a light beam enters an inside of the transparent body from one of the two refracting surfaces and, after being successively reflected from the plurality of reflecting surfaces, exits from the other of the two refracting surfaces, and/or a second optical element having a plurality of surface mirrors integrally formed and decentered relative to one another, being arranged such that an incident light beam exits therefrom after being successively reflected from reflecting surfaces of the plurality of surface mirrors, and a third optical element composed of a plurality of coaxial refracting surfaces. In the zoom optical system, an image of an object is formed through the plurality of optical elements, and zooming is effected by varying relative positions of at least two optical elements of the plurality of optical elements.

19 Claims, 41 Drawing Sheets

U.S. PATENT DOCUMENTS

| | | | |
|---|---|---|---|
| 5,063,586 A | | 11/1991 | Jewell et al. ................. 378/34 |
| 5,231,534 A | * | 7/1993 | Kato .......................... 359/689 |
| 5,309,278 A | * | 5/1994 | Ito et al. ..................... 359/740 |
| 5,381,265 A | * | 1/1995 | Oshita ........................ 359/689 |
| 5,453,877 A | | 9/1995 | Gerbe et al. ................ 359/633 |
| 5,557,454 A | * | 9/1996 | Takahashi ................... 359/378 |
| 5,640,632 A | * | 6/1997 | Koyama et al. ............ 396/382 |
| 5,701,202 A | * | 12/1997 | Takahashi ................... 359/631 |
| 5,739,956 A | * | 4/1998 | Ohtake ....................... 359/730 |
| 2001/0048552 A1 | * | 12/2001 | Koyama et al. ............ 359/431 |

* cited by examiner

MIDDLE POSITION (VERTICAL ANGLE OF VIEW, HORIZONTAL ANGLE OF VIEW)

(VERTICAL ANGLE OF VIEW, HORIZONTAL ANGLE OF VIEW)

ZOOM LENS

BACKGROUND OF THE INVENTION

1. Field of the Invention

This invention relates to zoom optical systems and an image pickup apparatus using the same and, more particularly, to an optical system which comprises a plurality of optical elements of two types, one of which has a plurality of reflecting surfaces and the other of which has refracting surfaces alone, wherein, of the plurality of optical elements, at least two optical elements move in differential relation to effect zooming (to vary magnification). Still more particularly, this invention relates to zoom optical systems suited to be used in video cameras, still video cameras or copying machines.

2. Description of Related Art

The zoom optical systems for the image pickup apparatus have been known as constructed with refracting elements or lenses alone. These lenses are of the spherical or aspheric form of revolution symmetry and arranged on a common optical axis so that their surfaces take revolution symmetry with respect to the optical axis.

In the field of art of photographic objectives, there have been many previous proposals for utilizing reflecting surfaces such as convex or concave mirrors. It has been also known to provide an optical system which makes use of a reflecting system and a refracting system in conjunction. This optical system is well known as the catadioptric system.

FIG. 23 is a schematic diagram of an optical system composed of one concave mirror and one convex mirror, or so-called mirror optical system.

In the mirror optical system shown in FIG. 23, an axial light beam 104 coming from an object is reflected by the concave mirror 101. While being converged, the light beam 104 goes toward the object side. After having been reflected by the convex mirror 102, the light beam 104 forms an image on an image plane 103.

This mirror optical system is based on the configuration of the Cassegrain type of reflecting telescope. The aim of adopting it is to shorten the total length of the entire optical system compared with the long physical length of the refracting telescope, as the optical path is folded by using two reflecting mirrors as arranged in opposed relation.

Even for the objective lens system constituting part of the telescope, for the same reason, the Cassegrain type and many other types have come to be known which differ in the number and the construction and arrangement of reflecting mirrors in order to ever more shorten the total length of the entire system.

Up to now, effort has been made to shorten the total length of the photographic lens as it is usually unduly long. For this purpose, instead of some of its lens elements, mirrors are used to efficiently fold up the optical path. A compact optical system of mirror type is thus obtained.

In the Cassegrain type reflecting telescopes or like mirror optical systems, however, the use of the convex mirror 102 leads, in general case, to a problem that the object light beam 104 is shaded in part. This is attributable to the fact that the back of the convex mirror 102 lies within the domain of passage of the object light beam 104.

To solve this problem, the mirror may be decentered, thus permitting the domain of passage of the object light beam 104 to be cleared of the obstruction of the other parts of the optical system. In other words, the principal ray 106 of the object light beam 104 is set off from an optical axis 105. Such a mirror optical system, too, has previously been proposed.

FIG. 24 is a schematic diagram of a mirror optical system disclosed in U.S. Pat. No. 3,674,334, which has solved the above-described problem of shading in such a way that the mirrors of revolution symmetry with respect to the optical axis are cut off in part.

The mirror optical system shown in FIG. 24 comprises, in the order in which the light beam encounters, a concave mirror 111, a convex mirror 113 and a concave mirror 112. In the prototype design, these are of the forms shown by the double-dots and single-dash lines, or of revolution symmetry with respect to the optical axis 114. In actual practice, the concave mirror 111 is used in only the upper half on the paper of the optical axis 114, the convex mirror 113 in only the lower half and the concave mirror 112 in only a lower marginal portion, thereby bringing a principal ray 116 of the object light beam 115 away from the optical axis 114. The optical system is thus made free from the shading of the object light beam 115.

FIG. 25 is a schematic diagram of another mirror optical system disclosed in U.S. Pat. No. 5,063,586. In this mirror optical system, the mirrors are so arranged that their central axes set themselves off the optical axis of the system. By this arrangement, a principal ray of the object light beam is dislocated from the optical axis, thus solving the above-described problem.

In FIG. 25, an object to be photographed lies in a plane 121. Assuming that a line perpendicular to the plane 121 is an optical axis 127, it is found that, as the light beam encounters a convex mirror 122, a concave mirror 123, a convex mirror 124 and a concave mirror 125 successively in this order, the centers of area of their reflecting surfaces and their central axes (the lines connecting those centers with the respective centers of curvature of these reflecting surfaces) 122a, 123a, 124a and 125a are decentered from the optical axis 127. In FIG. 25, the amounts of decentering of such parameters and the radii of curvature of all the surfaces are appropriately determined to prevent the object light beam 128 from being shaded by the back of any one of the mirrors. An object image is thus formed on a focal plane 126 with high efficiency.

In addition, U.S. Pat. Nos. 4,737,021 and 4,265,510 even disclose similar systems freed from the shading effect either by using partial mirrors of revolution symmetry with respect to the optical axis or by arranging the central axes themselves of the mirrors in decentered relation from the optical axis.

Meanwhile, the catadioptric optical system using both of reflecting mirrors and refracting lenses can be made to have the function of varying the image magnification. As an example of this optical system, mention may be made of deep sky telescopes disclosed in, for example, U.S. Pat. Nos. 4,477,156 and 4,571,036, in which the image magnification is made variable by using a parabolic mirror in the main mirror in conjunction with the Erfle eye-piece.

It is also known to provide another zooming technique which moves two mirrors constituting part of the above-described mirror optical system in differential relation. By this technique, the image magnification (or focal length) of the optical system for photography is made variable.

For example, U.S. Pat. No. 4,812,030 discloses application of such a zooming technique to the Cassegrain type reflecting telescope shown in FIG. 23, wherein the separation from the concave mirror 101 to the convex mirror 102 and the separation from the convex mirror 102 to the image plane 103 are made variable relative to each other. Thus, a mirror optical system for photography capable of zooming is obtained.

FIG. 26 shows another example of an application disclosed in the above U.S. Pat. No. 4,812,030. Referring to FIG. 26, a light beam 138 from an object encounters a first concave mirror 131 and is reflected from its surface, becoming a converging light beam. The converging light beam goes toward the object side, and encounters a first convex mirror 132. Here, the light beam is reflected toward the image side, becoming an almost parallel light beam. The almost parallel light beam goes to a second convex mirror 134 and is reflected therefrom, becoming a diverging light beam. The diverging light beam encounters a concave mirror 135. Here, the light beam is reflected and becomes a converging light beam, focusing an image on an image plane 137.

In this optical system, the separation between the first concave mirror 131 and the first convex mirror 132 is made to vary, while the separation between the second convex mirror 134 and the second concave mirror 135 is made to vary simultaneously, so as to effect zooming. The focal length of the entirety of the mirror optical system is thus made variable.

Also, in U.S. Pat. No. 4,993,818, an image formed by the Cassegrain reflecting telescope shown in FIG. 23 is then re-focused by another mirror optical system provided in the rear stage, thereby forming a secondary image. The magnifying power of the mirror optical system for forming the secondary image is made variable. By this arrangement, the photographic system as a whole is provided with the capability of varying the image magnification.

These reflecting optical systems for photography have a great number of constituent parts. To obtain the required optical performance, it is necessary to increase the accuracy with which to set up the individual optical parts. In particular, because the positioning tolerance for the mirrors is severe, it is indispensable to adjust the position and angle of each mirror.

To solve this problem, a method has been proposed, for example, to construct the mirror system in the form of one block, thus avoiding an error from occurring when the optical parts are set up.

Heretofore, what are known as such a block having a large number of reflecting surfaces therein are, for example, optical prisms such as pentagonal roof prisms or Porroprisms used in the viewfinder systems.

For these prisms, a plurality of reflecting surfaces are unified by the molding techniques. All these reflecting surfaces are, therefore, made up under the control of their relative positions with high accuracy, thus obviating the necessity of doing later adjustment of the relative positions of the assembled reflecting surface to one another. However, the main function of these prisms is to change the direction in which light advances for the purpose of inverting the image. Every reflecting surface has, therefore, to take the plane form.

On the other hand, there is also known an optical system in which curvature is imparted to the reflecting surface of the prism.

FIG. 27 is a schematic diagram showing the main parts of an observing optical system disclosed in U.S. Pat. No. 4,775,217. This observing optical system is used for observing the external field or landscape and, at the same time, presenting an information display of data and icons in overlapping relation on the landscape.

The rays of light 145 radiating from an information display body 141 are reflected from a surface 142, going to the object side until they encounter a half-mirror 143 of concave form. After having been reflected from the half-mirror 143, the light rays 145 become nearly parallel by the refractive power of the concave surface 143, and pass through the surface 142, reaching the eye 144 of the observer. So, the observer views an enlarged virtual image of the displayed data or icons.

Meanwhile, a light beam 146 from an object enters at a surface 147 which is nearly parallel with the reflecting surface 142, and is refracted there, arriving at the concave half-mirror surface 143. Since this surface 143 is coated with a half-permeable layer by the vacuum evaporation technique, part of the light beam 146 passes through the concave surface 143 and is refracted in transmitting the surface 142, entering the pupil 144 of the observer. So, the observer views the display image in overlapping relation on the external field or landscape.

FIG. 28 is a schematic diagram showing the main parts of another observing optical system disclosed in Japanese Laid-Open Patent Application No. Hei 2-297516. This observing optical system, too, is used for viewing the external field or landscape and, at the same time, looking the information on the display device as overlapping the view.

In this observing optical system, a light beam 154 from an information display body 150 enters a prism Pa at a flat surface 157 and is made incident on a parabolic reflecting surface 151. Being reflected from this surface 151, the light beam 154 converges and forms an image on a focal plane 156. During this time, the light beam 154 for display undergoes total reflection from the successive two parallel planes constituting part of the prism Pa, reaching the focal plane 156. By this arrangement, thinning of the optical system as a whole is achieved.

The display light beam 154 that has exited as a diverging beam from the focal plane 156 then proceeds while undergoing total reflection between the flat surfaces 157 and 158, until it encounters a half-mirror surface 152 of parabolic form. The light beam 154 is reflected from the half-mirror surface 152 and, at the same time, forms an enlarged virtual image of the display by its refractive power, becoming a nearly parallel beam. After having passed through the surface 157, the light beam 154 enters the pupil 153 of the observer. Thus, the observer looks at the display image on the background of the external field or landscape.

Meanwhile, an object light beam 155 from the external field passes through a flat surface 158b constituting a prism Pb, then passes through the parabolic half-mirror surface 152 and exits from the surface 157, reaching the eye 153 of the observer. So, the observer views the external field or landscape with the display image overlapping thereon.

Further, an optical element can be used on the reflecting surface of a prism. This is exemplified as an optical head for photo-pickup disclosed in, for example, Japanese Laid-Open Patent Applications Nos. Hei 5-12704 and Hei 6-139612. Such a head receives the light from a semiconductor laser, then reflects it from the Fresnel surface or hologram surface to form an image on a disk, and then conducts the reflected light from the disk to a detector.

The conventional optical system of the type which has refractive optical elements alone puts the stop inside thereof. In many cases, the entrance pupil lies deep in the optical system. The longer the separation between the stop and the entrance surface at the frontmost position, the larger the ray effective diameter of that entrance surface becomes. Further, there is a problem that, as the angle of view increases, the ray effective diameter of that entrance surface increases even more greatly.

The optical systems of the mirror type disclosed in the above U.S. Pat. Nos. 3,674,334, 5,063,586 and 4,265,510 have a common feature that all the reflecting mirrors are made decentered by respective different amounts of decentering. Hence, the mounting mechanism for the reflecting mirrors becomes very elaborate in structure. It is also very difficult to secure the setup tolerance.

The photographic optical systems having the zooming function disclosed in U.S. Pat. Nos. 4,812,030 and 4,993,818, too, have, in any case, a large number of constituent parts such as mirrors and lens elements for forming an image. To obtain satisfactory optical performance, therefore, it is necessary to set up all the optical parts in relation to one another with high accuracy.

Particularly for the reflecting mirrors, the tolerance for the relative position becomes severe. Therefore, it is also necessary to accurately adjust the position and orientation of each of the reflecting mirrors.

It should be also noted that the conventional reflecting type photographic optical systems are adapted for application to the so-called telephoto type of lens systems as this type has a long total length and a small field angle. To attain a photographic optical system which necessitates the field angles of from the standard lens to the wide-angle lens, because an increasing number of reflecting surfaces for correcting aberrations is required to be used, the parts must be manufactured to even higher precision accuracy and assembled with even severer a tolerance. Therefore, the production cost has to be sacrificed. Otherwise, the size of the entire system tends to increase greatly.

Also, the observing optical systems disclosed in the above U.S. Pat. No. 4,775,217 and Japanese Laid-Open Patent Application No. Hei 2-297516 each have an aim chiefly to produce the pupil image forming function such that, as the information display is positioned remotely of the observer's eye, the light is conducted with high efficiency to the pupil of the observer. Another chief aim is to change the direction in which light advances. Concerning the positive use of the curvature-imparted reflecting surface in correcting aberrations, therefore, no technical ideas are directly disclosed.

Also, the optical systems for photo-pickup disclosed in the above Japanese Laid-Open Patent Applications Nos. Hei 5-12704 and Hei 6-139612 each limit its use to a detecting optical system. Therefore, these systems are unable to satisfy the imaging performance for photographic optical systems and particularly image pickup apparatus using a CCD or like area type image sensor.

BRIEF SUMMARY OF THE INVENTION

It is an object of the invention to provide a zoom optical system and an image pickup apparatus using the same, wherein there are provided a plurality of optical elements which are constituted by an optical element in which a plurality of curved or flat reflecting surfaces are formed and an optical element composed only of coaxial refracting surfaces, and relative positions of at least two optical elements of the plurality of optical elements are varied to effect zooming, so that the zoom optical system as a whole is minimized in bulk and size, and, at the same time, the accuracy with which the reflecting surfaces are set up (or the assembling tolerance) that greatly affects the performance little differs from item to item.

Further, a stop is disposed either on the object side of the zoom optical system or adjacent to a light entrance surface at which a light beam first enters, and an object image is formed at least once within the zoom optical system. By this arrangement, despite the zoom optical system having a wide angular field, the effective diameter of every one of the optical elements is shortened. Moreover, a plurality of reflecting surfaces constituting the optical element are given appropriate refractive powers. At the same time, these reflecting surfaces are arranged in decentering relation to thereby fold the optical path in the zoom optical system to a desired shape without causing shading of a light beam within the zoom optical system. It is, therefore, another object of the invention to provide a zoom optical system of shortened total length in a certain direction and an image pickup apparatus using the same.

To attain the above objects, in accordance with one aspect of the invention, there is provided a zoom optical system, which comprises a plurality of optical elements including a first optical element having two refracting surfaces and a plurality of reflecting surfaces formed in a transparent body, being arranged such that a light beam enters an inside of the transparent body from one of the two refracting surfaces and, after being successively reflected from the plurality of reflecting surfaces, exits from the other of the two refracting surfaces, and/or a second optical element having a plurality of surface mirrors integrally formed and decentered relative to one another, being arranged such that an incident light beam exits therefrom after being successively reflected from reflecting surfaces of the plurality of surface mirrors, and a third optical element composed of a plurality of coaxial refracting surfaces, wherein an image of an object is formed through the plurality of optical elements, and zooming is effected by varying relative positions of at least two optical elements of the plurality of optical elements.

Of the other features, especial ones are as follows.

A stop is disposed on a light entrance side of the zoom optical system, or adjacent to a light entrance surface at which a light beam first enters.

Each of the at least two optical elements of which relative positions are varied has an entering reference axis and an exiting reference axis in parallel to each other.

The at least two optical elements of which relative positions are varied move on one movement plane in parallel to each other.

Each of the at least two optical elements of which relative positions are varied has an entering reference axis and an exiting reference axis oriented to the same direction.

One of the at least two optical elements of which relative positions are varied has an entering reference axis and an exiting reference axis oriented to the same direction, and another of the at least two optical elements of which relative positions are varied has an entering reference axis and an exiting reference axis oriented to opposite directions.

Each of the at least two optical elements of which relative positions are varied has an entering reference axis and an exiting reference axis oriented to opposite directions.

Focusing is effected by moving one of the at least two optical elements of which relative positions are varied.

Focusing is effected by moving an optical element other than the at least two optical elements of which relative positions are varied.

The zoom optical system forms at least once an object image at an intermediate point in an optical path thereof.

Of the plurality of reflecting surfaces, curved reflecting surfaces are all formed to anamorphic shapes.

All reference axes of the at least two optical elements of which relative positions are varied lie on one plane.

At least a part of reference axes of an optical element other than the at least two optical elements of which relative positions are varied lie on the one plane.

At least one optical element of the plurality of optical elements has a reflecting surface in which a normal line on the reflecting surface at an intersection point of a reference axis with the reflecting surface is inclined with respect to a movement plane on which the at least two optical elements of which relative positions are varied move.

These and further objects and features of the invention will become apparent from the following detailed description of the preferred embodiments thereof taken in conjunction with the accompanying drawings.

DETAILED DESCRIPTION OF THE INVENTION

Before describing the embodiments of the invention, the way of expressing the various dimensions of the structure and the common features of all the embodiments are described below.

Figure 5:
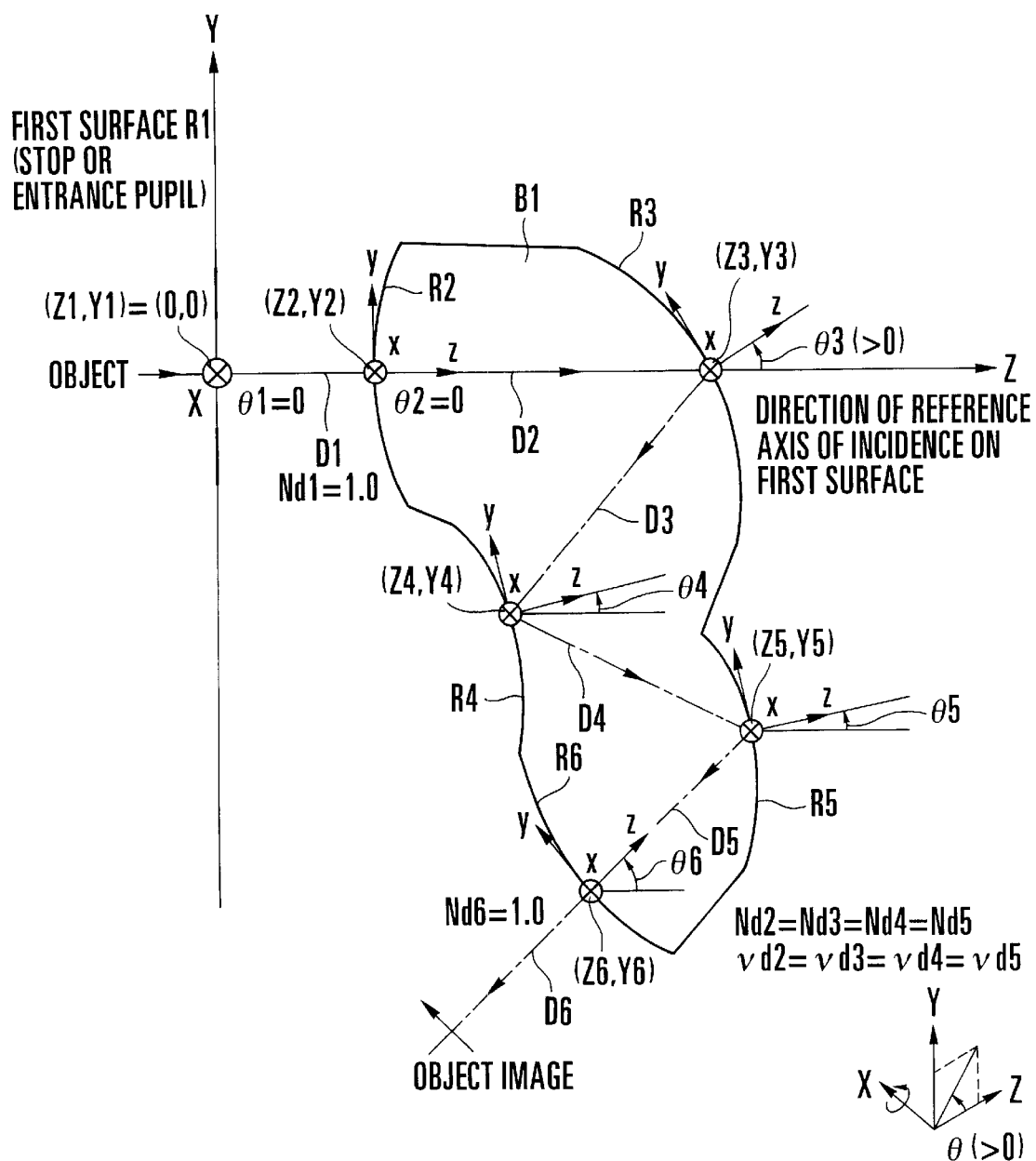
FIG. 5 is a diagram of geometry for explaining the coordinate systems in the embodiments of the invention.

FIG. 5 is a diagram taken to explain a coordinate system by which to define the design parameters for the optical system of the invention. In the embodiments of the invention, the surfaces are numbered consecutively along a ray of light (shown by single-dot and dash lines in FIG. 5) advancing from the object side to the image plane. This ray of light will be called the "reference axis ray", and the i-th surface will be expressed by Ri.

In FIG. 5, the first surface R1 is a stop, the second surface R2 is a refracting surface coaxial to the first surface R1, the third surface R3 is a reflecting surface tilted relative to the second surface R2, the fourth surface R4 and the fifth surface R5 each are a reflecting surface shifted and tilted relative to the respective preceding surface, and the sixth surface R6 is a refracting surface shifted and tilted relative to the fifth surface R5. All of the second to sixth surfaces R2 to R6 are constructed on a common substrate of glass, plastic or like material to form an optical element (optical member). This is a first optical element and, in FIG. 5, indicated by B1.

In the construction and arrangement of FIG. 5, therefore, the medium from an object plane (not shown) to the second surface R2 is air. The spaces between the successive two of the second surface R2 through the sixth surface R6 are filled with a common medium of certain material. The medium between the sixth surface R6 and a seventh surface R7 (not shown) is air.

Since the optical system of the invention is a decentering one, its constituent surfaces have no common optical axis. Accordingly, for the embodiments of the invention, the first surface R1 is taken to set up an absolute coordinate system. The original point is put at the vertex of the first surface R1 which coincides with the center of diameter of a light beam.

A light ray from the original point passes through the optical element B1, reaching the center of area of a plane on which to form the last image. The path of this ray is defined as a reference axis of the optical system. Further, in the embodiments of the invention, the reference axis has directional factors (orientations). The orientation is taken as positive when it coincides with the direction in which the ray for the reference axis advances to the image plane.

Although the embodiments of the invention will be specified by reference to such an axis, it is to be noted that the choice of an axis to be used may otherwise be made on consideration of what reference is most favorable to the optical design, the balance of corrected aberrations, or the expression of the shapes of all the constituent surfaces of the optical system. However, it is generally that the path of a ray which arrives at the center of area of the image plane and passes through any one of the center of the stop, or the entrance pupil, or the exit pupil, or the first surface of the optical system and the center of the last surface, is employed as the reference axis for the optical system.

That is, in the embodiments of the invention, determination of the reference axis is made in the steps of selecting a ray which crosses the first surface, or the stop plane, at the center of effective diameter of the light beam and is to arrive at the center of an area of the plane on which to form the final image, (or the reference axis ray) and tracing the path to which it is refracted or reflected by or from every one of the refracting and reflecting surfaces. All the surfaces are numbered consecutively as such a ray for the reference axis undergoes successive refractions and reflections.

The reference axis changes its direction, as the selected one of the surfaces changes its number, according to the law of refraction or reflection, finally reaching the center of the image plane.

In every one of the embodiments of the invention, the optical system includes tilted surfaces. The tilting is done as a rule in one and the same plane. So, the axes of the absolute coordinate system are defined as follows.

Z axis: the reference axis passing the original point and going to the second surface R2;

Y axis: a line passing the original point and making an angle of 90° with the Z axis counterclockwise in the tilt plane (in the paper of FIG. 5); and X axis: a line passing the original point and perpendicular to each of the Z and Y axes (the normal of the paper of FIG. 5).

For the other surfaces than the first one, the absolute coordinate system is not suitable for expressing their shapes. To allow the shape of the i-th surface to be recognized at a glance, it is better to make use of a local coordinate system whose original point is taken at the point of intersection of the reference axis with the i-th surface. In the specific embodiments of the invention, therefore, the numerical data of the design parameters for the i-th surface are given by using the local coordinate system.

The tilted angle of the i-th surface in the YZ plane is expressed by θi (in units of degree), the counterclockwise direction from the Z axis of the absolute coordinate system being taken as positive. In the embodiments of the invention, therefore, the original point of the local coordinate system for each surface lies on the YZ plane in FIG. 5. It should be also noted that any surfaces are not decentered in the XZ and XY planes. Further, the y and z axes of the local coordinate system (x,y,z) for the i-th surface are inclined to the absolute coordinate system (X,Y,Z) by θi in the YZ plane. So these axes are defined as follows:

z axis: the line passing the original point of the local coordinates and making an angle ei with the Z direction of the absolute coordinate system counter-clockwise in the YZ plane;

y axis: the line passing the original point of the local coordinates and making an angle of 90° with the z direction counterclockwise in the YZ plane; and x axis: the line passing the original point of the local coordinates and perpendicular to the YZ plane.

Di is in the scaler quantity, representing the separation between the original points of the local coordinates for the i-th and (i+1)st surfaces, and Ndi and vdi are respectively the refractive index and Abbe number of the medium between the i-th and (i+l)st surfaces.

Another feature of the embodiments of the invention is that the optical system varies the focal length (image magnification) as a plurality of optical elements move. To illustrate the embodiments of the invention by citing numerical data, the optical system is shown in sectional views in three operative positions, namely, the wide-angle end (W), the telephoto end (T) and a middle position (M) therebetween. The numerical data of the variable separations are given in tables.

It is to be noted that the optical element of FIG. 5 moves in the YZ plane. By this, what takes different values with different operative positions is the original point (Yi, Zi) of the local coordinates for expressing each surface. In the numerical examples of the embodiments, for a case where the optical elements movable for varying the image magnification go along the Z axis, the values Zi of the coordinates are expressed by Zi(W), Zi(M) and Zi(T) as the optical system is stationed in the wide-angle end, the middle position and the telephoto end, respectively. For another case where the zooming movement occurs in the Y axis, the values Yi of the coordinates are expressed by Yi(W), Yi(M) and Yi(T) as the optical system is stationed in the wide-angle end, the middle position and the telephoto end, respectively.

Incidentally, the values of the coordinate of every surface are expressed in relation of the values for the wide-angle end. The expression of the values for the middle position and the telephoto end is given by the differences from those of the wide-angle end. Specifically, denoting the moved amounts from the wide-angle end (W) to the middle position (M) and the telephoto end (T) by "a" and "b", respectively, the following equations are obtained:

$$Zi(M)=Zi(W)+a$$

$$Zi(T)=Zi(W)+b$$

The sign of the "a" or "b" is positive when the surface moves in the plus direction, or negative when it moves in the minus direction. The same applies to the case of the movement in the Y axis. Such movement causes variation of the separation Di between the i-th and (i+1)st surfaces. The values of all the variable separations for each of the zooming positions are given together in another tabulation.

The surfaces in the embodiments of the invention are either of sphere or of asphere of revolution asymmetry. Of these, the sphere can be described by the radius of curvature Ri. The sign of the radius of curvature Ri is taken as plus when the center of curvature falls in the plus direction of the z axis of the local coordinates, or as minus when it falls in the minus direction of the z axis.

Here, the shape of the spherical surface is expressed by the following equation:

$$z = \frac{(x^2+y^2)/Ri}{1+\sqrt{1-(x^2+y^2)/Ri^2}}$$

The optical system of the invention includes at least one aspheric surface of revolution asymmetry and its shape is expressed by the following equation:

$$z=A/B+C_{02}y^2+C_{20}x^2+C_{03}y^3+C_{21}x^2y+C_{04}y^4+C_{22}x^2y^2+C_{40}x^4$$

where $$A=(a+b)(y^2 \cdot \cos^2 t + x^2)$$

$$B=2a \cdot b \cdot \cos t[1+\{(b-a) \cdot y \cdot \sin t/(2a \cdot b)\}$$

$$+[1+\{(b-a) \cdot y \cdot \sin t/(a \cdot b)\}-\{y^2/(a \cdot b)\}$$

$$-\{4 \cdot a \cdot \cos t+(a+b)^2 \cdot \sin^2 t\}x^2/(4a^2b^2 \cdot \cos^2 t)]^{1/2}].$$

As far as the variable "x" is concerned, the above-described equation for the curved surface contains only the terms of even numbered powers. Therefore, the surface defined by such an equation becomes a symmetric form with respect to the YZ plane. If it satisfies the following additional condition:

$$C_{03}=C_{21}=t=0,$$

the surface is symmetric with respect to the xz plane. If it satisfies the following furthermore conditions:

$$C_{02}=C_{20},$$

$$C_{04}=C_{40}=C_{22}/2,$$

the surface is of revolution symmetry. In the case of not satisfying the conditions described above, the shape is of revolution asymmetry.

In all the embodiments of the invention except the embodiment 4, the first surface is a stop as shown in FIG. 5. The term "horizontal semifield $u_Y$" means a half of the maximum angular field the system covers at the first surface R1 in the YZ plane of FIG. 5. The term "vertical semifield $u_X$" means a half of the maximum angular field the system covers at the first surface R1 in the XZ plane. Also, the diameter of the stop is shown as the aperture diameter. This regulates the brightness of the optical system. It is to be noted that, except for the embodiment 4, the entrance pupil takes its place in the first surface. So, the aperture diameter described above is equal to the diameter of the entrance pupil.

Also, the effective area of the image plane is shown as the image size. The image area is of the rectangular shape with the horizontal sides in the y direction of the local coordinates, and the vertical sides in the x direction.

Also, in the numerical examples of the embodiments, the size of the optical system is shown as determined by the effective diameter of the light beam available at the wide-angle end.

The numerical data of design parameters give lateral aberrations which are graphically represented in the operative position of each optical system. For the wide-angle end (W), the middle position (M) and the telephoto end (T), a ray of light is incident on the stop R1 at horizontal and vertical angles of $(u_Y, u_X)$, $(0, u_X)$, $(u_Y, u_X)$, $(u_Y, 0)$ $(0,0)$ or $(-u_Y, 0)$ with production of the lateral aberrations. In the graphs of the lateral aberrations, the abscissa represents the height of incidence on the pupil and the ordinate represents the produced amount of aberration. In any of the embodiments, every surface is basically formed to symmetric shapes in respect to the yz plane. Even in the graphs of the lateral aberrations, therefore, the plus and minus directions of the vertical angular field become the same. So, the graphs of the lateral aberrations of the minus direction are omitted for the purpose of simplifying the drawings.

Next, each of the embodiments is described in detail below.

(Embodiment 1)

Figure 1:
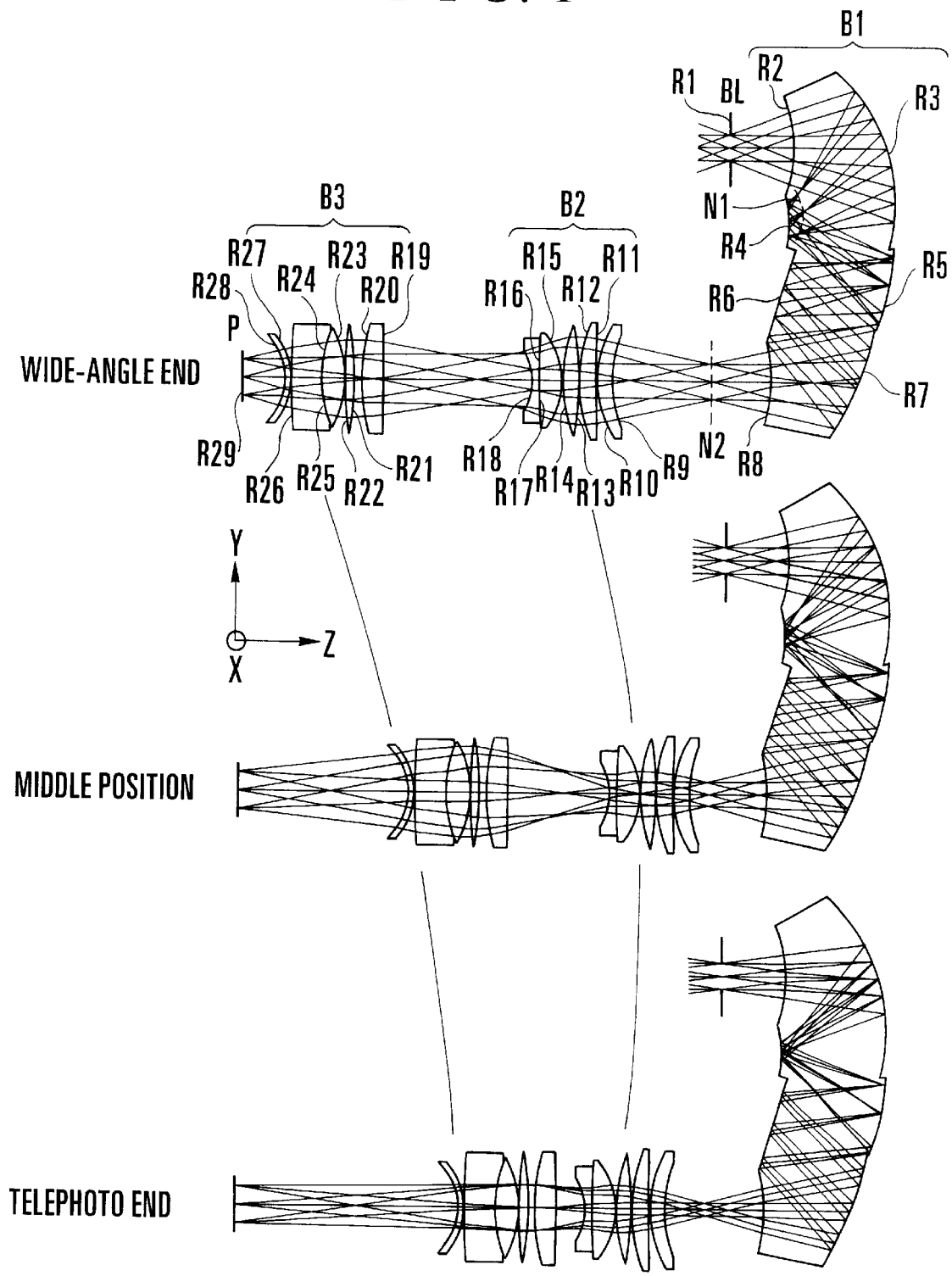
FIG. 1 shows sectional views of an embodiment 1 of the zoom optical system according to the invention with the optical paths shown in the YZ plane.

FIG. 1 shows sectional views in the YZ plane of embodiment 1 of the zoom optical system according to the invention. The present embodiment is applied to the optical system for use in picking up an image to obtain a 3-unit zoom lens. Its design parameters have the numerical values given in tables below.

|  | W | M | T |
|---|---|---|---|
| Horizontal Semifield | 26.3 | 18.2 | 9.3 |
| Vertical Semifield | 20.3 | 13.9 | 7.0 |
| Aperture Diameter | 2.4 | 2.4 | 2.4 |

W the wide-angle end;
M the middle position; and
T telephoto end
    Image Size in mm:    (H × V) = 4.8 × 3.6
    Optics Size at W:    (X×Y×Z) = 12.4 × 32.9 × 62.0

-continued where H: horizontal; and V: vertical

| i | Yi | Zi (W) | Θi | Di | Ndi | vdi | Sur. |
|---|---|---|---|---|---|---|---|
| 1 | 0.00 | 0.00 | 0.00 | 6.15 | 1 | | Stop |

First Optical Element B1:

| | | | | | | | |
|---|---|---|---|---|---|---|---|
| 2 | 0.00 | 6.15 | 0.00 | 9.00 | 1.64769 | 33.80 | R⁺ |
| 3 | 0.00 | 15.15 | 17.78 | 11.66 | 1.64769 | 33.80 | L⁺ |
| 4 | −6.78 | 5.66 | 2.45 | 11.20 | 1.64769 | 33.80 | L |
| 5 | −12.49 | 15.30 | −10.81 | 10.61 | 1.64769 | 33.80 | L |
| 6 | −14.15 | 4.82 | −17.97 | 10.69 | 1.64769 | 33.80 | L |
| 7 | −21.71 | 12.38 | −22.49 | 8.37 | 1.64769 | 33.80 | L |
| 8 | −21.71 | 4.01 | 0.00 | Var. | 1 | | R |

*R stands for refracting surface; L for reflecting surface.

Second Optical Element B2:

| | | | | | | | |
|---|---|---|---|---|---|---|---|
| 9 | −21.71 | −10.91 | 0.00 | 1.45 | 1.48749 | 70.21 | R |
| 10 | −21.71 | −12.37 | 0.00 | 0.18 | 1 | | R |
| 11 | −21.71 | −12.55 | 0.00 | 1.57 | 1.60311 | 60.66 | R |
| 12 | −21.71 | −14.12 | 0.00 | 0.13 | 1 | | R |
| 13 | −21.71 | −14.25 | 0.00 | 1.38 | 1.62041 | 60.27 | R |
| 14 | −21.71 | −15.62 | 0.00 | 0.10 | 1 | | R |
| 15 | −21.71 | −15.72 | 0.00 | 2.14 | 1.64100 | 56.92 | R |
| 16 | −21.71 | −17.87 | 0.00 | 0.12 | 1 | | R |
| 17 | −21.71 | −17.99 | 0.00 | 0.67 | 1.71736 | 29.51 | R |
| 18 | −21.71 | −18.66 | 0.00 | Var. | 1 | | R |

Third Optical Element B3:

| | | | | | | | |
|---|---|---|---|---|---|---|---|
| 19 | −21.71 | −32.51 | 0.00 | 2.04 | 1.58913 | 61.18 | R |
| 20 | −21.71 | −34.55 | 0.00 | 0.71 | 1 | | R |
| 21 | −21.71 | −35.26 | 0.00 | 0.86 | 1.56384 | 60.69 | R |
| 22 | −21.71 | −36.12 | 0.00 | 0.10 | 1 | | R |
| 23 | −21.71 | −36.22 | 0.00 | 2.15 | 1.60311 | 60.66 | R |
| 24 | −21.71 | −38.38 | 0.00 | 0.10 | 1 | | R |
| 25 | −21.71 | −38.48 | 0.00 | 2.85 | 1.75520 | 27.51 | R |
| 26 | −21.71 | −41.32 | 0.00 | 0.10 | 1 | | R |
| 27 | −21.71 | −41.42 | 0.00 | 0.S0 | 1.65446 | 33.62 | R |
| 28 | −21.71 | −41.92 | 0.00 | Var. | 1 | | R |
| 29 | −21.71 | −46.00 | 0.00 | 0.00 | 1 | | I.P. | where I.P. stands for linage Plane.

| | W | M | T |
|---|---|---|---|
| D 8 | 14.93 | 7.22 | 9.22 |
| D18 | 13.86 | 9.52 | 2.59 |
| D28 | 4.08 | 16.14 | 21.06 |

R 1 + up to R 8:  Zi(M) = Zi(W)
                 Zi(T) = Zi(W)
R 9 + up to R18: Zi(M) = Zi(W) + 7.73
                 Zi(T) = Zi(W) + 5.71
R19 + up to R28: Zi(M) = Zi(W) + 12.06
                 Zi(T) = Zi(W) + 16.98
R29:             Zi(M) = Zi(W)
                 Zi(T) = Zi(W)

Shape of Spherical Surface:

R 2 Surface: $R_2 = -12.622$
R 8 Surface: $R_8 = -14.877$
R 9 Surface: $R_9 = 12.866$
R10 Surface: $R_{10} = 10.705$
R11 Surface: $R_{11} = 138.974$
R12 Surface: $R_{12} = 14.258$
R13 Surface: $R_{13} = -42.325$
R14 Surface: $R_{14} = 14.369$
R15 Surface: $R_{15} = -7.298$
R16 Surface: $R_{16} = 58.857$
R17 Surface: $R_{17} = 29.735$
R18 Surface: $R_{18} = -6.045$
R19 Surface: $R_{19} = -98.642$
R20 Surface: $R_{20} = 20.180$
R21 Surface: $R_{21} = -28.327$
R22 Surface: $R_{22} = 37.323$
R23 Surface: $R_{23} = -11.405$
R24 Surface: $R_{24} = 11.769$
R25 Surface: $R_{25} = 11.362$
R26 Surface: $R_{26} = 67.664$
R27 Surface: $R_{27} = -6.735$
R28 Surface: $R_{28} = -5.455$ Shape of Aspheric Surface:

R 3: $a = -1.67168e+01$   $b = -1.40383e+01$   $t = 2.13856e+01$
     $C_{03} = -4.89226e-05$   $C_{21} = -8.30083e-05$
     $C_{04} = 1.08453e-05$   $C_{22} = 2.53575e-05$   $C_{40} = 1.82792e-05$
R 4: $a = -6.16288e+00$   $b = -1.19620e+01$   $t = 4.52060e+01$
     $C_{03} = 4.89807e-03$   $C_{21} = 2.67721e-03$
     $C_{04} = 1.88551e-04$   $C_{22} = -2.04184e-04$   $C_{40} = 1.07399e-04$
R 5: $a = -2.03427e+01$   $b = -2.34954e+01$   $t = 3.70433e+01$
     $C_{03} = 5.02647e-04$   $C_{21} = 1.88611e-04$
     $C_{04} = 2.09495e-05$   $C_{22} = 2.42572e-06$   $C_{40} = -1.92403e-06$
R 6: $a = -1.22106e+02$   $b = -1.22097e+02$   $t = 7.58653e+01$
     $C_{03} = 4.66466e-04$   $C_{21} = -4.88673e-05$
     $C_{04} = -4.14548e-05$   $C_{22} = -1.09844e-04$   $C_{40} = -6.05085e-DS$
R 7: $a = -1.45959e+02$   $b = -1.84911e+02$   $t = 2.98825e+01$
     $C_{03}\ 2.73516e-04$   $C_{22} = 5.85397e-05$
     $C_{04} = -2.28623e-06$   $C_{22} = -6.14890e-06$   $C_{40} = -8.24738e-06$

In FIG. 1, the first surface R1 is a stop at which the entrance pupil lies. A first optical element B1 is constructed with a second surface R2 (refracting entrance surface), a third surface R3 to a seventh surface R7 of internal reflection in curved form, and an eighth surface R8 (refracting exit surface) arranged on one block. A second optical element B2 is constructed with a number of lenses with ten refracting surfaces, or the ninth surface R9 through the eighteenth surface R18 arranged on a common optical axis. A third optical element B3 is constructed with a number of lenses with ten refracting surfaces, or the nineteenth surface R19 through the twenty eighth surface R28 arranged on a common optical axis. A twenty-ninth surface R29 is the image plane in which the image receiving surface of an image pickup device such as a CCD lies.

The present embodiment is to form a so-called 3-unit zoom lens. The stop R1 and the first optical element B1 constitute a first lens unit. The second optical element B2 constitutes a second lens unit. The third optical element B3 constitutes a third lens unit. Of these, the second and third lens units vary their relative positions to perform the function of varying the focal length.

Next, the image forming function is described on the assumption that an object is at infinity. A light beam passing through the stop R1, enters the first optical element B1 and is refracted by the second surface R2. Inside the first optical element B1, it is reflected from the successive surfaces R3 through R7. When exiting from the first optical element B1, the light beam is refracted by the eighth surface R8. During this time, the light beam is once focused to form an intermediate image in the neighborhood of the fourth surface R4. Further, a second image is formed in the space between the first and second optical elements B1 and B2.

The light beam then enters the second optical element B2, within which it is refracted by all the surfaces R9 through R18 and then exits therefrom. At this time, the principal ray of the light beam is focused in the neighborhood of the eighteenth surface R18 to form a pupil.

Next, the light beam exiting from the second optical element B2 enters the third optical element B3, within which it is refracted by all the surfaces R19 through R28, and exits therefrom, reaching the twenty-ninth surface or plane R29 on which the final image is formed.

Next, the operation of varying the image magnification is described. During zooming, the first optical element B1 remains stationary. The second optical element B2 first moves to the plus direction in the Z axis as zooming goes from the wide-angle end toward the telephoto end, and then to the minus direction in the Z axis. The third optical element B3 moves to the plus direction in the Z axis, as zooming goes from the wide-angle end to the telephoto end. The image plane or the twenty-ninth surface R29 does not move during zooming.

By zooming from the wide-angle end to the telephoto end, the separation between the first optical element B1 and the second optical element B2 first narrows and then widens, the separation between the second optical element B2 and the third optical element B3 narrows, and the separation between the third optical element B3 and the image plane R29 widens. Also, the length of the optical path of the entire system beginning with the first surface R1 and terminating at the image plane R29 is kept constant during zooming from the wide-angle end to the telephoto end.

In the present embodiment, the entering and exiting reference axes of the first optical element B1 are parallel to each other and oriented to opposite directions. The second optical element B2 and the third optical element B3 which perform the function of varying the image magnification have their reference axes in coincidence with the optical axes thereof, which are common with each other. The entering and exiting reference axes of each of the second and third optical elements B2 and B3 are oriented to the same direction.

Figure 2:
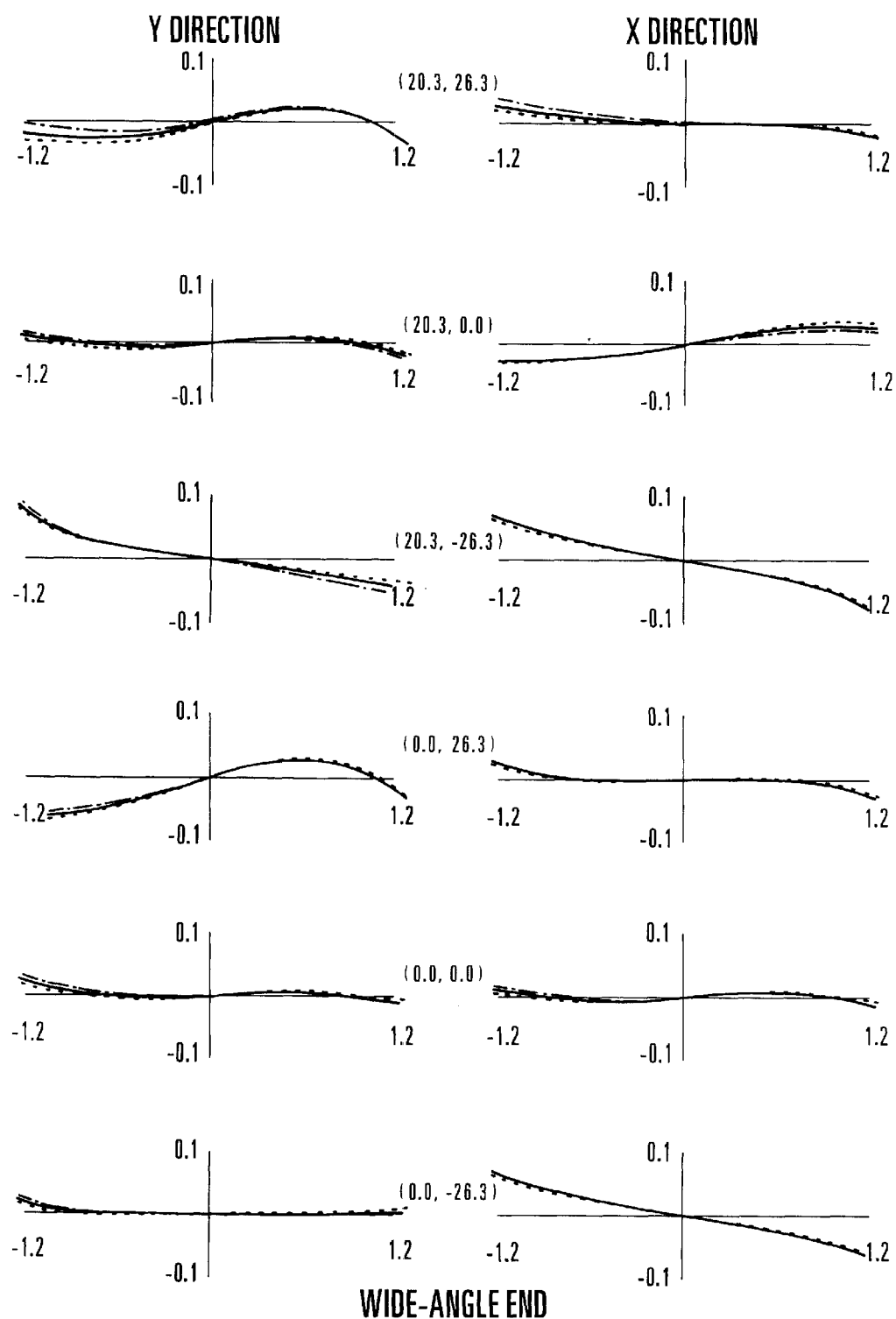
FIG. 2 shows graphs of the lateral aberrations of the embodiment 1 in the wide-angle end.
Figure 3:
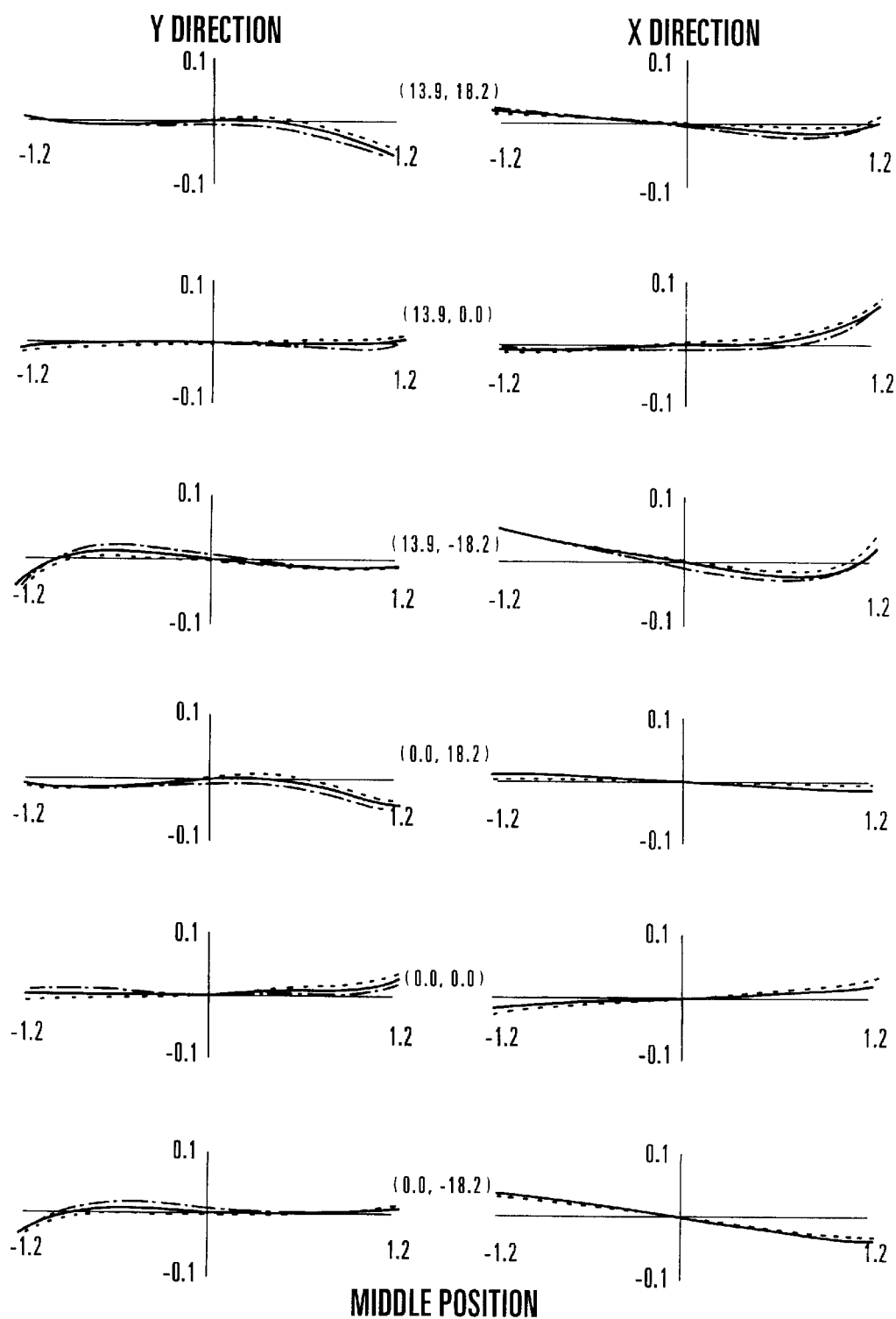
FIG. 3 shows graphs of the lateral aberrations of the embodiment 1 in a middle position.
Figure 4:
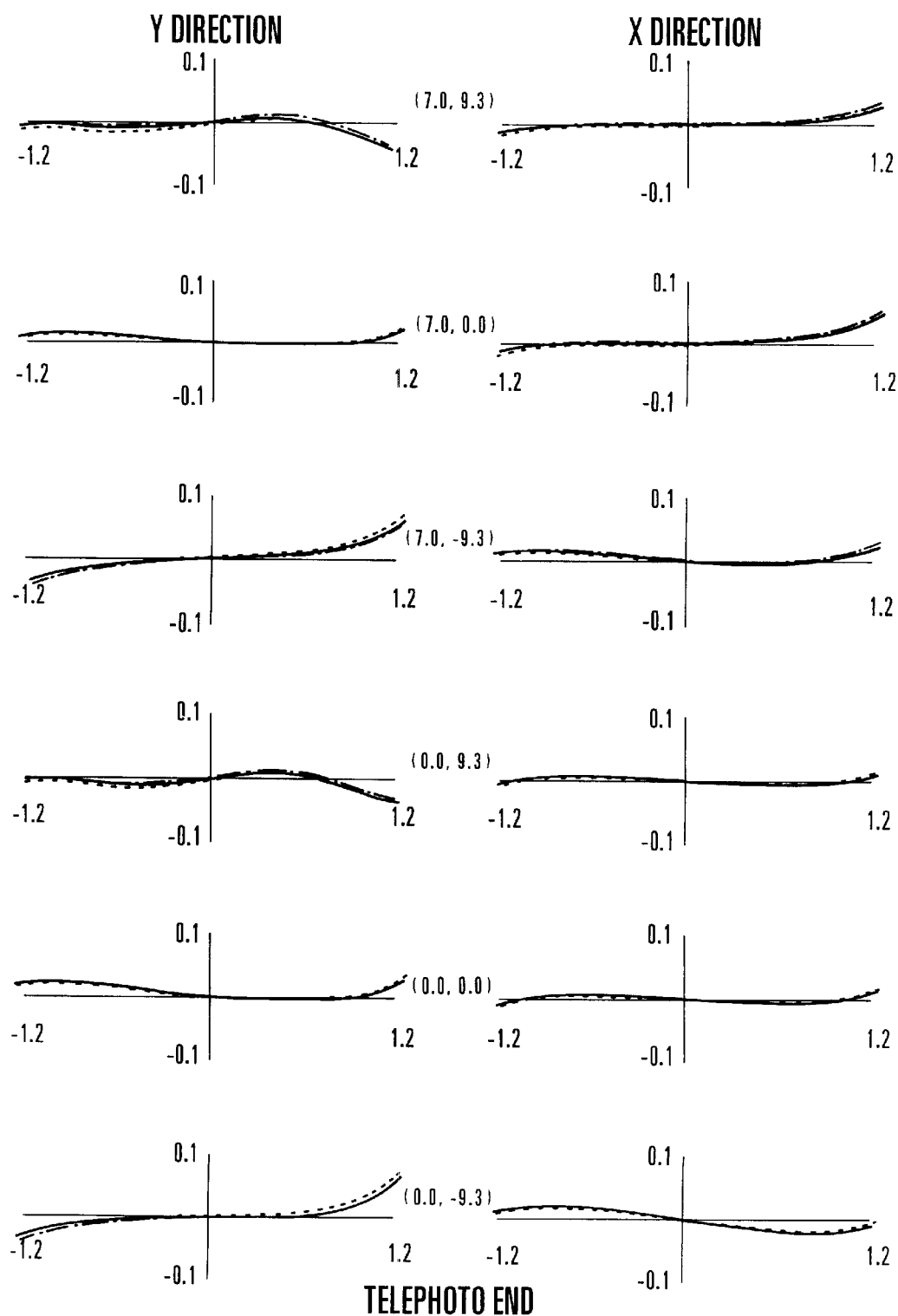
FIG. 4 shows graphs of the lateral aberrations of the embodiment 1 in the telephoto end.

The lateral aberrations of the zoom optical system of the present embodiment are shown in the graphs of FIGS. 2, 3 and 4.

For the focusing purposes, the stop Ri and the first optical element B1 are moved in unison to the Z axis to suit to different object distances.

An advantage of the present embodiment arises from the facts that the stop R1 is disposed on the object side of the zoom optical system and that two images of an object are formed in the interior of the first optical element B1 and behind the first optical element B1. By this arrangement, the effective diameter of each of the surfaces of the first optical element B1 is shortened. This leads to minimize the dimension in the X axis. The optical element of compact form is thus obtained.

Another advantage arises from the fact that the first optical element B1 is provided with a plurality of inner reflecting surfaces which are given proper refractive powers and arranged in decentered relation. This allows the optical path to be bent to a desired shape without having to mutilate the light beam in passing through the zoom optical system. The total length in the Z direction is thus shortened.

Yet another advantage arising from the fact that the first optical element B1 has its reflecting surfaces formed on a rigid transparent body is that the reflecting surfaces can be positioned in a uniform tolerance (assembling tolerance) which greatly affects the optical performance. The optical system thus little suffers any loss of positioning accuracy with aging.

Further, the zoom optical system is made up by employing two different types of optical elements in good combination, one of which has a plurality of reflecting surfaces formed in unison and the other of which is constructed with the coaxial refracting surfaces (coaxial optical element). As compared with the case where the zoom optical system is constructed only with the reflecting surfaces arranged in decentered relation, the produced amount of decentering aberrations is more suppressed by having the coaxial optical element made to share the refractive power. The use of the optical element which is composed of coaxial refracting spherical surfaces facilitates the easiness of correcting all aberrations.

Furthermore, such an optical element of coaxial refracting spherical surfaces is easy to manufacture.

(Embodiment 2)

Figure 6:
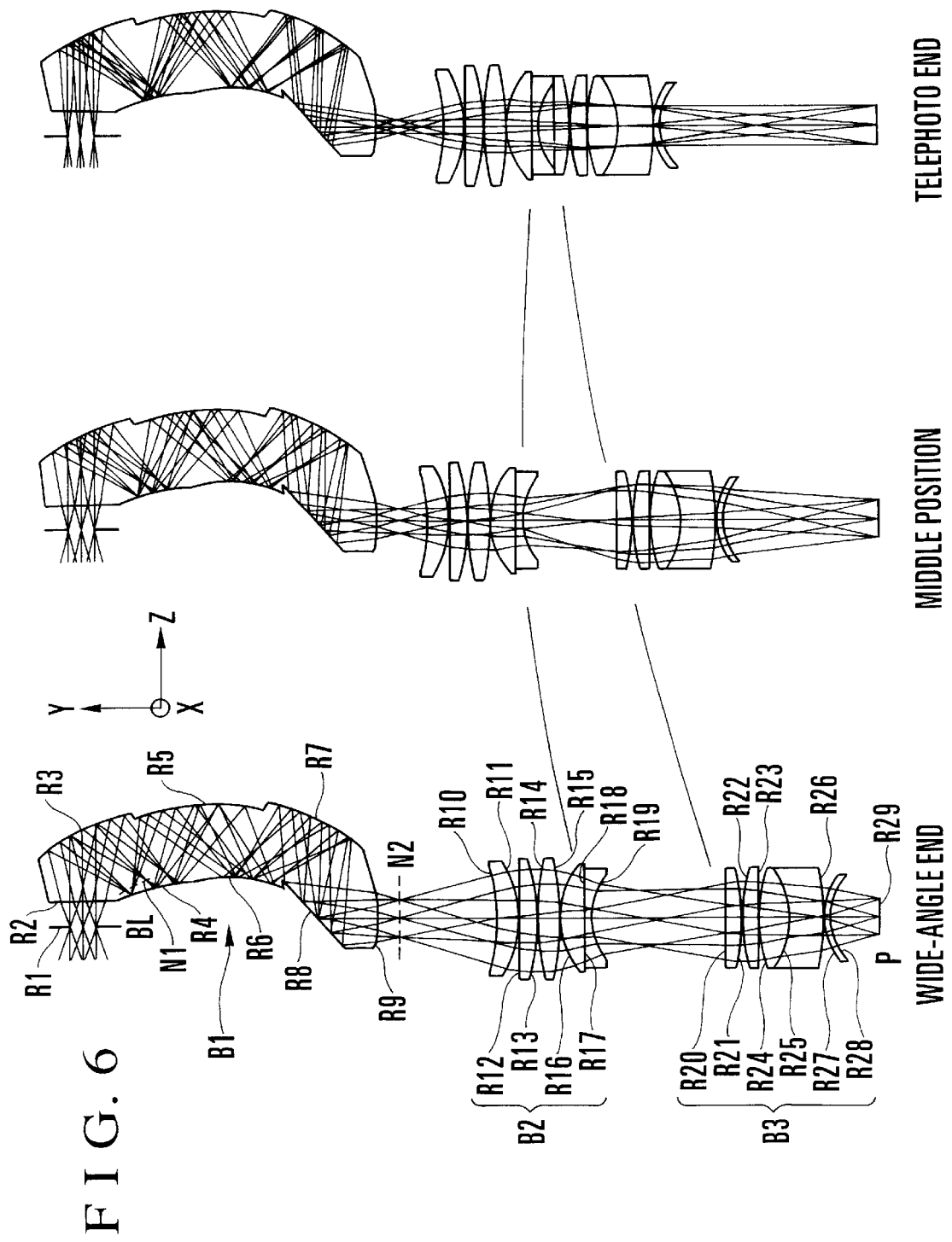
FIG. 6 shows sectional views of an embodiment 2 of the zoom optical system according to the invention with the optical paths shown in the YZ plane.

FIG. 6 shows sectional views in the YZ plane of an embodiment 2 of the zoom optical system according to the invention. The present embodiment is applied to the optical system for use in picking up an image and provides a 3-component zoom lens. The numerical data for this embodiment are shown below.

|  | W | M | T |
|---|---|---|---|
| Horizontal Semifield | 20.3 | 13.9 | 7.0 |
| Vertical Semifield | 26.3 | 18.2 | 9.3 |
| Aperture Diameter | 2.4 | 2.4 | 2.4 |

| Image Size in min: | (H × V) = 3.6 × 4.8 |
|---|---|
| Optics Size at W: | (X×Y×Z) = 8.8 × 77.9 × 15.6 |

| i | Yi | Zi(W) | Θi | Di | Ndi | νdi | Sur. |
|---|---|---|---|---|---|---|---|
| 1 | 0.00 | 0.00 | 0.00 | 2.25 | 1 |  | Stop |
| First Optical Element B1: | | | | | | | |
| 2 | 0.00 | 2.25 | 0.00 | 6.75 | 1.51633 | 64.15 | R |
| 3 | 0.00 | 9.00 | 25.18 | 8.75 | 1.51633 | 64.15 | L |
| 4 | −6.74 | 3.42 | 12.37 | 8.75 | 1.51633 | 64.15 | L |
| 5 | −10.52 | 11.31 | 5.31 | 8.75 | 1.51633 | 64.15 | L |
| 6 | −15.70 | 4.25 | −7.76 | 8.75 | 1.51633 | 64.15 | L |
| 7 | −22.57 | 9.67 | −27.54 | 9.00 | 1.51633 | 64.15 | L |
| 8 | −22.05 | 0.68 | −46.66 | 5.80 | 1.51633 | 64.15 | L |
| 9 | −27.85 | 0.68 | −90.00 | Var. | 1 |  | R |
| Second Optical Element B2: | | | | | | | |
| 10 | −38.92 | 0.68 | −90.00 | 1.97 | 1.56873 | 63.16 | R |
| 11 | −40.89 | 0.68 | −90.00 | 0.10 | 1 |  | R |
| 12 | −40.99 | 0.68 | −90.00 | 1.68 | 1.62041 | 60.27 | R |
| 13 | −42.68 | 0.68 | −90.00 | 0.10 | 1 |  | R |
| 14 | −42.78 | 0.68 | −90.00 | 1.99 | 1.62041 | 60.27 | R |
| 15 | −44.77 | 0.68 | −90.00 | 0.10 | 1 |  | R |
| 16 | −44.87 | 0.68 | −90.00 | 2.36 | 1.62280 | 57.06 | R |
| 17 | −47.23 | 0.68 | −90.00 | 0.10 | 1 |  | R |
| 18 | −47.33 | 0.68 | −90.00 | 0.50 | 1.72151 | 29.24 | R |
| 19 | −47.83 | 0.68 | −90.00 | Var. | 1 |  | R |
| Third Optical Element B3: | | | | | | | |
| 20 | −60.21 | 0.68 | −90.00 | 1.48 | 1.58913 | 61.18 | R |
| 21 | −61.70 | 0.68 | −90.00 | 0.10 | 1 |  | R |
| 22 | −61.80 | 0.68 | −90.00 | 1.58 | 1.58913 | 61.18 | R |
| 23 | −63.38 | 0.68 | −90.00 | 0.10 | 1 |  | R |
| 24 | −63.48 | 0.68 | −90.00 | 2.76 | 1.60729 | 59.37 | R |
| 25 | −66.23 | 0.68 | −90.00 | 3.20 | 1.75520 | 27.51 | R |
| 26 | −69.43 | 0.68 | −90.00 | 0.10 | 1 |  | R |
| 27 | −69.53 | 0.68 | −90.00 | 0.50 | 1.59551 | 39.28 | R |
| 28 | −70.03 | 0.68 | −90.00 | Var. | 1 |  | R |
| 29 | −74.72 | 0.68 | −90.00 | 0.00 | 1 |  | I.P. |

|  | W | M | T |
|---|---|---|---|
| D 9 | 11.07 | 4.69 | 6.29 |
| D19 | 12.38 | 8.74 | 1.44 |
| D28 | 4.69 | 14.71 | 20.42 |

R1 + up to R9:   Yi (M) = Yi(W)
                  Yi(T) = Yi(W)
R10 + up to R19:   Yi(M) = Yi(W) − 6.39
                   Yi(T) = Yi(W) − 4.78
R20 + up to R28:   Yi(M) = Yi(W) − 10.02
                   Yi(T) = Yi(W) − 15.73
R29:              Yi(M) = Yi(W)
                Yi(T) = Yi(W)

Shape of Spherical Surface:

R 2 Surface: $R_2 = \infty$
R 9 Surface: $R_9 = -14.692$
R10 Surface: $R_{10} = -15.785$
R11 Surface: $R_{11} = -9.916$
R12 Surface: $R_{12} = 806.578$
R13 Surface: $R_{13} = -19.136$
R14 Surface: $R_{14} = 24.764$
R15 Surface: $R_{15} = -26.101$
R16 Surface: $R_{16} = 7.532$
R17 Surface: $R_{17} = -123.778$ -continued R18 Surface: $R_{18}$ = −52.093
R19 Surface: $R_{19}$ = 5.947
R20 Surface: $R_{20}$ = 113.146
R21 Surface: $R_{21}$ = −19.210
R22 Surface: $R_{22}$ = 16.059
R23 Surface: $R_{23}$ = −106.475
R24 Surface: $R_{24}$ = 16.867
R25 Surface: $R_{25}$ = −7.880
R26 Surface: $R_{26}$ = −23.891
R27 Surface: $R_{27}$ = 6.381
R28 Surface: $R_{28}$ = 5.013
Shape of Aspheric Surface:

| | | | |
|---|---|---|---|
| R 3: | a = −3.59218e+01 | b = −9.56407e+00 | t = 2.62788e+01 |
| | $C_{03}$ = −3.28591e−04 | $C_{21}$ = 1.09040e−04 | |
| | $C_{04}$ = 3.02002e−05 | $C_{22}$ = 7.33327e−05 | $C_{40}$ = 7.31472e−05 |
| R 4: | a = −4.46438e+00 | b = 7.31244e+00 | t = 1.05955e+01 |
| | $C_{03}$ = −8.43331e−04 | $C_{21}$ = 1.15143e−04 | |
| | $C_{04}$ = −4.92526e−04 | $C_{22}$ = −1.32799e−03 | $C_{40}$ = −3.91919e−04 |
| R 5: | a = −1.27855e+01 | b = −2.36243e+01 | t = 1.82299e+01 |
| | $C_{03}$ = 4.49533e−05 | $C_{21}$ = 4.24795e−05 | |
| | $C_{04}$ = −2.72263e−05 | $C_{22}$ = −1.26579e−04 | $C_{40}$ = −1.65426e−04 |
| R 6: | a = −9.17197e+00 | b = −4.60643e+01 | t = 1.12881e+01 |
| | $C_{03}$ = 8.58718e−05 | $C_{21}$ = −8.69345e−04 | |
| | $C_{04}$ = −3.09227e−04 | $C_{22}$ = −9.83897e−04 | $C_{40}$ = −1.26913e−03 |
| R 7: | a = −1.33671e+01 | b = −2.68360e+01 | t = 1.23619e+01 |
| | $C_{03}$ = 1.27133e−05 | $C_{21}$ = −3.07799e−04 | |
| | $C_{04}$ = −8.55028e−06 | $C_{22}$ = −5.67380e−05 | $C_{40}$ = −8.71918e−05 |
| R 8: | a = −7.36361e+01 | b = 5.55994e+01 | t = 7.05431e+01 |
| | $C_{03}$ = −1.26030e−04 | $C_{21}$ = −1.97414e−03 | |
| | $C_{04}$ = 2.06017e−05 | $C_{22}$ = −2.60272e−05 | $C_{40}$ = −3.06310e−04 |

In FIG. 6, the first surface R1 is a stop that is the entrance pupil. A first optical element B1 is constructed with a second surface R2 (refracting entrance surface), six curved inner reflecting surfaces R3 through R8 and a ninth surface R9 (refracting exit surface) arranged on one block. A second optical element B2 is constructed with a number of lenses with ten coaxial refracting surfaces R10 through R19. A third optical element B3 is constructed with a number of lenses with nine coaxial refracting surfaces R20 through R28. A twenty ninth surface R29 is the image plane coincident with the image receiving surface of an image pickup device such as a CCD.

The present embodiment is to provide a so-called 3-unit zoom lens. The stop R1 and the first optical element B1 constitute a first lens unit. The second optical element B2 constitutes a second lens unit. The third optical element B3 constitutes a third lens unit. Of these, the second and third lens units constitute a zoom section and move in differential relation to vary the focal length.

Next, the function of forming an image with an object at infinity is described. A light beam that has passed through the stop R1 enters the first optical element B1. In the interior of the first optical element B1, the light beam is refracted by the second surface R2, then reflected from the third surface R3, the fourth surface R4, the fifth surface R5, the sixth surface R6, the seventh surface R7 and the eighth surface R8 and then refracted by the ninth surface R9, exiting from the first optical element B1. During this time, the light beam is once focused to form an intermediate image in the neighborhood of the fourth surface R4. Further, a second image is formed in the space between the first optical element B1 and the second optical element B2.

The light beam then enters the second optical element B2. In the interior of the second optical element B2, the light beam is refracted by the surfaces R10 through R19 and then exits therefrom. At this time, the principal ray of the light beam is focused behind the nineteenth surface R19 to form a pupil.

Next, the light beam that has exited from the second optical element B2 enters the third optical element B3. In the interior of the third optical element B3, the light beam is refracted by the surfaces R20 through R28, and exits therefrom, reaching the twenty-ninth surface or plane R29 on which a final image is formed.

Next, the operation of varying the image magnification is described. The first optical element B1 remains stationary during zooming. The second optical element B2 first moves to the plus direction in the Y axis as zooming goes from the wide-angle end toward the telephoto end, and then to the minus direction in the Y axis. The third optical element B3 simultaneously moves to the plus direction in the Y axis. The image plane or the twenty-ninth surface R29 does not move during zooming.

By zooming from the wide-angle end to the telephoto end, the separation between the first optical element B1 and the second optical element B2 first narrows and then widens, the separation between the second optical element B2 and the third optical element B3 narrows, and the separation between the third optical element B3 and the image plane R29 widens. Also, the length of the optical path of the entire system from the first surface R1 to the image plane R29 is kept constant throughout the entire zooming range.

In the present embodiment, the entering and exiting reference axes of the first optical element B1 make an angle of 90° with each other. The second optical element B2 and the third optical element B3 which perform the function of varying the image magnification have their reference axes in coincidence with the optical axes thereof, which are common with each other. The entering and exiting reference axes of each of the second and third optical elements B2 and B3 are oriented to the same direction.

Figure 7:
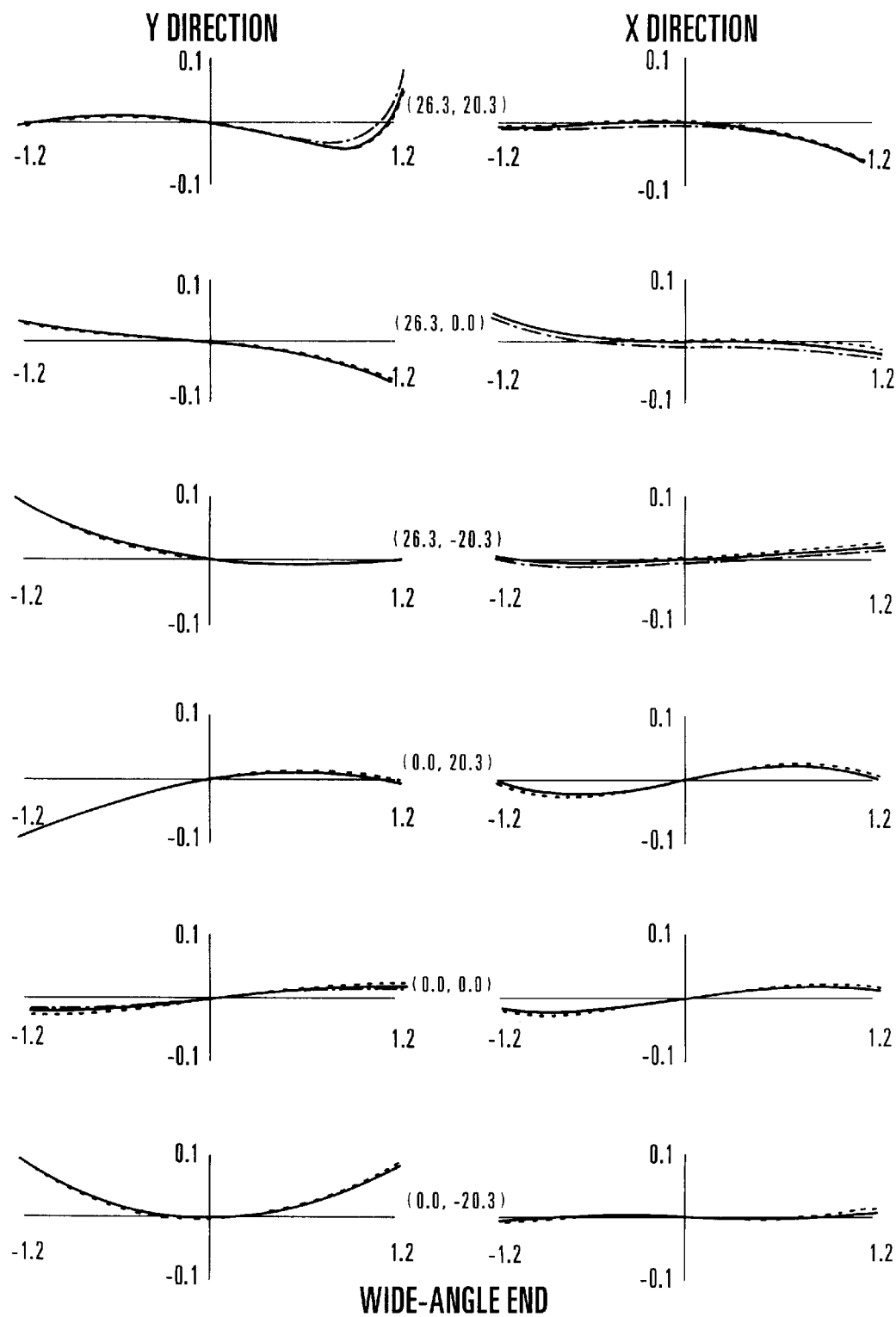
FIG. 7 shows graphs of the lateral aberrations of the embodiment 2 in the wide-angle end.
Figure 8:
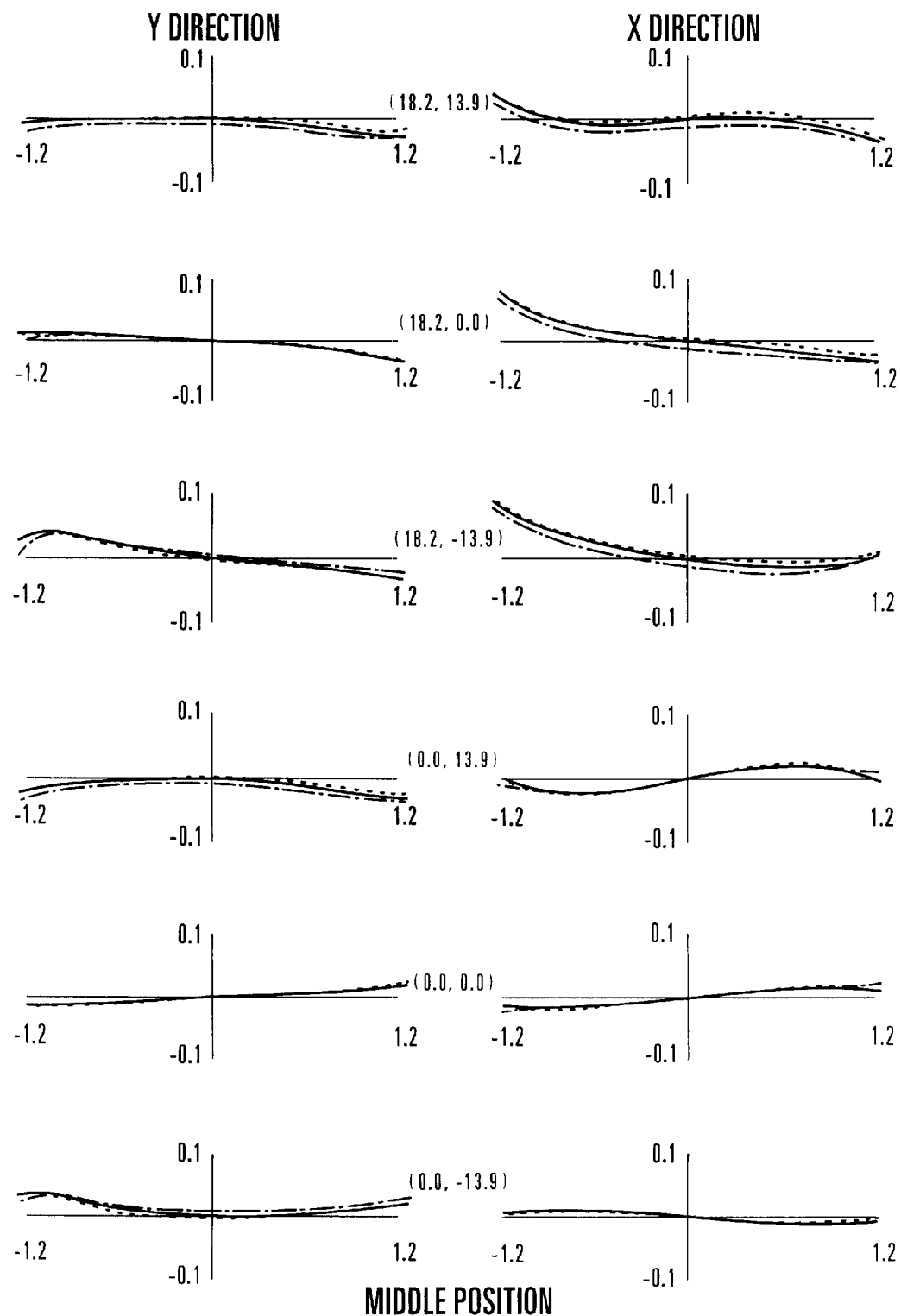
FIG. 8 shows graphs of the lateral aberrations of the embodiment 2 in a middle position.
Figure 9:
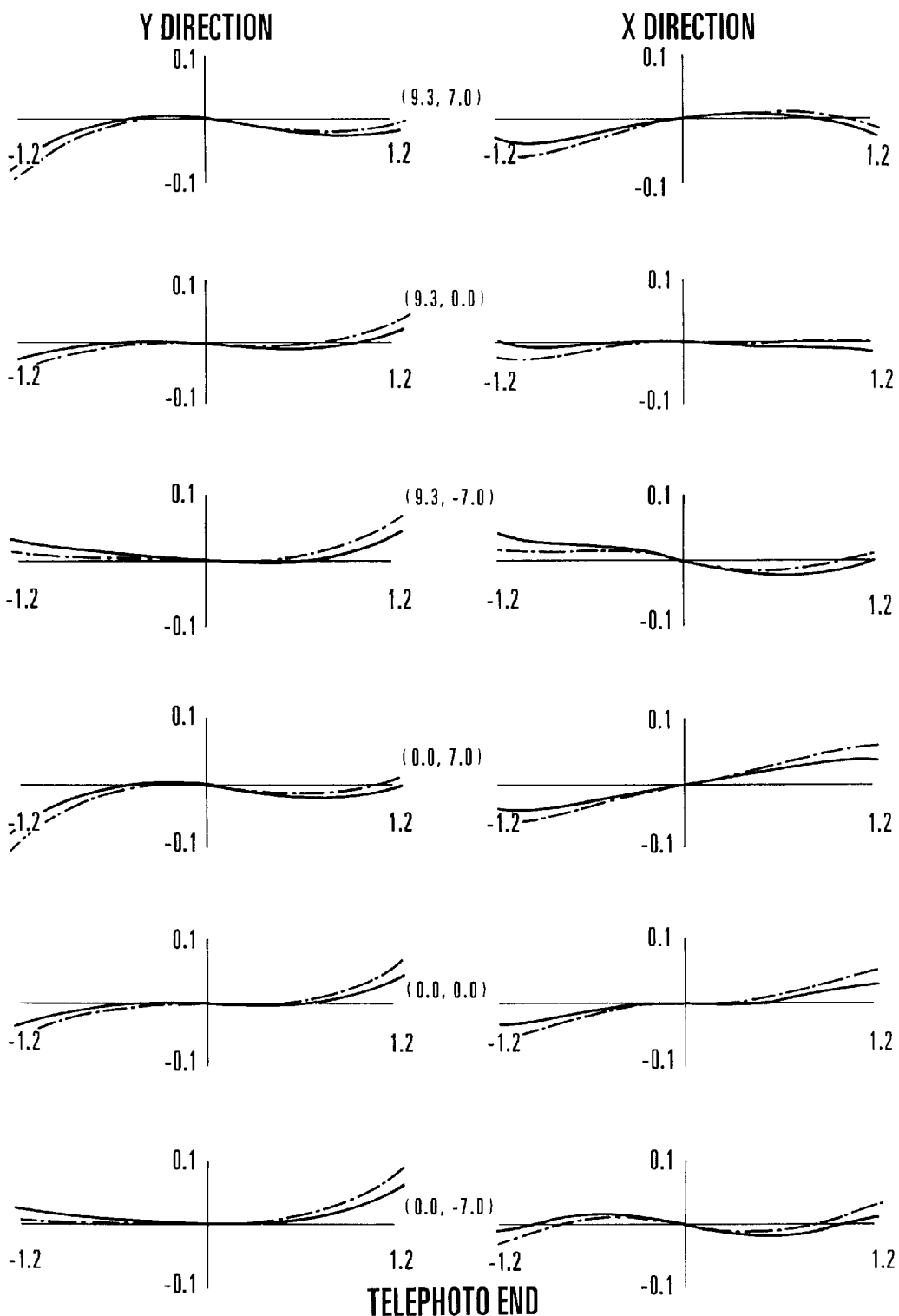
FIG. 9 shows graphs of the lateral aberrations of the embodiment 2 in the telephoto end.

The lateral aberrations of the zoom optical system of the present embodiment are shown in the graphs of FIGS. 7, 8 and 9.

For the focusing purposes, the stop R1 and the first optical element B1 are moved in unison to the Y axis to suit different object distances.

An advantage of the present embodiment arises from the facts that the stop R1 is disposed on the object side of the zoom optical system and that two images of an object are formed in the interior of the first optical element B1 and behind the first optical element B1. By this arrangement, the effective diameter of each of the surfaces of the first optical element B1 is shortened. This leads to minimize the dimension in the X axis. The optical element of compact form is thus obtained.

Another advantage arises from the fact that the first optical element B1 is provided with a plurality of inner reflecting surfaces which are given proper refractive powers and arranged in decentered relation. This allows the optical path to be bent to a desired shape without having to mutilate the light beam in passing through the zoom optical system. The total length in the Z direction is thus shortened.

Yet another advantage arising from the fact that the first optical element B1 has its reflecting surfaces formed on a rigid transparent body is that the reflecting surfaces can be positioned in a uniform tolerance (assembling tolerance) which greatly affects the optical performance. The optical system thus little suffers any loss of positioning accuracy with aging.

Further, the zoom optical system is made up by employing two different types of optical elements in good combination, one of which has a plurality of reflecting surfaces formed in unison and the other of which is constructed with the coaxial refracting surfaces (coaxial optical element). As compared with the case where the zoom optical system is constructed only with the reflecting surfaces arranged in decentered relation, the produced amount of decentering aberrations is more suppressed by having the coaxial optical element made to share the refractive power. The use of the optical element which is composed of coaxial refracting spherical surfaces facilitates the easiness of correcting all aberrations.

Furthermore, such an optical element of coaxial refracting spherical surfaces is easy to manufacture.

(Embodiment 3)

Figure 10:
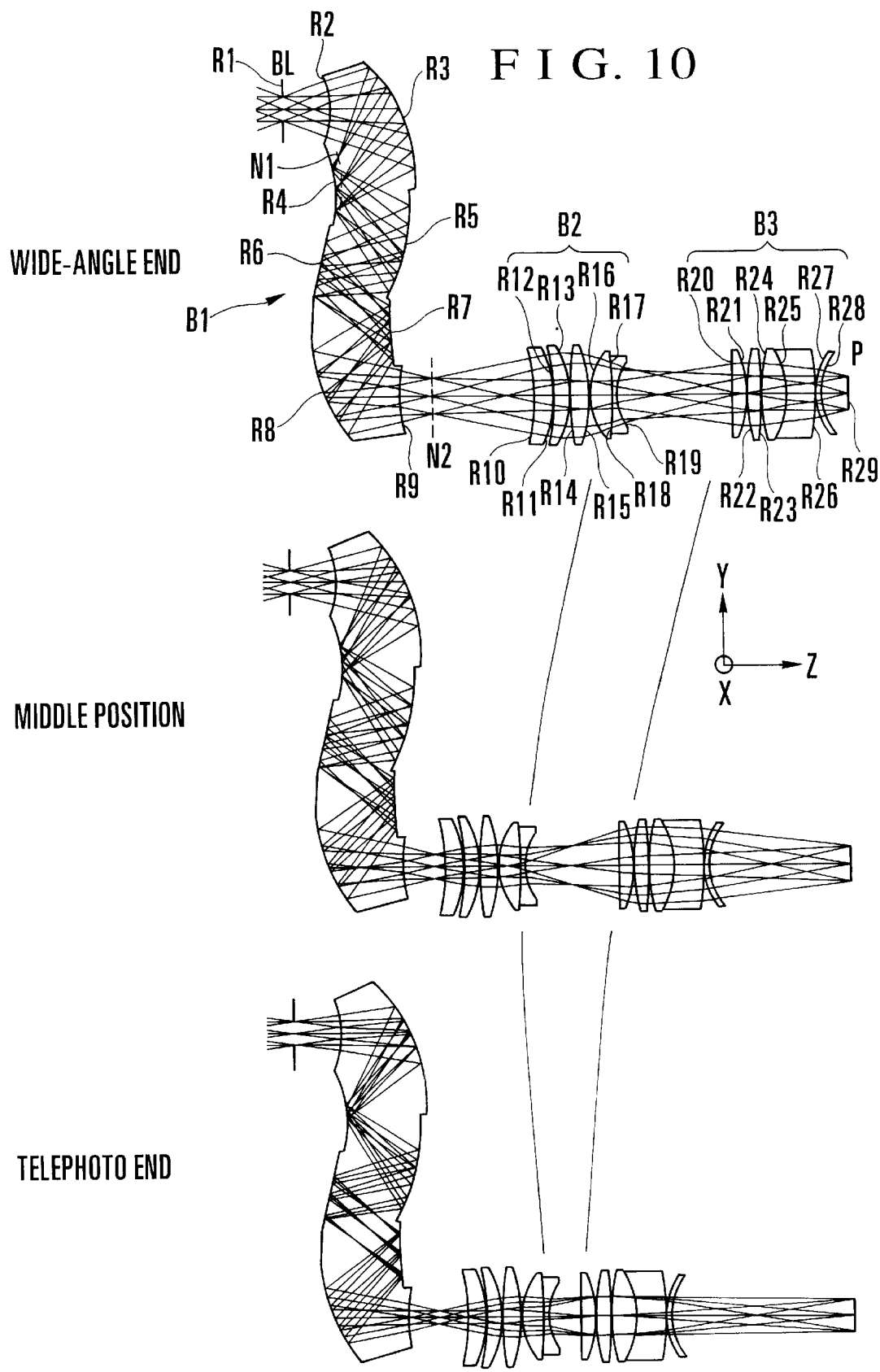
FIG. 10 shows sectional views of an embodiment 3 of the zoom optical system according to the invention with the optical paths shown in the YZ plane.

FIG. 10 shows sectional views in the YZ plane of an embodiment 3 of the zoom optical system according to the invention. This embodiment is applied to the optical system for use in picking up an image and provides a 3-component zoom lens whose range is about 3. The numerical data for this lens are shown below.

|  | W | M | T |
|---|---|---|---|
| Horizontal Semifield | 26.3 | 18.2 | 9.3 |
| Vertical Semifield | 20.3 | 13.9 | 7.0 |
| Aperture Diameter | 2.5 | 2.5 | 2.5 |

Image Size in min: (H × V) = 4.8 × 3.6
Optical Size at W: (XxYxZ) = 11.8 × 41.2 × 55.7

| i | Yi | ZI(W) | $\Theta$i | Di | Ndi | vdi | Sur. |
|---|---|---|---|---|---|---|---|
| 1 | 0.00 | 0.00 | 0.00 | 5.12 | 1 |  | Stop |

First Optical Element B1:

| 2 | 0.00 | 5.12 | 0.00 | 7.50 | 1.58310 | 30.20 | R |
|---|---|---|---|---|---|---|---|
| 3 | 0.00 | 12.62 | 25.00 | 11.00 | 1.58310 | 30.20 | L |
| 4 | −8.43 | 5.55 | 3.29 | 10.00 | 1.58310 | 30.20 | L |
| 5 | −15.30 | 12.82 | −15.05 | 9.50 | 1.58310 | 30.20 | L |
| 6 | −17.49 | 3.57 | −13.42 | 10.00 | 1.58310 | 30.20 | L |
| 7 | −23.94 | 11.22 | 2.15 | 10.00 | 1.58310 | 30.20 | L |
| 8 | −30.94 | 4.08 | 22.22 | 7.99 | 1.58310 | 30.20 | L |
| 9 | −30.94 | 12.06 | 0.00 | Var. | 1 |  | R |

Second Optical Element B2:

| 10 | −30.94 | 27.17 | 0.00 | 1.97 | 1.56873 | 63.16 | R |
|---|---|---|---|---|---|---|---|
| 11 | −30.94 | 29.15 | 0.00 | 0.10 | 1 |  | R |
| 12 | −30.94 | 29.25 | 0.00 | 1.68 | 1.62041 | 60.27 | R |
| 13 | −30.94 | 30.93 | 0.00 | 0.10 | 1 |  | R |
| 14 | −30.94 | 31.03 | 0.00 | 1.99 | 1.62041 | 60.27 | R |
| 15 | −30.94 | 33.02 | 0.00 | 0.10 | 1 |  | R |
| 16 | −30.94 | 33.12 | o.00 | 2.36 | 1.62280 | 57.06 | R |
| 17 | −30.94 | 35.48 | 0.00 | 0.10 | 1 |  | R |
| 18 | −30.94 | 35.58 | 0.00 | 0.50 | 1.72151 | 29.24 | R |
| 19 | −30.94 | 36.08 | 0.00 | Var. | 1 |  | R |

Third Optical Element B3:

| 20 | −30.94 | 48.80 | 0.00. | 1.48 | 1.58913 | 61.18 | R |
|---|---|---|---|---|---|---|---|
| 21 | −30.94 | 50.28 | 0.00 | 0.10 | 1 |  | R |
| 22 | −30.94 | 50.38 | 0.00 | 1.58 | 1.58913 | 61.18 | R |
| 23 | −30.94 | 51.96 | 0.00 | 0.1D | 1 |  | R |
| 24 | −30.94 | 52.06 | 0.00 | 2.76 | 1.60729 | 59.37 | R |
| 25 | −30.94 | 54.82 | 0.00 | 3.20 | 1.75520 | 27.51 | R |
| 26 | −30.94 | 58.02 | 0.00 | 0.10 | 1 |  | R |
| 27 | −30.94 | 58.12 | 0.00 | 0.50 | 1.59551 | 39.28 | R |
| 28 | −30.94 | 58.62 | 0.00 | Var. | 1 |  | R |
| 29 | −30.94 | 61.58 | 0.00 | 0.00 | 1 |  | I.P. |

|  | N | M | T |
|---|---|---|---|
| D9 | 15.11 | 4.81 | 6.79 |
| D19 | 12.71 | 10.22 | 3.53 |
| D28 | 2.96 | 15.75 | 20.46 |

R 1 + up to R 9: Zi(M) = Zi(W)
Zi(T) = Zi(W)
R10 + up to R19: Zi(M) = Zi(W) − 10.30
Zi(T) = Zi(W) − 8.32
R20 + up to R28: Zi(M) = Zi(W) − 12.79
Zi(T) = Zi(W) − 17.50
R29: Zi(M) = Zi(W)
Zi(T) = Zi(W)

Shape of Spherical Surface:

R 2 Surface: $R_2$ = −9.470
R 9 Surface: $R_9$ = 12.397
R10 Surface: $R_{10}$ = −18.096
R11 Surface: $R_{11}$ = −12.488
R12 Surface: $R_{12}$ = −22.656
R13 Surface: $R_{13}$ = −11.326
R14 Surface: $R_{14}$ = 39.448
R15 Surface: $R_{13}$ = −16.896
R16 Surface: $R_{16}$ = 7.231
R17 Surface: $R_{17}$ = −53.267
R18 Surface: $R_{18}$ = −29.796
R19 Surface: $R_{19}$ = 6.222
R20 Surface: $R_{20}$ = −103.294
R21 Surface: $R_{21}$ = −13.173
R22 Surface: $R_{22}$ = 21.609
R23 Surface: $R_{23}$ = −56.334
R24 Surface: $R_{24}$ = 19.368
R25 Surface: $R_{25}$ = −9.154
R26 Surface: $R_{28}$ = −35.784
R27 Surface: $R_{27}$ = 7.883
R28 Surface: $R_{28}$ = 7.084

Shape of Aspheric Surface:

R 3: a = −1.29771e+01    b = −1.91952e+01    t = 2.50000e+01
$C_{03}$ = 2.25585e−05    $C_{21}$ = −2.14047e−04
$C_{04}$ = 2.44891e−08    $C_{22}$ = −2.05123e−05    $C_{41}$ = 1.18194e−05
R 4: a = −1.29087e+01    b = −8.14895e+00    t = −4.67120e+01
$C_{03}$ = −5.33084e−04    $C_{21}$ = 1.13391e−03
$C_{04}$ = −2.45084e−06    $C_{22}$ = −2.01069e−04    $C_{40}$ = 1.53466e−03
R 5: a = −1.83631e+01    b = −2.14773e+01    t = 2.83707e+01
$C_{03}$ = 3.66045e−05    C2 = 2.04110e−04
$C_{04}$ = −4.32368e−07    $C_{22}$ = −8.35352e−06    $C_{41}$ = 1.98574e−05
R 6: a = −1.86729e+00    b = 1.86042e+00    t = −2.67346e+01
$C_{03}$ = 1.77221e−04    $C_{21}$ = 7.97292e−04
$C_{04}$ = −1.31000e−05    $C_{22}$ = −4.24244e−05    $C_{40}$ = 4.17627e−05
R 7: a = 6.95459e+00    b = −9.77460e+00    t = 4.22976e+01
$C_{03}$ = 1.48091e−04    $C_{21}$ = 1.42273e−03
$C_{04}$ = 2.36193e−05    $C_{22}$ = 4.19020e−05    $C_{40}$ = 1.80643e−04
R 8: a = 2.61262e+01    b = 1.59224e+01    t = −22.2220e+01
$C_{03}$ = 4.14325e−05    $C_{21}$ = 4.47240e−04
$C_{04}$ = 3.20699e−06    $C_{22}$ = −3.07287e−05    $C_{40}$ = 1.58223e−05

In FIG. 10, the first surface R1 is a stop that is the entrance pupil. A first optical element B1 is constructed with a second surface R2 (refracting entrance surface), six curved inner reflecting surfaces R3 through R8 and a ninth surface R9 (refracting exit surface) arranged on one block. A second optical element B2 is constructed with a number of lenses with ten coaxial refracting surfaces R10 through R19. A third optical element B3 is constructed with a number of lenses with nine coaxial refracting surfaces R20 through R28. A twenty-ninth surface R29 is the image plane coincident with the image receiving surface of an image pickup device such as a CCD.

The present embodiment provides a so-called 3-unit zoom lens. The stop R1 and the first optical element B1 constitute a first lens unit. The second optical element B2 constitutes a second lens unit. The third optical element B3 constitutes a third lens unit. Of these, the second and third lens units constitute a zoom section and move in differential relation to vary the focal length.

Next, the function of forming an image with an object at infinity is described. A light beam that has passed through the stop R1 enters the first optical element B1. In the interior of the first optical element B1, the light beam is refracted by the second surface R2, then reflected from the third surface R3, the fourth surface R4, the fifth surface R5, the sixth surface R6, the seventh surface R7 and the eighth surface R8 and then refracted by the ninth surface R9, exiting from the first optical element B1. During this time, the light beam is once focused to form an intermediate image in the neighborhood of the fourth surface R4. Further, a second image is formed in the space between the first optical element B1 and the second optical element B2.

The light beam then enters the second optical element B2. In the interior of the second optical element B2, the light beam is refracted by the surfaces R10 through R19 and then exits therefrom. At this time, the principal ray of the light beam is focused behind the nineteenth surface R19 to form a pupil.

Next, the light beam that has exited from the second optical element B2 enters the third optical element B3. In the interior of the third optical element B3, the light beam is refracted by the surfaces R20 through R28, and exits therefrom, reaching the twenty-ninth surface or plane R29 on which the final image is formed.

Next, the operation of varying the image magnification is described. The first optical element B1 remains stationary during zooming. The second optical element B2 first moves to the minus direction in the Z axis as zooming goes from the wide-angle end toward the telephoto end, and then to the plus direction in the Z axis. The third optical element B3 simultaneously moves to the minus direction in the Z axis. The image plane or the twenty-ninth surface R29 does not move during zooming.

By zooming from the wide-angle end to the telephoto end, the separation between the first optical element B1 and the second optical element B2 first narrows and then widens, the separation between the second optical element B2 and the third optical element B3 narrows, and the separation between the third optical element B3 and the image plane R29 widens. Also, the length of the optical path of the entire system from the first surface R1 to the image plane R29 is kept constant throughout the entire zooming range.

In the present embodiment, the entering and exiting reference axes of the first optical element B1 are parallel with each other and oriented to the same direction. The second optical element B2 and the third optical element B3 which perform the function of varying the image magnification have their reference axes in coincidence with the optical axes thereof, which are common with each other. The entering and exiting reference axes of each of the second and third optical elements B2 and B3 are oriented to the same direction.

Figure 11:
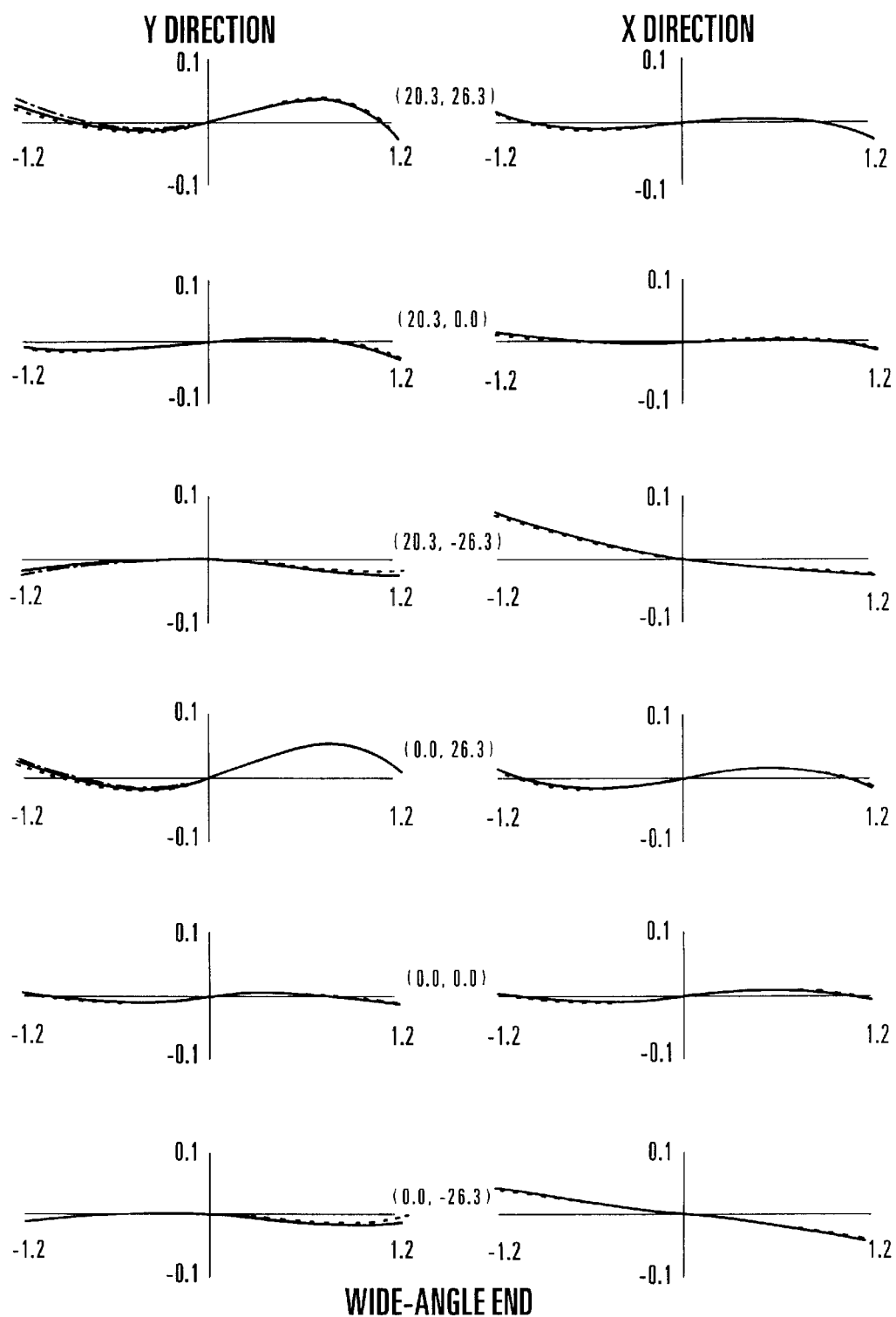
FIG. 11 shows graphs of the lateral aberrations of the embodiment 3 in the wide-angle end.
Figure 12:
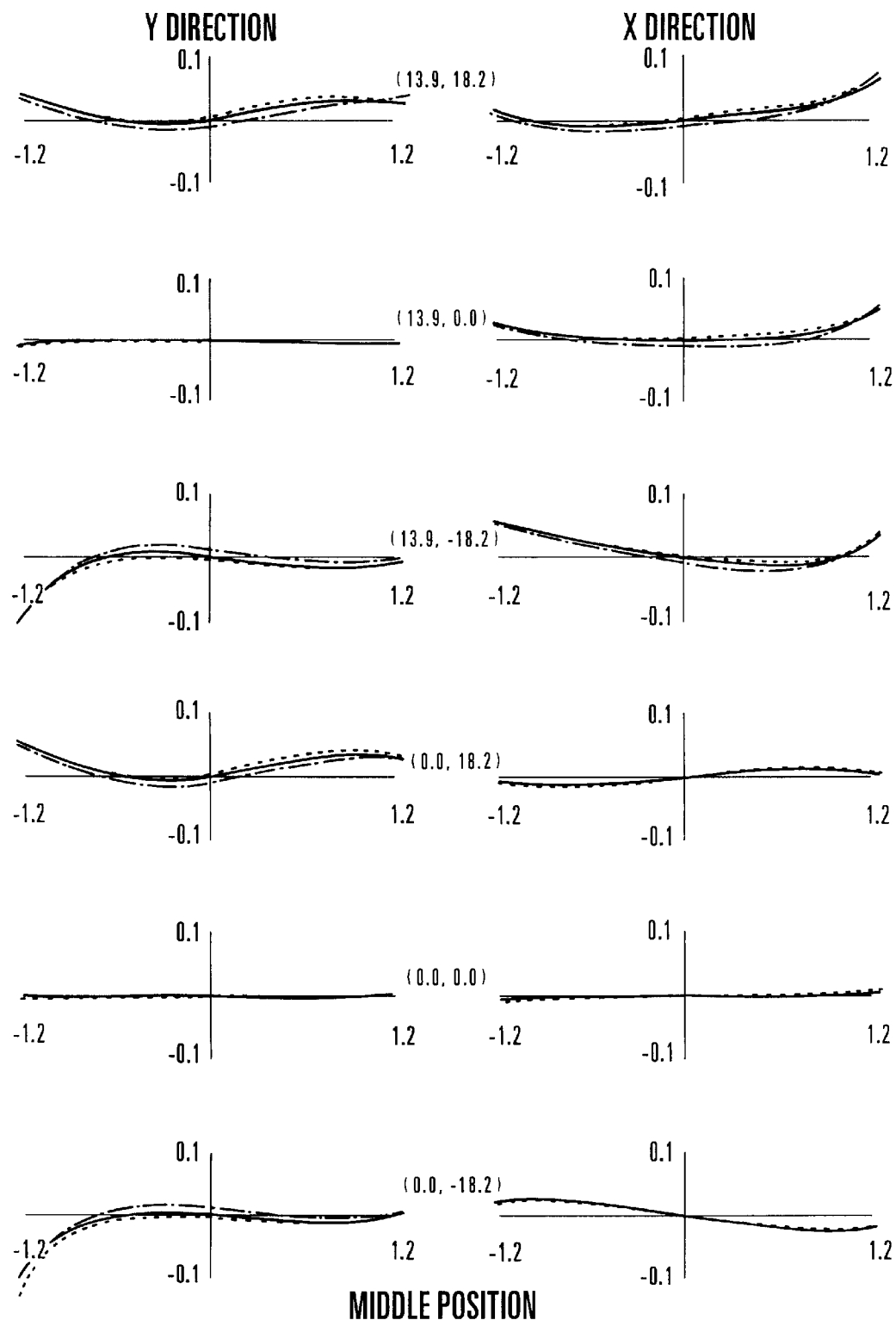
FIG. 12 shows graphs of the lateral aberrations of the embodiment 3 in a middle position.
Figure 13:
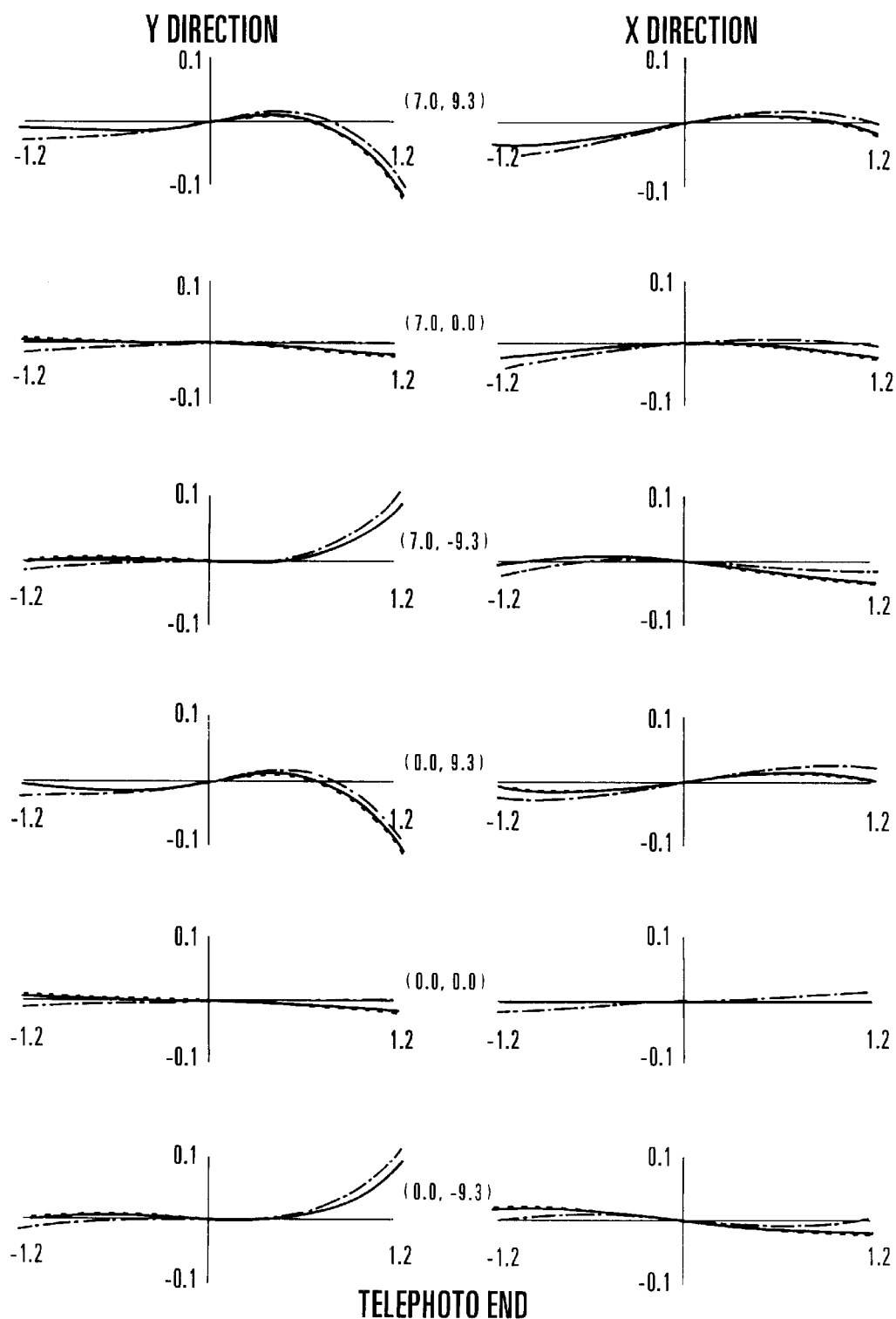
FIG. 13 shows graphs of the lateral aberrations of the embodiment 3 in the telephoto end.

The lateral aberrations of the zoom optical system of the present embodiment are shown in the graphs of FIGS. 11, 12 and 13.

For the focusing purposes, the stop R1 and the first optical element B1 are moved in unison to the Z axis to suit different object distances.

An advantage of the present embodiment arises from the facts that the stop R1 is disposed on the object side of the zoom optical system and that two images of an object are formed in the interior of the first optical element B1 and behind the first optical element B1. By this arrangement, the effective diameter of each of the surfaces of the first optical element B1 is shortened. This leads to minimize the dimension in the X axis. The optical element of compact form is thus obtained.

Another advantage arises from the fact that the first optical element B1 is provided with a plurality of inner reflecting surfaces which are given proper refractive powers and arranged in decentered relation. This allows the optical path to be bent to a desired shape without having to mutilate the light beam in passing through the zoom optical system. The total length in the Z direction is thus shortened.

Yet another advantage arising from the fact that the first optical element Bi has its reflecting surfaces formed on a rigid transparent body is that the reflecting surfaces can be positioned in a uniform tolerance (assembling tolerance) which greatly affects the optical performance. The optical system thus little suffers any loss of positioning accuracy with aging.

Further, the zoom optical system is made up by employing two different types of optical elements in good combination, one of which has a plurality of reflecting surfaces formed in unison and the other of which is constructed with the coaxial refracting surfaces (coaxial optical element). As compared with the case where the zoom optical system is constructed only with the reflecting surfaces arranged in decentered relation, the produced amount of decentering aberrations is more suppressed by having the coaxial optical element made to share the refractive power. The use of the optical element which is composed of coaxial refracting spherical surfaces facilitates the easiness of correcting all aberrations.

Furthermore, such an optical element of coaxial refracting spherical surfaces is easy to manufacture.

Although the foregoing embodiments have been described in connection with the optical element of reflecting surfaces on the one block which is fixed and the coaxial parts which move to effect zooming, variations may be made by fixing the coaxial parts and moving the optical element of reflecting surfaces on the one block to effect zooming. An example of such a variation is described below.

(Embodiment 4)

Figure 14:
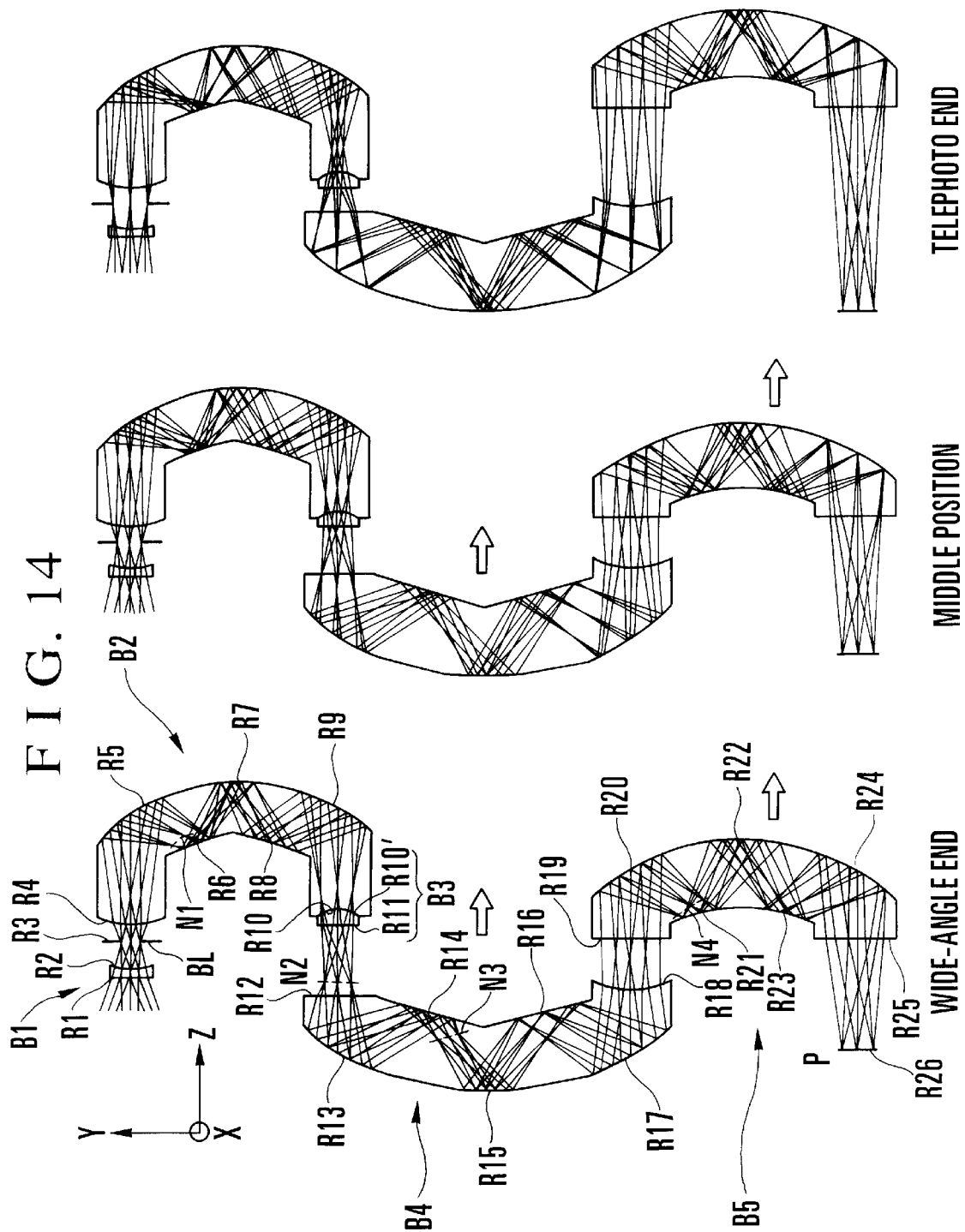
FIG. 14 shows sectional views of an embodiment 4 of the zoom optical system according to the invention with the optical paths shown in the YZ plane.

FIG. 14 shows sectional views in the YZ plane of an embodiment 4 of the zoom optical system according to the invention. This embodiment is applied to the optical system for use in picking up an image and provides a 3-component zoom lens whose range is about 3. The numerical data for this lens are shown below.

|  | W | M | T |
|---|---|---|---|
| Horizontal Semifield | 26.0 | 18.0 | 9.2 |
| Vertical Semifield | 20.0 | 13.6 | 6.9 |
| Aperture Diameter | 2.0 | 2.5 | 3.6 |

| Image Size in mm: | (H × V) = 4.8 × 3.6 |
| Optics Size at W: | (XxYxZ) = 13.6 × 95.6 × 36.9 |

| i | Yi | Zi(W) | Θi | Di | Ndi | vdi | Sur. |
|---|---|---|---|---|---|---|---|
| First Optical Element B1: | | | | | | | |
| 1 | 0.00 | 0.00 | 0.00 | 1.00 | 1.49700 | 81.61 | R |
| 2 | 0.00 | 1.00 | 0.0c | 3.00 | 1 |  | R |
| 3 | 0.00 | 4.00 | 0.00 | Var. | 1 |  | Stop |
| Second Optical Element B2: | | | | | | | |
| 4 | 0.00 | 6.00 | 0.00 | 13.00 | 1.58312 | 59.37 | R |
| 5 | 0.00 | 19.00 | 34.00 | 9.00 | 1.58312 | 59.37 | L |
| 6 | −8.34 | 15.63 | 19.00 | 9.00 | 1.58312 | 59.37 | L |
| 7 | −12.84 | 23.42 | 0.00 | 9.00 | 1.58312 | 59.37 | L |
| 8 | −17.34 | 15.63 | −15.00 | 9.00 | 1.53312 | 59.37 | L |
| 9 | −25.14 | 20.13 | −30.00 | 12.00 | 1.58312 | 59.37 | L |
| 10 | −25.14 | 8.13 | 0.00 | 0.00 | 1 |  | R |
| Third Optical Element B3: | | | | | | | |
| 10' | −25.14 | 8.13 | 0.00 | 2.00 | 1.67032 | 32.07 | R |
| 11 | −25.14 | 6.13 | 0.00 | Var. | 1 |  | R |
| Fourth Optical Element B4: | | | | | | | |
| 12 | −25.14 | −2.03 | 0.00 | 7.00 | 1.58313 | 59.37 | R |
| 13 | −25.14 | −9.03 | −32.00 | 12.00 | 1.58313 | 59.37 | L |
| 14 | −35.92 | '−3.77 | −14.00 | 12.00 | 1.58313 | 59.37 | L |
| 15 | −42.98 | −13.48 | 0.00 | 12.00 | 1.58313 | 59.37 | L |
| 16 | −50.03 | −3.77 | 14.00 | 12.00 | 1.58313 | 59.37 | L |
| 17 | −60.82 | −9.03 | 32.00 | 7.00 | 1.58113 | 59.37 | L |
| 18 | −60.82 | −1.03 | 0.00 | Var. | 1 |  | R |

-continued

Fifth Optical Element B5:

| 19 | −60.82 | 5.03 | 0.00 | 8.00 | 1.58313 | 59.37 | R |
| 20 | −60.82 | 13.03 | 30.00 | 10.00 | 1.58313 | 59.37 | L |
| 21 | −69.48 | 8.03 | 15.00 | 10.00 | 1.58313 | 59.37 | L |
| 22 | −74.48 | 16.69 | 0.00 | 10.00 | 1.58313 | 59.37 | L |
| 23 | −79.48 | 8.03 | −15.00 | 10.00 | 1.58313 | 59.37 | L |
| 24 | −88.14 | 13.03 | −30.00 | 8.00 | 1.58313 | 59.37 | L |
| 25 | −88.14 | 5.03 | 0.00 | Var. | 1 | | R |
| 26 | −88.14 | −6.32 | 0.00 | 1.80 | 1 | | I.P. |

| | W | M | T |
|---|---|---|---|
| D 3 | 2.00 | 2.00 | 2.00 |
| D11 | 8.16 | 5.68 | 3.02 |
| D18 | 6.06 | 6.32 | 12.24 |
| D25 | 11.35 | 14.09 | 22.67 |

R 1 + up to R11: $Zi(M) = Zi(W)$
$Zi(T) = Zi(W)$
R12 + up to R18: $Zi(M) = Zi(W) + 2.48$
$Zi(T) = Zi(W) + 5.14$
R19 + up to R25: $Zi(M) = Zi(W) + 2.74$
$Zi(T) = Zi(W) + 11.32$
R26: $Zi(M) = Zi(W)$
$Zi(T) = Zi(W)$

Shape of Spherical Surface:

R 1 Surface: $R_1 = \infty$
R 2 Surface: $R_2 = 10.000$
R 4 Surface: $R_4 = 10.000$
R10 Surface: $R_{10} = -3.796$
R11 Surface: $R_{11} = 113.237$
R12 Surface: $R_{12} = 96.928$
R18 Surface: $R_{18} = 10.281$
R19 Surface: $R_{19} = -68.222$
R25 Surface: $R_{25} = \infty$ Shape of Aspheric Surface:

R 5: $a = \infty$ $b = \infty$ $t = 0$.
$C_{02} = -2.77957e-02$ $C_{20} = -3.61721e-02$
$C_{03} = 2.17709e-04$ $C_{21} = 8.17518e-04$
$C_{04} = 4.81535e-05$ $C_{22} = -2.24283e-04$ $C_{40} = -5.50769e-05$
R 6: $a = \infty$ $b = \infty$ $t = 0$.
$C_{02} = -2.07844e-03$ $C_{20} = -3.13275e-02$
$C_{03} = -1.20110e-03$ $C_{21} = -7.31324e-03$
$C_{04} = -1.45746e-04$ $C_{22} = -9.98634e-04$ $C_{40} = -2.62001e-04$
R 7: $a = \infty$ $b = \infty$ $t = 0$.
$C_{02} = -2.65330e-02$ $C_{20} = -4.37591e-02$
$C_{03} = 2.37808e-06$ $C_{21} = -9.02645e-06$
$C_{04} = -1.21344e-05$ $C_{22} = -8.82376e-05$ $C_{40} = -9.77118e-05$
R 8: $a = \infty$ $b = \infty$ $t = 0$.
$C_{02} = -5.49968e-03$ $C_{20} = -5.00091e-02$
$C_{03} = 1.23568e-03$ $C_{21} = 6.67246e-03$
$C_{04} = -5.38006e-05$ $C_{22} = -3.35556e-04$ $C_{40} = -3.23857e-04$
R 9: $a = \infty$ $b = \infty$ $t = 0$.
$C_{02} = -1.86844e-02$ $C_{20} = -3.77602e-02$
$C_{03} = 4.19348e-04$ $C_{21} = 6.72125e-04$
$C_{04} = -6.12034e-05$ $C_{22} = 3.47535e-05$ $C_{40} = -5.09619e-05$
R13: $a = \infty$ $b = \infty$ $t = 0$.
$C_{02} = 2.26678e-02$ $C_{20} = 2.41426e-02$
$C_{03} = -2.57750e-04$ $C_{21} = 1.16383e-03$
$C_{04} = -2.40426e-05$ $C_{22} = -7.46204e-05$ $C_{40} = 2.82412e-05$
R14: $a = \infty$ $b = \infty$ $t = 0$.
$C_{02} = -4.00972e-03$ $C_{20} = 7.14507e-03$
$C_{03} = -4.46529e-04$ $C_{21} = -2.31087e-03$
$C_{04} = -2.56127e-05$ $C_{22} = -1.36947e-04$ $C_{40} = -1.25987e-04$
R15: $a = \infty$ $b = \infty$ $t = 0$.
$C_{02} = -1.41059e-02$ $C_{20} = 2.9646Se-02$
$C_{03} = -8.17957e-05$ $C_{21} = 9.43283e-04$
$C_{04} = -1.06545e-05$ $C_{22} = -2.82343e-05$ $C_{40} = 4.45663e-05$
R16: $a = \infty$ $b = \infty$ $t = 0$.
$C_{02} = -8.51071e-05$ $C_{20} = 2.53915e-02$
$C_{03} = 1.68862e-04$ $C_{21} = 3.65939e-03$
$C_{04} = -1.08096e-06$ $C_{22} = 1.80353e-04$ $C_{40} = 9.97536e-05$
R17: $a = \infty$ $b = \infty$ $t = 0$.
$C_{02} = 1.32874e-02$ $C_{20} = 2.94218e-02$
$C_{03} = -6.81885e-05$ $C_{21} = 9.64816e-04$
$C_{04} = 1.70534e-05$ $C_{22} = 4.93143e-05$ $C_{40} = -1.51564e-06$ -continued R20: $a = \infty$ $b = \infty$ $t = 0$.
$C_{02} = -1.66195e-02$ $C_{20} = -1.97204e-02$
$C_{03} = -2.82112e-04$ $C_{21} = 8.70403e-05$
$C_{04} = -3.71423e-06$ $C_{22} = -7.20107e-06$ $C_{40} = -6.70241e-06$
R21: $a = \infty$ $b = \infty$ $t = 0$.
$C_{02} = -2.13470e-02$ $C_{20} = -2.68230e-02$
$C_{03} = -7.85470e-04$ $C_{21} = 4.61286e-03$
$C_{04} = -1.61086e-04$ $C_{22} = -1.96712e-05$ $C_{40} = -6.34362e-05$
R22: $a = \infty$ $b = \infty$ $t = 0$.
$C_{02} = -2.30872e-02$ $C_{20} = -2.69354e-02$
$C_{03} = -3.03473e-06$ $C_{21} = 1.13297e-03$
$C_{04} = -3.08514e-05$ $C_{22} = 5.26162e-05$ $C_{40} = 3.43593e-05$
R23: $a = \infty$ $b = \infty$ $t = 0$.
$C_{02} = 2.42460e-02$ $C_{20} = -4.51798e-02$
$C_{03} = 3.73285e-04$ $C_{21} = -4.33871e-03$
$C_{04} = -1.89172e-04$ $C_{22} = 1.70543e-04$ $C_{40} = 3.52206e-06$
R24: $a = \infty$ $b = \infty$ $t = 0$.
$C_{02} = -1.92202e-02$ $C_{20} = -2.60605e-02$
$C_{03} = 1.04217e-04$ $C_{21} = -3.77042e-04$
$C_{04} = -1.55696e-05$ $C_{22} = -2.50258e-05$ $C_{40} = -2.42690e-05$ In FIG. 14, a first optical element B1 is in the form of a refractive lens with a first surface R1 and a second surface R2. A third surface R1 is a stop. A second optical element B2 is constructed with a fourth surface R4 (refracting entrance surface), five curved inner reflecting surfaces RS through R9 and a tenth surface R10 (refracting exit surface) arranged on one block. A third optical element B3 is in the form of a refractive lens with a 10'-th surface R10' and an eleventh surface R11. Incidentally, the second and third optical elements B2 and B3 are cemented together at their adjoining surfaces R10 and R10'.

A fourth optical element B4 is constructed with a twelfth surface R12 (refracting entrance surface), five curved inner reflecting surfaces R13 through R17 and an eighteenth surface R18 (refracting exit surface) arranged on one block. A fifth optical element B5 is constructed with a nineteenth surface R19 (refracting entrance surface), five curved inner reflecting surfaces R20 through R24 and a twenty-fifth surface R25 (refracting exit surface) arranged on one block. A twenty-sixth surface R26 is the image plane coincident with the image receiving surface of an image pickup device such as a CCD.

The present embodiment provides a so-called 3-component zoom lens. The first optical element B1, the stop R3, the second optical element B2 and the third optical element B3 constitute a first lens unit. The fourth optical element B4 constitutes a second lens unit. The fifth optical element B5 constitutes a third lens unit. Of these, the second and third lens units constitute a zoom section and vary their relative positions to vary the focal length.

Next, the function of forming an image with an object at infinity is described. A light beam that has passed through the first optical element B1 and the stop R3 successively, enters the second optical element B2. In the interior of the second optical element B2, the light beam is refracted by the fourth surface R4, then reflected from the fifth surface R5, the sixth surface R6, the seventh surface R7, the eighth surface R8 and the ninth surface R9 and then refracted by the tenth surface R10. The refracted light beam enters the third optical element B3 and is refracted by the eleventh surface R11, exiting from the third optical element B3. During this time, the light beam is focused to form an intermediate image in the neighborhood of the sixth surface R6. Further, a second image is formed in the space between the third optical element B3 and the fourth optical element B4.

The light beam then enters the fourth optical element B4. In the interior of the fourth optical element B4, the light beam is refracted by the twelfth surface R12, then reflected from the thirteenth surface R13, the fourteenth surface R14, the fifteenth surface R15, the sixteenth surface R16 and the seventeenth surface R17 and then refracted by the eighteenth surface R18. Then, the light beam exits from the fourth optical element B4. During this time, the light beam is focused to form an intermediate image in the space between the fourteenth surface R14 and the fifteenth surface R15. Further, the light beam forms a pupil in the neighborhood of the sixteenth surface R16.

Then, the light beam enters the fifth optical element B5. In the interior of the fifth optical element B5, the light beam is refracted by the nineteenth surface R19, then reflected from the twentieth surface R20, the twenty-first surface R21, the twenty-second surface R21, the twenty-third surface R23 and the twenty-fourth surface R24 and then refracted by the twenty-fifth surface R25. The light beam thus exits from the fifth optical element B5. During this time, the light beam is focused to form an intermediate image in the neighborhood of the twenty-first surface R21.

Finally, the light beam exiting from the fifth optical element B5 arrives at the twenty-sixth surface or plane R26 on which the final image is formed.

Next, the operation of varying the image magnification is described. The first unit composed of the first optical element B1, the second optical element B2 and the third optical element B3 remains stationary during zooming. The fourth optical element B4 moves to the plus direction in the Z axis as zooming goes from the wide-angle end to the telephoto end. The fifth optical element B5 simultaneously moves to the plus direction in the Z axis. The image plane or the twenty-sixth surface R26 does not move during zooming.

During zooming from the wide-angle end to the telephoto end, the separation between the third optical element B3 and the fourth optical element B4 narrows, the separation between the fourth optical element B4 and the fifth optical element B5 widens and the separation between the fifth optical element B5 and the image plane R26 widens. Also, the length of the optical path of the entire system from the first surface R1 to the image plane R26 becomes longer as zooming goes from the wide-angle end to the telephoto end.

In the present embodiment, the entering and exiting reference axes of each of the second, fourth and fifth optical elements B2, B4 and B5 are parallel with each other and oriented to opposite directions.

Figure 15:
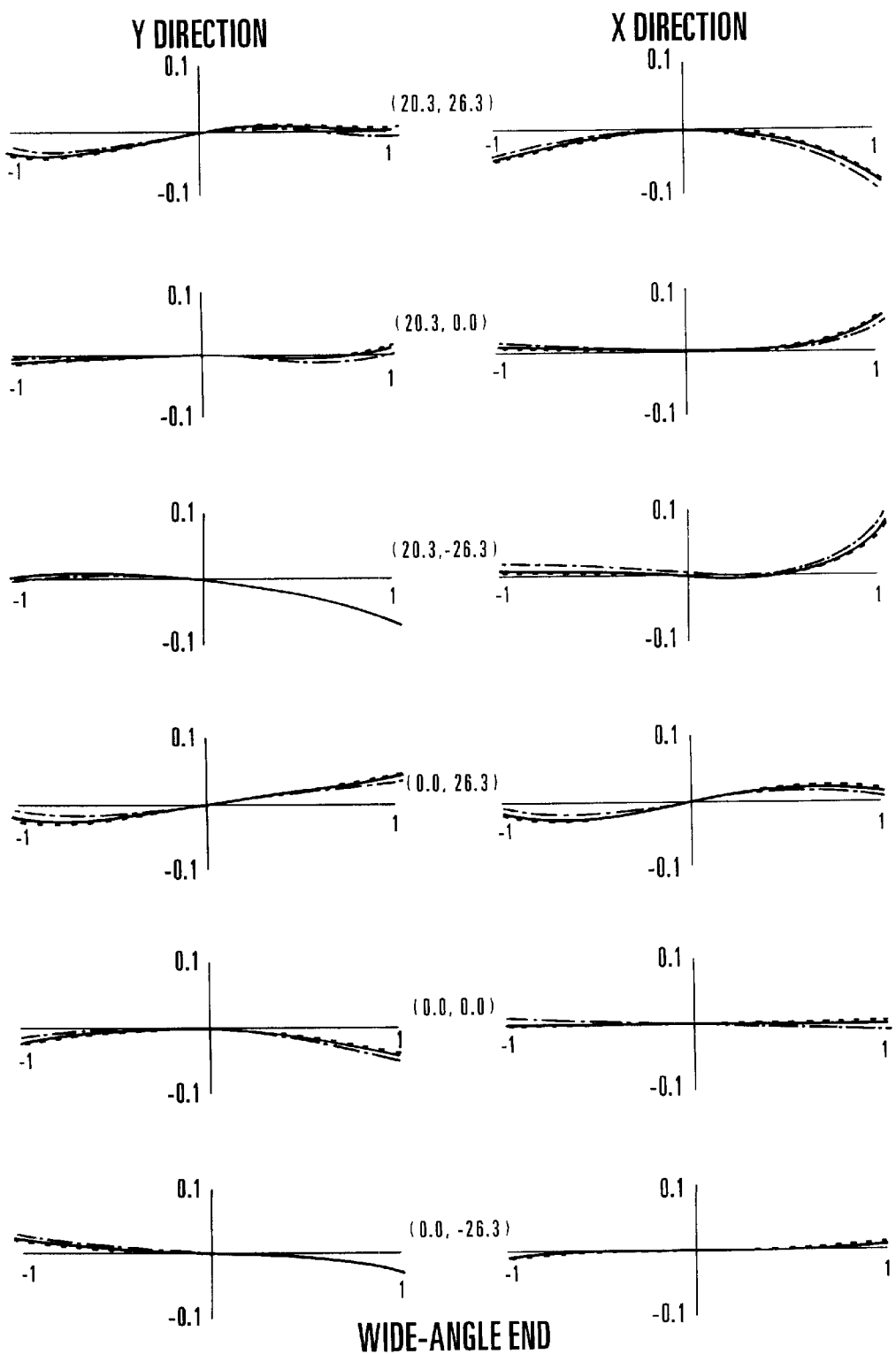
FIG. 15 shows graphs of the lateral aberrations of the embodiment 4 in the wide-angle end.
Figure 16:
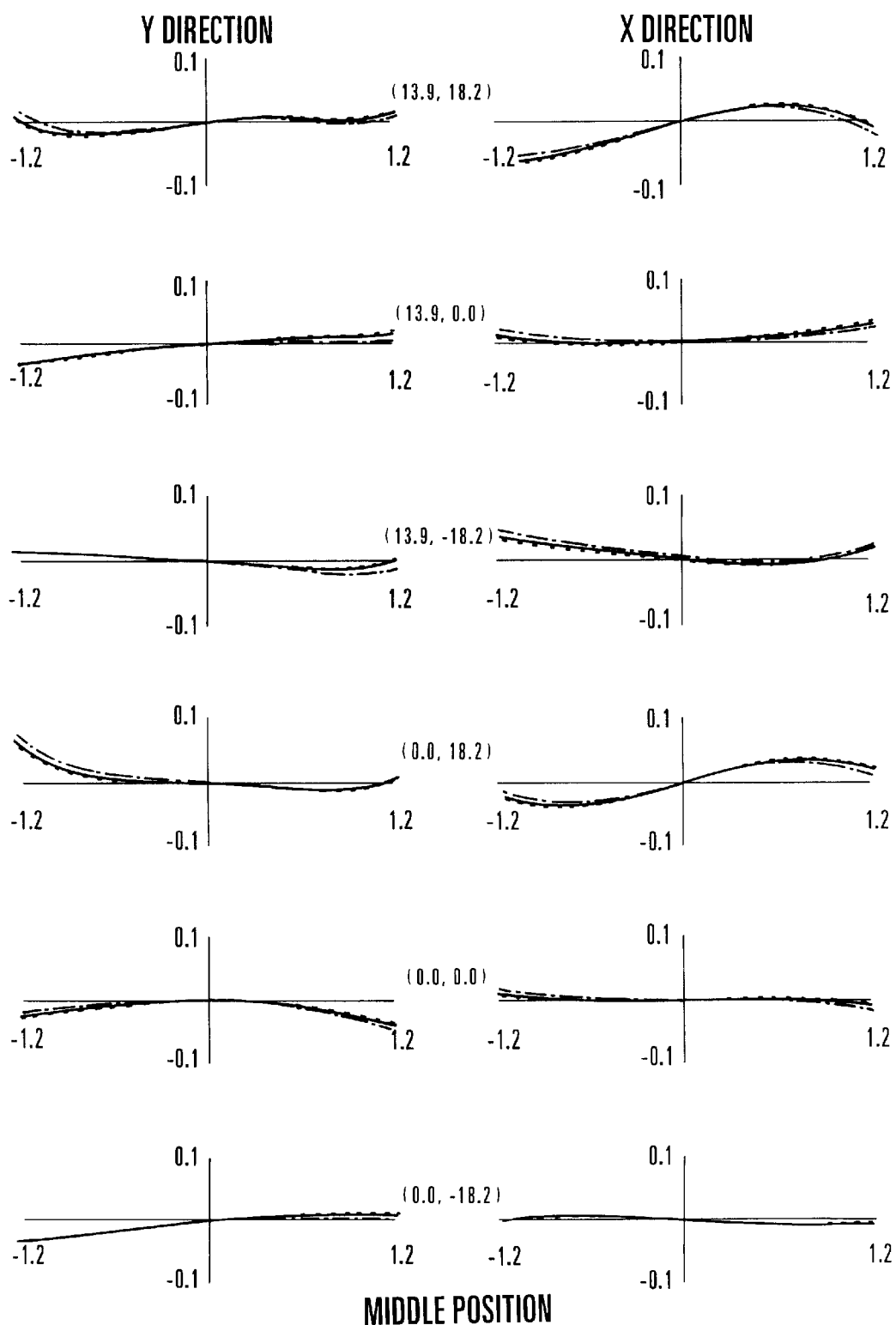
FIG. 16 shows graphs of the lateral aberrations of the embodiment 4 in a middle position.
Figure 17:
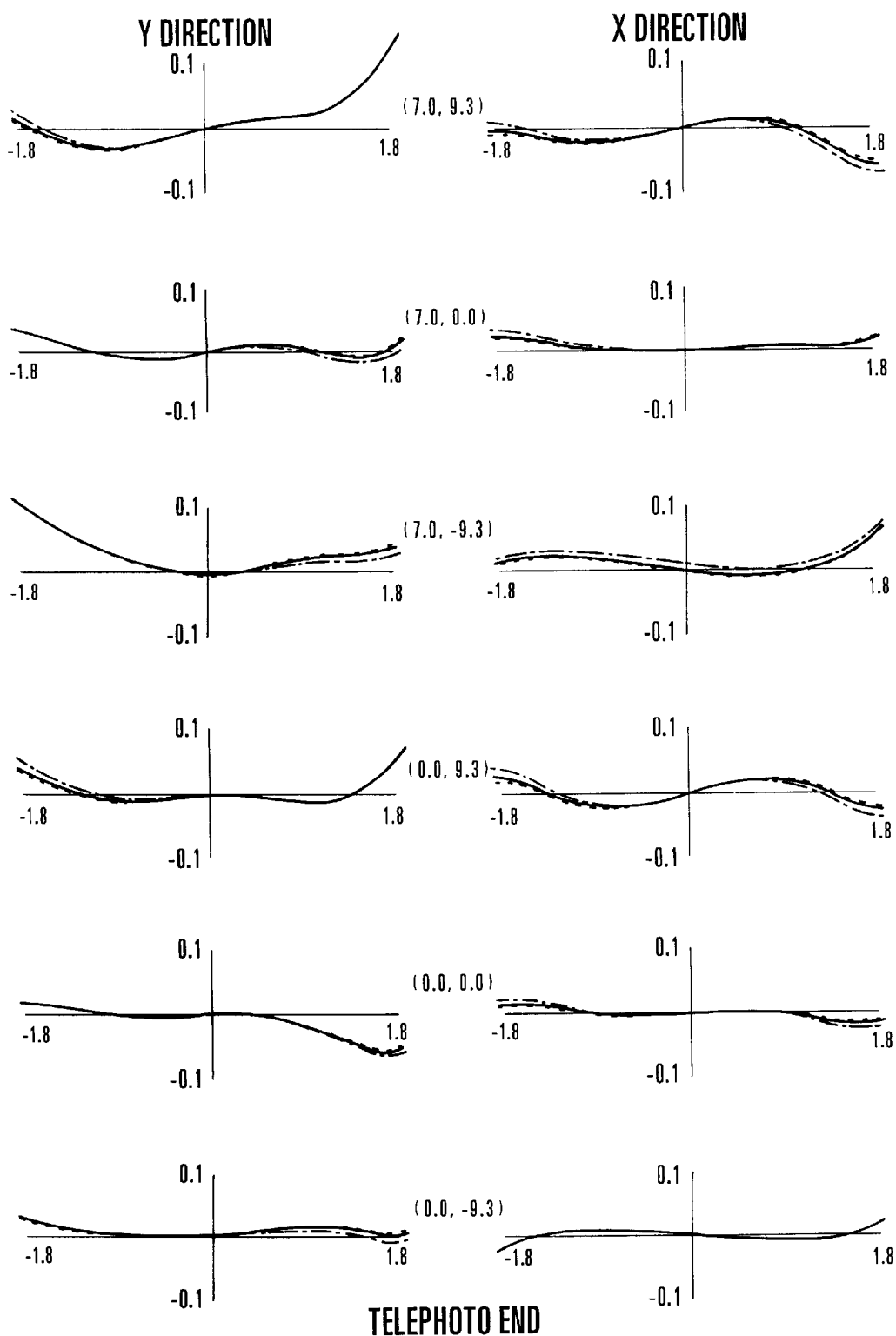
FIG. 17 shows graphs of the lateral aberrations of the embodiment 4 in the telephoto end.

The lateral aberrations of the zoom optical system of the present embodiment are shown in the graphs of FIGS. 15, 16 and 17.

For the focusing purposes, the first optical element B1 is moved to the Z axis to suit different object distances.

An advantage of the present embodiment arises from the facts that the stop R3 is disposed adjacent to the entrance surface R1 at which a light beam first enters in the zoom optical system and that an image of an object is formed in the interior of each of the second, fourth and fifth optical elements B2, B4 and B5. By this arrangement, the effective diameter of each of the surfaces of these optical elements is shortened. This leads to minimize the dimension in the X axis. The optical element of compact form is thus obtained.

Another advantage arises from the fact that the second, fourth and fifth optical elements B2, B4 and B5 each are provided with a plurality of inner reflecting surfaces which are given proper refractive powers and arranged in decentered relation. This allows the light beam inside the zoom optical system to be folded to a desired shape without causing the light beam to be blocked off in any part. The total length in the Z direction is thus shortened.

Yet another advantage arising from the fact that the second, fourth and fifth optical elements B2, B4 and B5 each have its reflecting surfaces formed on a rigid transparent body is that the reflecting surfaces can be positioned in a uniform tolerance (assembling tolerance) which greatly affects the optical performance. The optical system thus little suffers any loss of positioning accuracy with aging.

Furthermore, the zoom optical system has its first optical element B1 constructed with coaxial refracting surfaces (in the form of a coaxial optical element). Therefore, the focusing mechanism becomes simpler in structure.

Another feature of the invention is that the entering reference axis of the first optical element B1 which does not move during zooming as in the above embodiments 1 to 4 may be inclined by a certain angle with respect to that plane which has so far contained all of the reference axes, that is, the YZ plane. By this arrangement, the degree of freedom for the form of cameras can be increased.

Figure 18:
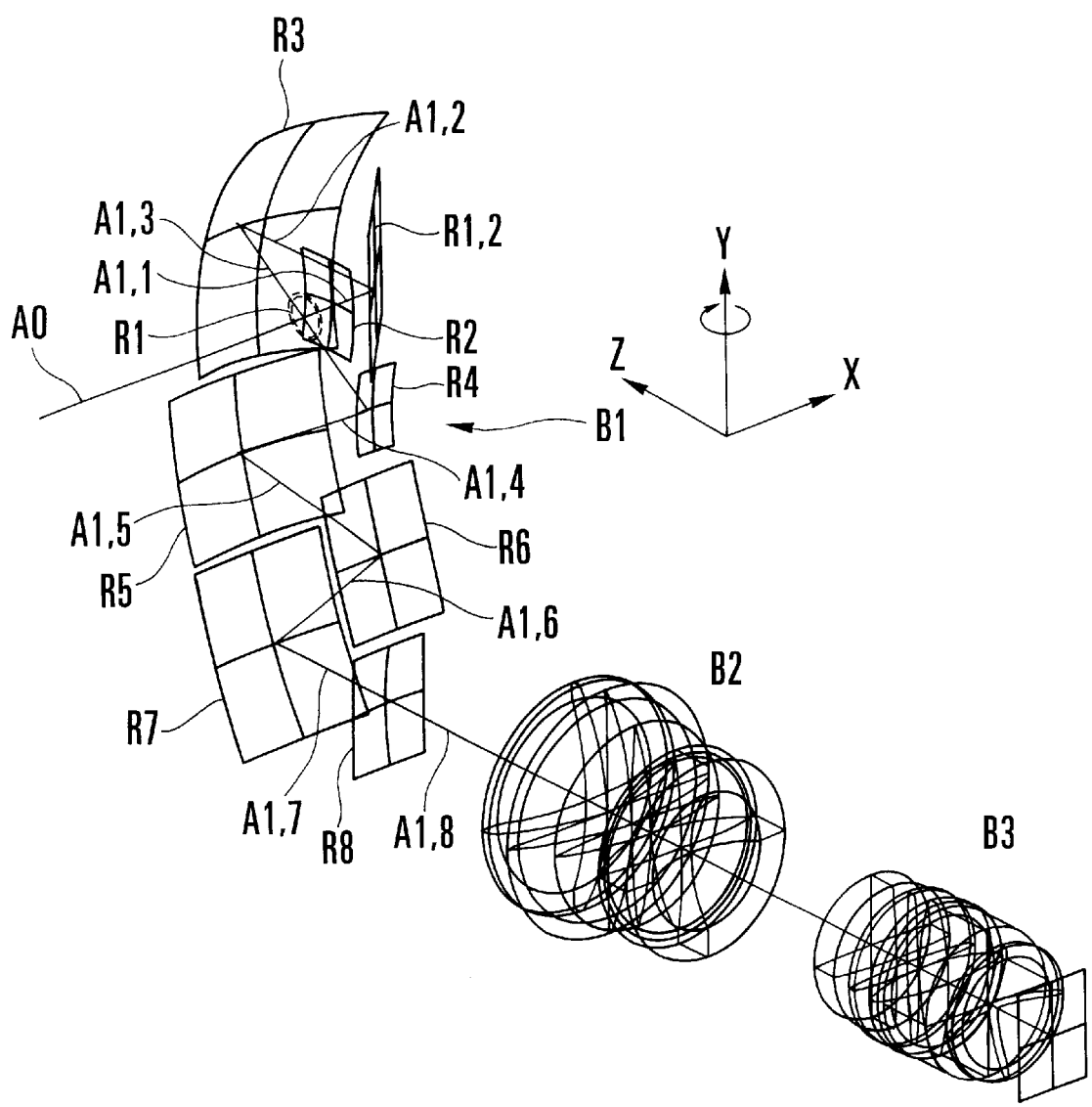
FIG. 18 is a perspective view of a zoom optical system with an entering reference axis taken in parallel to the X axis.

FIG. 18 is a perspective view of a zoom optical system with the entering reference axis oriented to parallelism with the X axis. This optical system is derived from the first embodiment 1 by providing the space between the second surface R2 and the third surface R3 with an inner reflecting mirror R1,2 of flat shape inclined 45° to the YZ plane. The entering reference axis of the first optical element Bi is thus set up in parallel to the X axis.

In FIG. 18, a first optical element B1 remains stationary during zooming, so corresponding to the first unit of the 3-unit zoom optical system. It is to be noted that the first optical element B1 is shown by its reflecting surfaces along in perspective view. A second optical element B2 and a third optical element B3 move in differential relation to vary the focal length, so constituting a zoom section. The second optical element B2 corresponds to the so-called variator and the third optical element B3 corresponds to the so-called compensator.

The second and third optical elements B2 and B3 move on one common line (the aligned optical axis of these optical elements) in the YZ plane in FIG. 18. All the reference axes of the second and third optical elements B2 and B3 lie on this line.

In this optical system, some of the reference axes within the first optical element B1 stationary during zooming, namely a reference axis A1,2 through a reference axis A1,8, must exist in the YZ plane. However, the others, i.e., a reference axis AO from the object to the stop and a reference axis A1,1 from the stop to the first reflecting surface R1,2 are not necessarily present in the plane of the reference axes (YZ plane).

In other words, the present embodiment employs the reflecting surface R1,2 for the purpose of deflecting the direction of the reference axis A0 entering from the direction of the X axis to the direction of the Z axis. In such a manner, the direction of a light beam entering the zoom optical system can be determined freely when the reflecting surface R1,2 is disposed at an appropriate point in the neighborhood of the entrance surface R2 of the first reflective block and inclined by an appropriate angle to the YZ plane in which the later reference axes are contained. This leads to a possibility of increasing the degree of freedom for the design of cameras.

(Embodiment 5)

Figure 19:
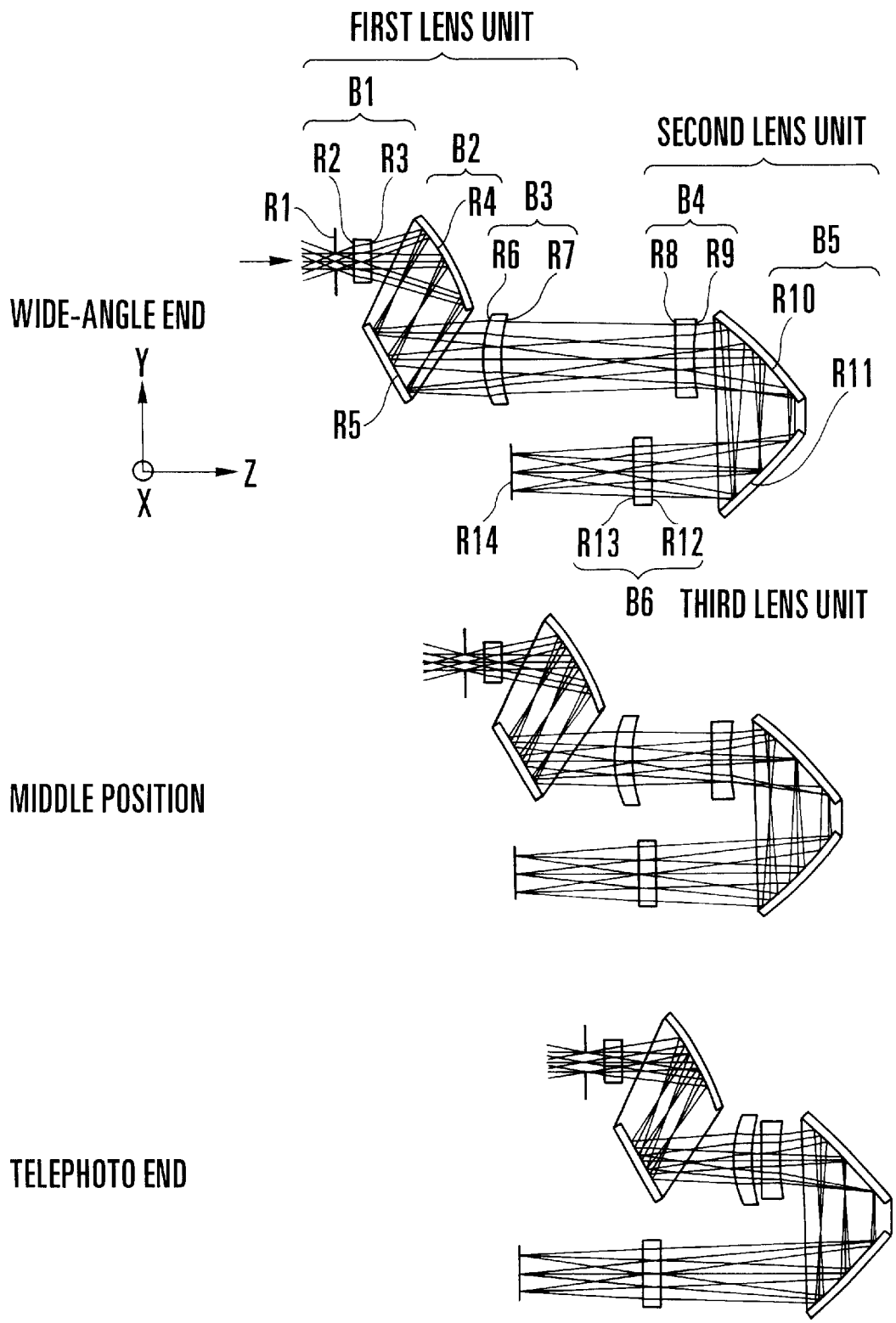
FIG. 19 shows sectional views of an embodiment 5 of the zoom optical system according to the invention with the optical paths shown in the YZ plane.

FIG. 19 shows sectional views in the YZ plane of an embodiment 5 of the zoom optical system according to the invention. This embodiment is applied to the optical system for use in picking up an image and provides a 3-component zoom lens whose range is about 2. The numerical data for the embodiment 5 are shown below.

|  | W | M | T |
|---|---|---|---|
| Horizontal Semifield | 19.1 | 13.7 | 9.8 |
| Vertical Semifield | 14.5 | 10.4 | 7.4 |
| Aperture Diameter | 1.60 | 1.80 | 2.10 |

Image Size in mm: (H × V) = 4.0 × 3.0
Optics Size at W: (X × Y × Z) = 10.2 × 30.0 × 49.9

| i | Yi | Zi (W) | θi | Di | Ndi | vdi | Sur. |
|---|---|---|---|---|---|---|---|
|   |   |   | First Lens Unit |   |   |   |   |
| 1 | 0.00 | 0.00 | 0.00 | 2.00 | 1 |   | Stop |
|   |   |   | First Optical Element B1: |   |   |   |   |
| 2 | 0.00 | 2.00 | 0.00 | 2.00 | 1.74400 | 44.70 | R |
| 3 | 0.00 | 4.00 | 0.00 | 8.00 | 1 |   | R |
|   |   |   | Second Optical Element B2: |   |   |   |   |
| 4 | 0.00 | 12.00 | 30.00 | 12.00 | 1 |   | L |
| 5 | −10.39 | 6.00 | 30.00 | 10.00 | 1 |   | L |
|   |   |   | Third Optical Element B3: |   |   |   |   |
| 6 | −10.39 | 16.00 | 0.00 | 2.00 | 1.75500 | 27.60 | R |
| 7 | −10.39 | 18.00 | 0.00 | Var. | 1 |   | R |
|   |   |   | Second Lens Unit: |   |   |   |   |
|   |   |   | Fourth Optical Element B4: |   |   |   |   |
| 8 | −10.39 | 36.98 | 0.00 | 2.00 | 1.71766 | 46.92 | R |
| 9 | −10.39 | 38.98 | 0.00 | 7.00 | 1 |   | R |
|   |   |   | Fifth Optical Element B5: |   |   |   |   |
| 10 | −10.39 | 45.98 | 45.00 | 12.00 | 1 |   | L |
| 11 | −22.39 | 45.98 | 45.00 | Var. | 1 |   | L |
|   |   |   | Third Lens Unit: |   |   |   |   |
|   |   |   | Sixth Optical Element B6: |   |   |   |   |
| 12 | −22.39 | 34.18 | 0.00 | 2.00 | 1.48994 | 68.59 | R |
| 13 | −22.39 | 32.18 | 0.00 | Var. | 1 |   | R |
| 14 | −22.39 | 18.85 | 0.00 |   | 1 |   | I.P. |

|  | W | M | T |
|---|---|---|---|
| D7 | 18.98 | 8.71 | 1.00 |
| D11 | 11.80 | 15.25 | 20.00 |
| D14 | 13.33 | 13.33 | 13.33 |

| R1 + up to R7: | $Z_i(M) = Z_i(W) + 13.73$ |
|---|---|
|   | $Z_i(T) = Z_i(W) + 26.18$ |
| R8 + up to R11: | $Z_i(M) = Z_i(W) + 3.46$ |
|   | $Z_i(T) = Z_i(W) + 8.20$ |
| R12 + up to R13: | $Z_i(M) = Z_i(W)$ |
|   | $Z_i(T) = Z_i(W)$ |
| R14: | $Z_i(M) = Z_i(W)$ |
|   | $Z_i(T) = Z_i(W)$ |

Shape of Spherical Surface

R2 Surface: $R_2 = 97.206$
R3 Surface: $R_3 = -26.032$
R6 Surface: $R_6 = 11.385$
R7 Surface: $R_7 = 15.046$
R8 Surface: $R_8 = -159.987$
R9 Surface: $R_9 = 24.470$
R12 Surface: $R_{12} = 1000.000$
R13 Surface: $R_{13} = -85.375$ Shape of Aspheric Surface:

R4:

| a = 1.45475e + 01 | b = −5.77853e + 00 | t = −2.42608e + 01 |
|---|---|---|
| $C_{03}$ = 8.63617e − 04 | $C_{21}$ = 1.60115e − 03 |   |
| $C_{04}$ = 8.13611e − 05 | $C_{22}$ = 7.31698e − 05 | $C_{40}$ = −1.34827e − 04 |

-continued

R5:

| a = −9.91101e + 01 | b = 4.27960e + 01 | t = −1.14636e + 01 |
|---|---|---|
| $C_{03}$ = 8.70976e − 05 | $C_{21}$ = 1.68477e − 04 |   |
| $C_{04}$ = −1.72354e − 04 | $C_{22}$ = −2.22388e − 04 | $C_{40}$ = −1.98849e − 04 |

R10:

| a = 4.10898e + 02 | b = −2.06186e + 01 | t = 4.55596e + 01 |
|---|---|---|
| $C_{03}$ = −1.57719e − 04 | $C_{21}$ = −4.64176e − 04 |   |
| $C_{04}$ −2.54948e − 06 | $C_{22}$ = 1.89777e − 05 | $C_{40}$ = −8.72541e − 07 |

R11:

| a = −1.26094e + 02 | b = 2.55428e + 01 | t = 4.44452e + 01 |
|---|---|---|
| $C_{03}$ = 9.65477e − 05 | $C_{21}$ = 6.18718e − 05 |   |
| $C_{04}$ = −5.69335e − 06 | $C_{22}$ = 2.19389e − 05 | $C_{40}$ = 8.07381e − 06 |

In FIG. 19, the first surface R1 is a stop that is the entrance pupil. A first optical element B1 is a refractive lens formed with a second surface R2 and a third surface R3. A second optical element B2 is formed with a reflecting fourth surface R4 and a reflecting fifth surface R5 each as a surface mirror in unison on one member. A third optical element B3 is a refractive lens formed with a sixth surface R6 and a seventh surface R7. A fourth optical element B4 is a refractive lens formed with an eighth surface R8 and a ninth surface R9. A fifth optical element B5 is formed with a reflecting tenth surface R10 and a reflecting eleventh surface R11 each as a surface mirror in unison on one member. A sixth optical element B6 is a refractive lens formed with a twelfth surface R12 and a thirteenth surface R13. A fourteenth surface R14 is the image plane coincident at the image receiving surface of an image pickup device such as a CCD.

The first to third optical elements B1, B2 and B3 constitute a first lens unit. The fourth and fifth optical elements B4 and B5 constitute a second lens unit. The sixth optical element B6 constitutes a third lens unit. Of these, the first and second lens units constitute a zoom section and vary their relative positions to vary the focal length.

Next, the function of forming an image with an object at infinity is described. A light beam that has passed through the stop R1 and the first optical element B1 successively, enters the second optical element B2. In the interior of the second optical element B2, the light beam is reflected from the fourth surface R4 and the fifth surface R5 and exits from the second optical element B2. During this time, the light beam forms an intermediate image in the neighborhood of the fifth surface R5. Then, the light beam passes through the third optical element B3.

The light beam then passes through the fourth optical element B4 and enters the fifth optical element B5. In the interior of the fifth optical element B5, the light beam is reflected from the tenth surface R10 and the eleventh surface R11 and then exits from the fifth optical element B5. During this time, the light beam forms a pupil in the space between the tenth surface R10 and the eleventh surface R11.

Then, the light beam passes through the sixth optical element B6 and forms a final image on the fourteenth surface R14.

Next, the operation of varying the image magnification is described. During zooming from the wide-angle end to the telephoto end, the first lens unit (the first to third optical elements B1, B2 and B3) moves to the plus direction in the Z axis. The second lens unit (the fourth and fifth optical elements B4 and B5), too, simultaneously moves to the plus direction in the Z axis. The sixth optical element B6 and the fourteenth surface R14 that is the image plane do not move during zooming.

By zooming from the wide-angle end to the telephoto end, the separation between the third optical element B3 and the fourth optical element B4 narrows and the separation between the fifth optical element B5 and the sixth optical element B6 widens. The separation between the sixth optical element B6 and the image plane R14 does not vary. Also, the length of the optical path of the entire system from the first surface R1 to the image plane R14 varies, becoming ever shorter as zooming goes from the wide-angle end to the telephoto end.

In the present embodiment, the entering and exiting reference axes of the second optical element B2 are parallel with each other and oriented to the same direction. The entering and exiting reference axes of the fifth optical element B5 are parallel with each other and oriented to opposite directions.

Figure 20:
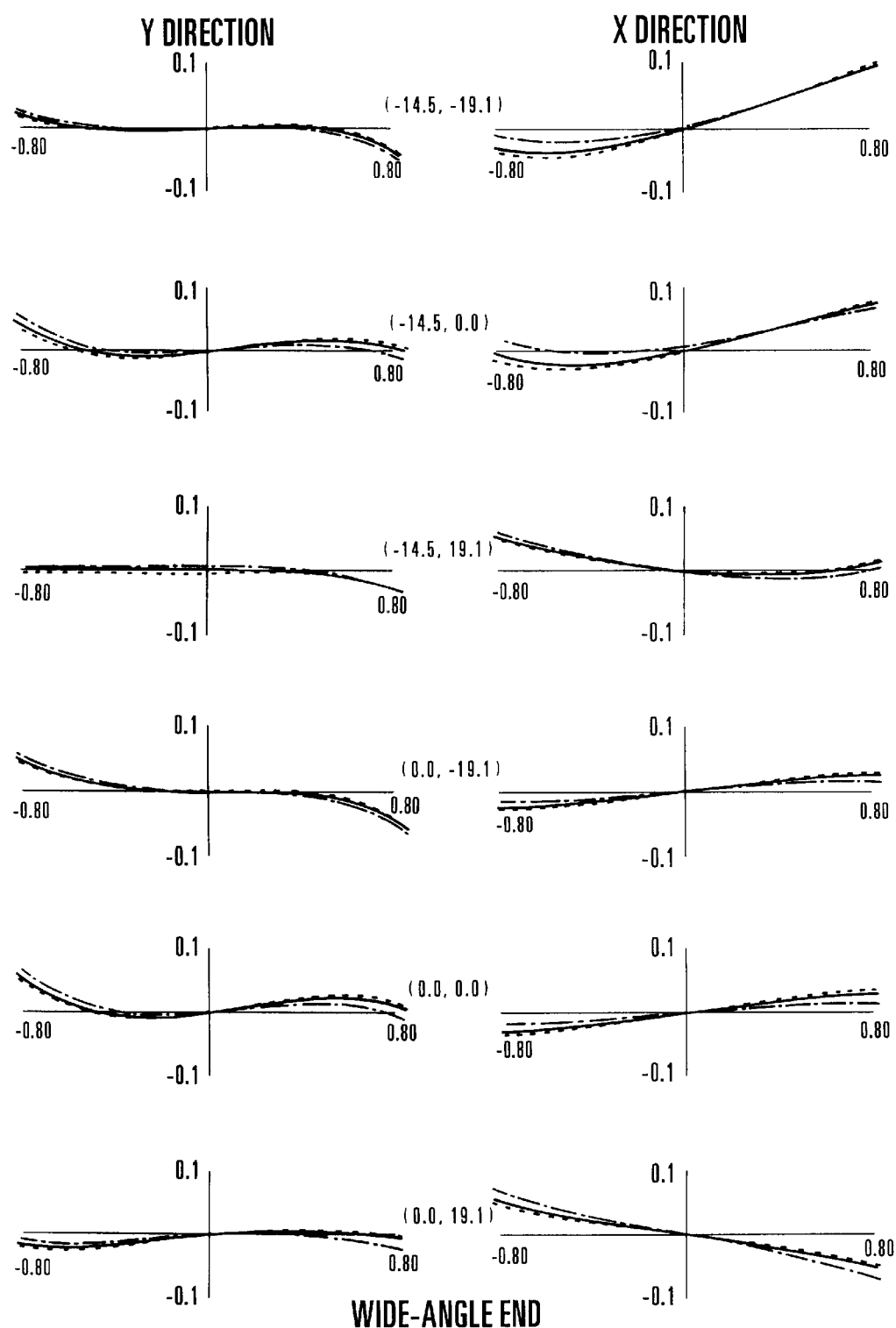
FIG. 20 shows graphs of the lateral aberrations of the embodiment 5 in the wide-angle end.
Figure 21:
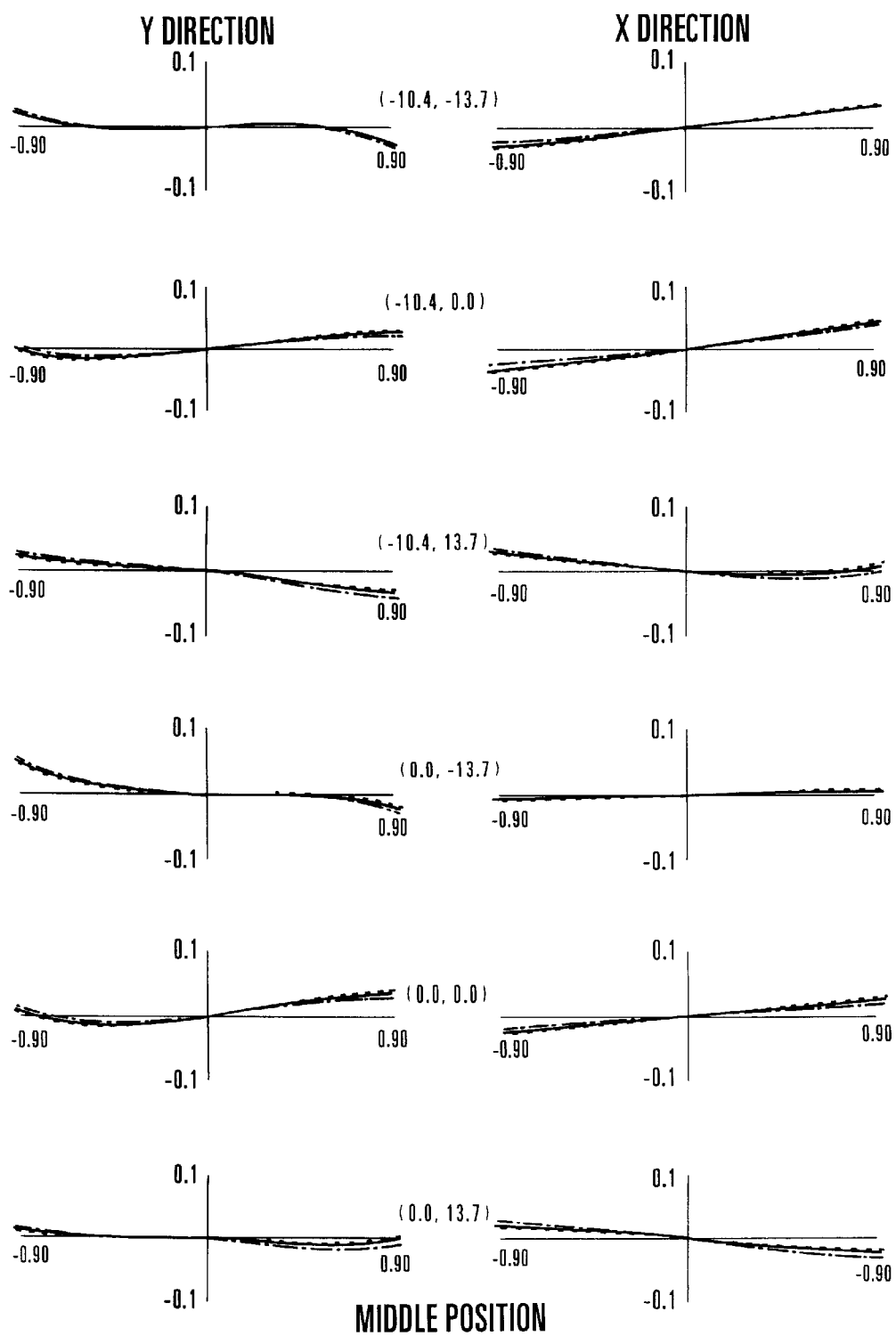
FIG. 21 shows graphs of the lateral aberrations of the embodiment 5 in a middle position.
Figure 22:
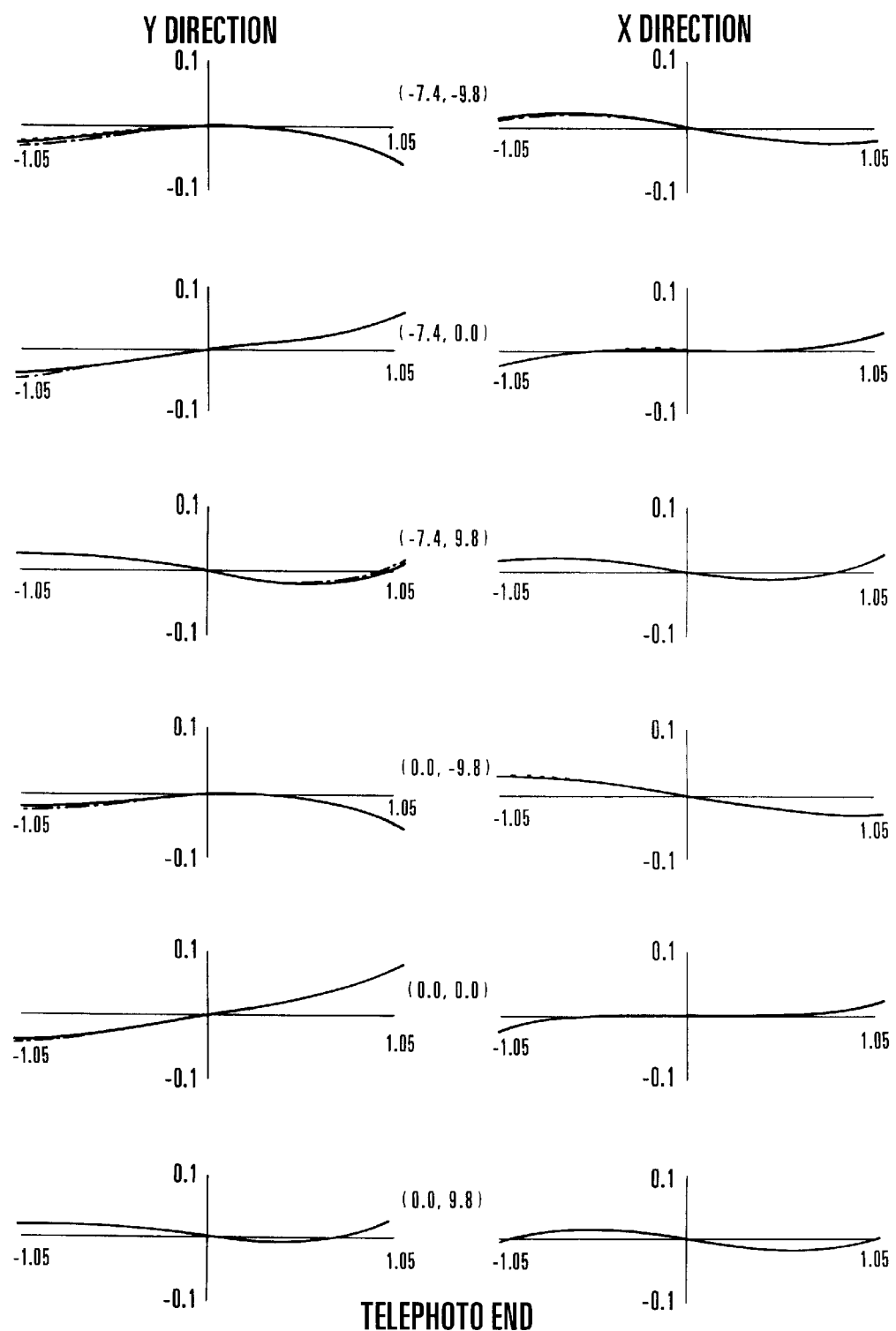
FIG. 22 shows graphs of the lateral aberrations of the embodiment 5 in the telephoto end.
Figure 23:
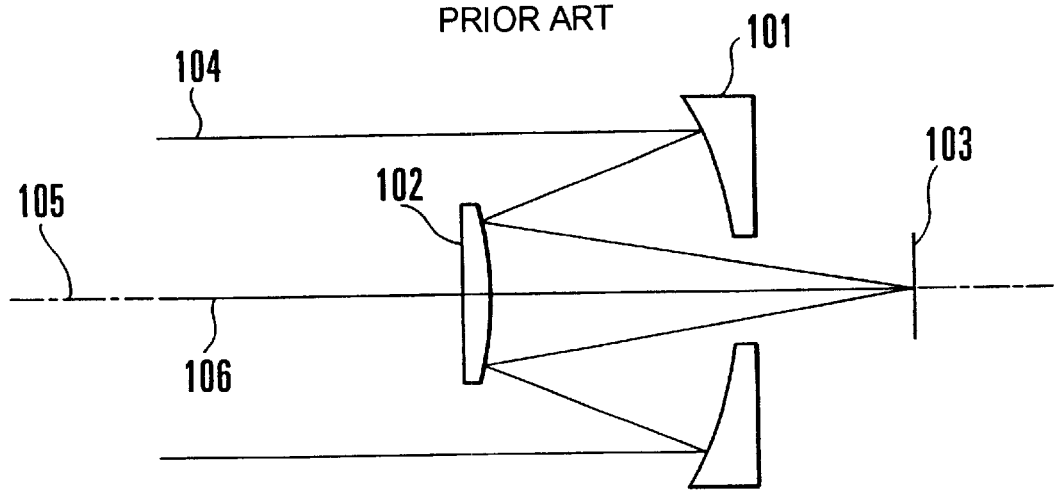
FIG. 23 is a diagram of the basic configuration of the Cassegrain type reflecting telescope.
Figure 24:
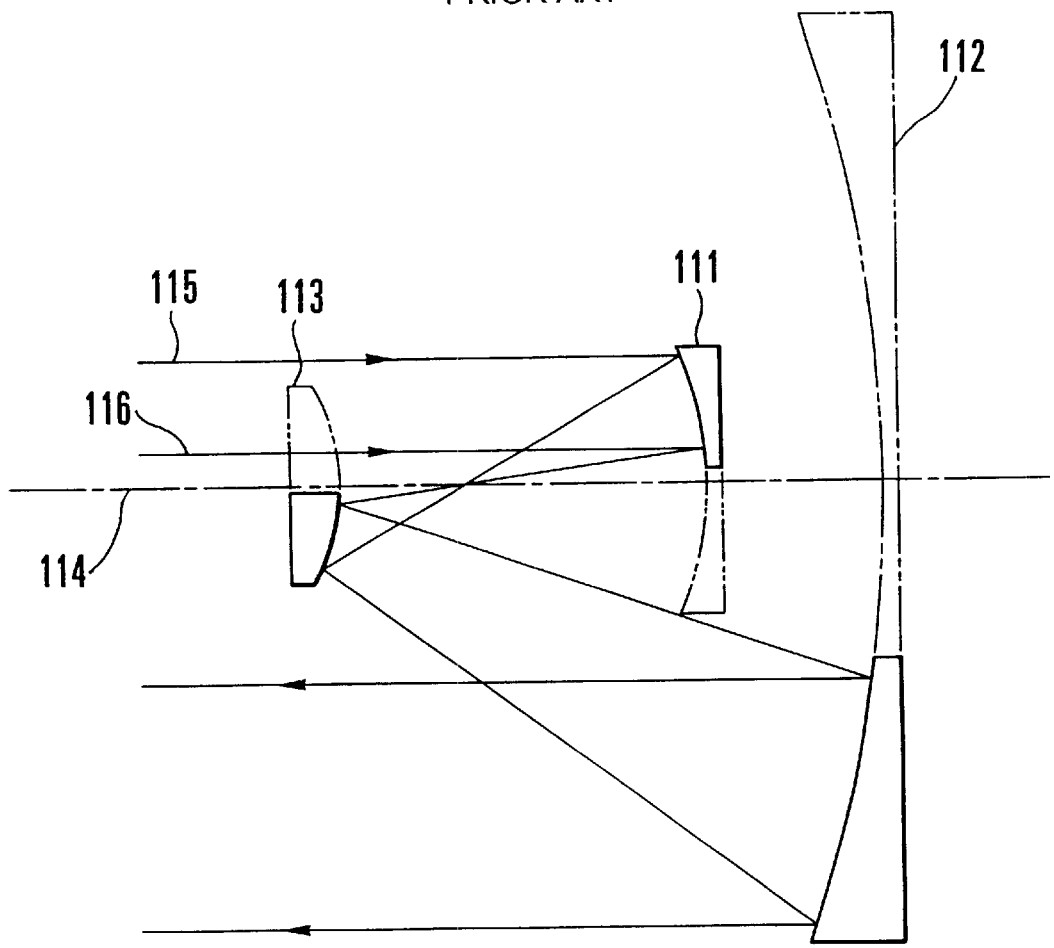
FIG. 24 is a diagram for explaining a first method of avoiding the shading by putting the principal ray away from the optical axis in the mirror optical system.
Figure 25:
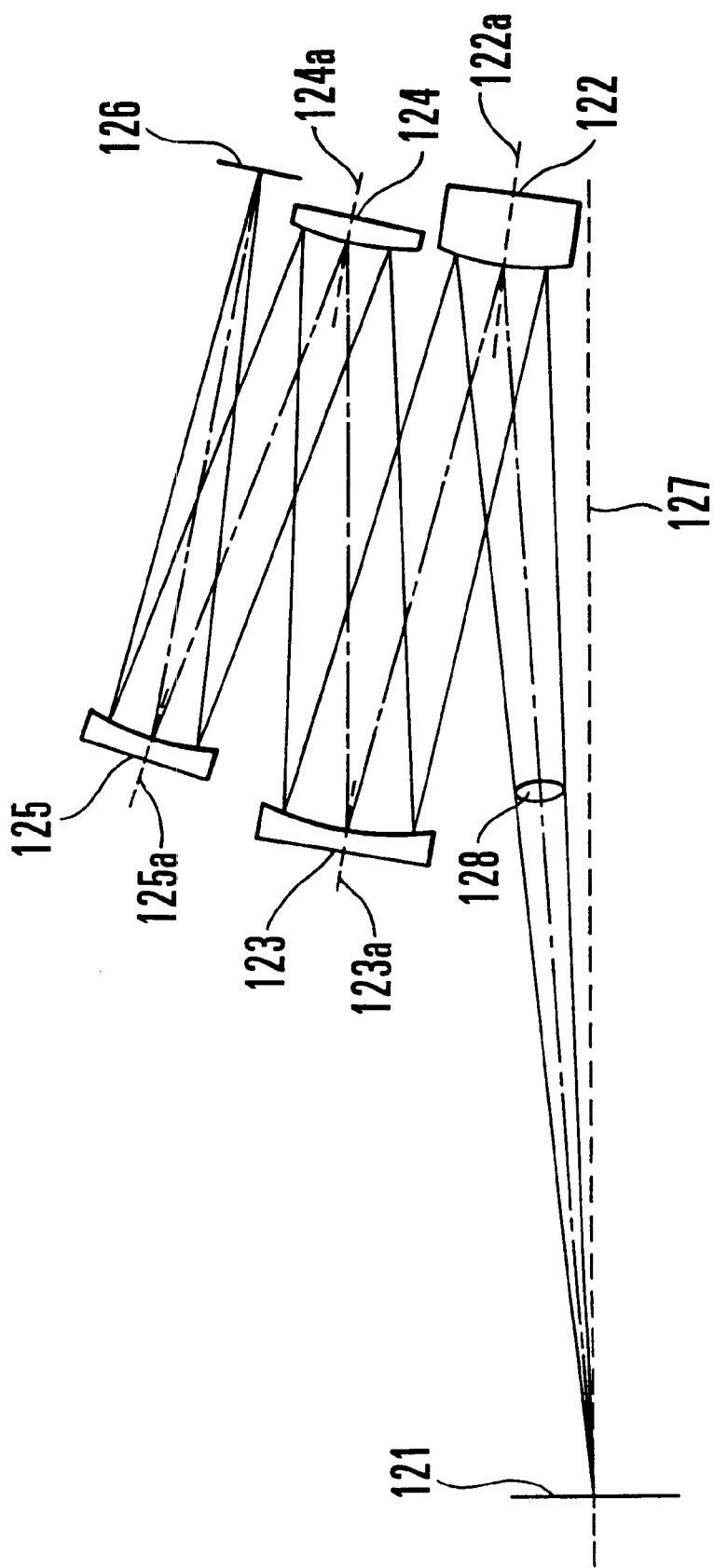
FIG. 25 is a diagram for explaining a second method of avoiding the shading by putting the principal ray away from the optical axis in the mirror optical system.
Figure 26:
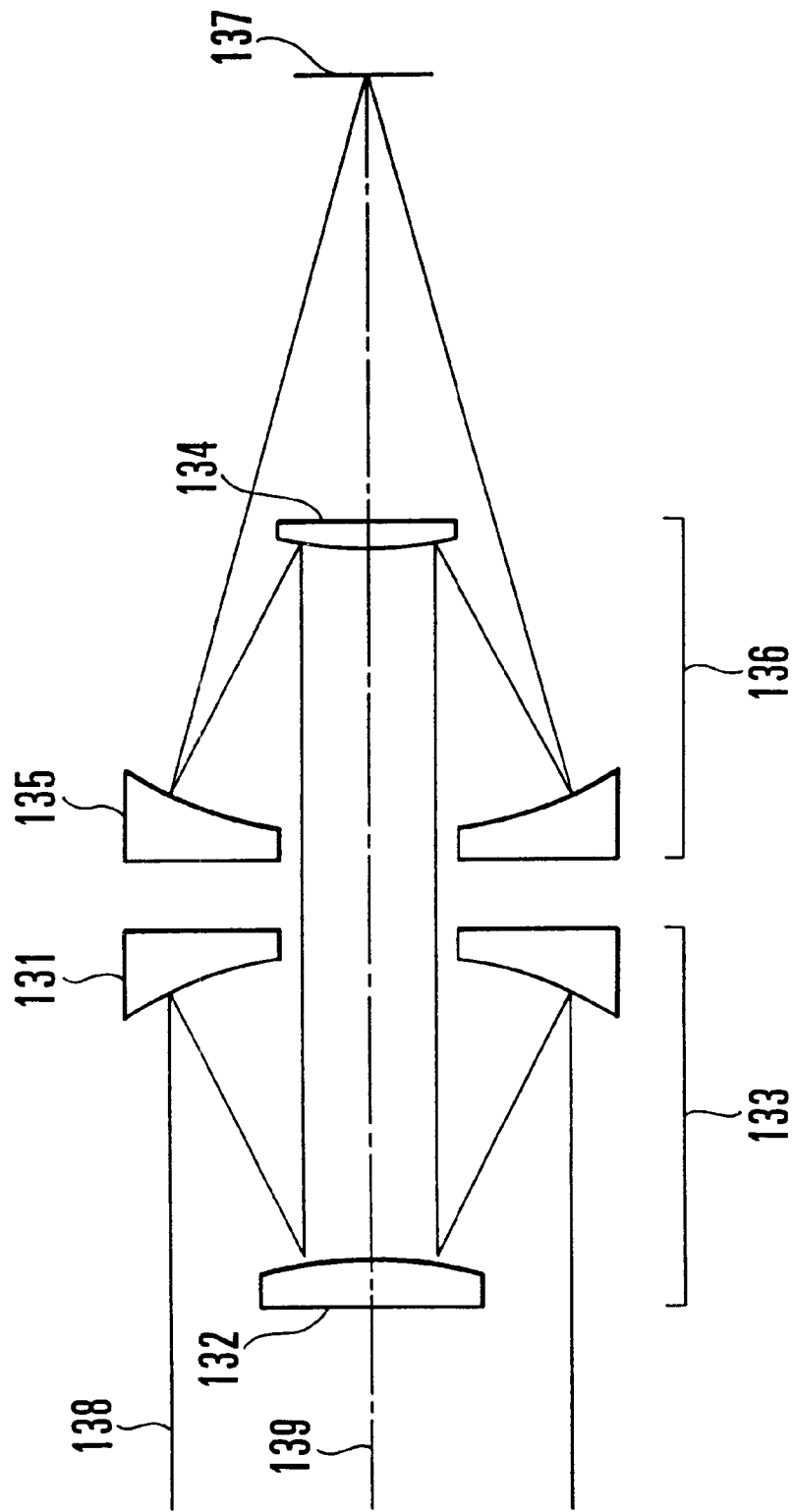
FIG. 26 is a schematic diagram of the conventional zoom optical system using reflecting mirrors.
Figure 27:
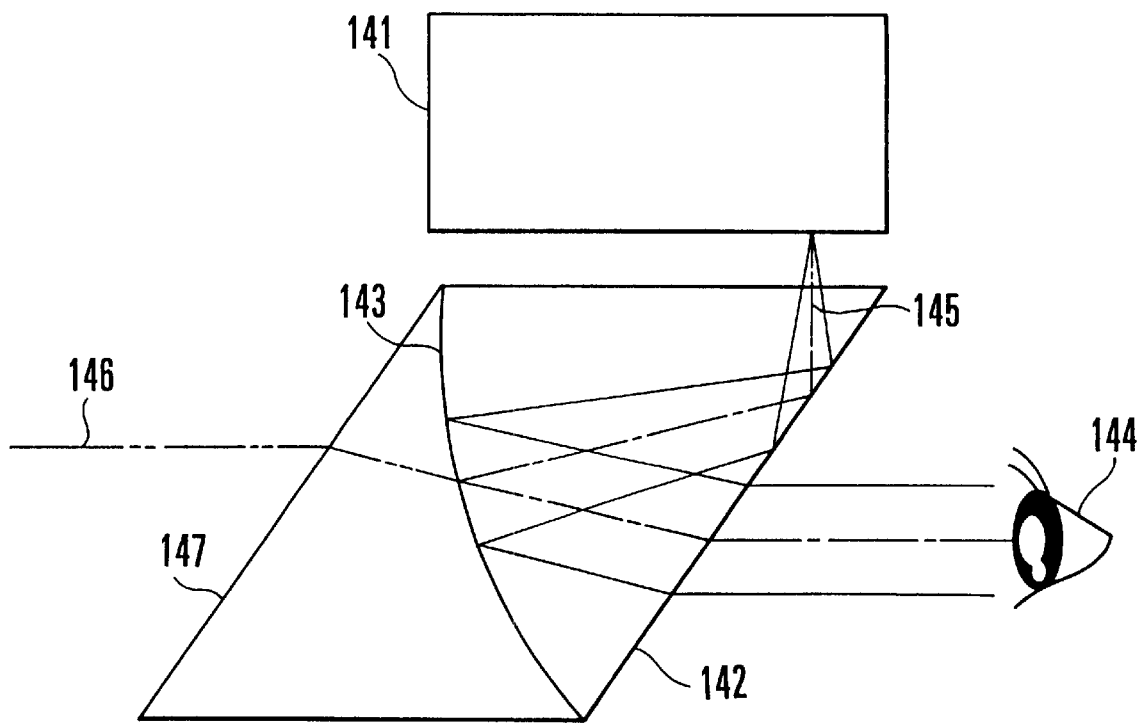
FIG. 27 is a diagram of an observing optical system using a prism having its reflecting surface curved.
Figure 28:
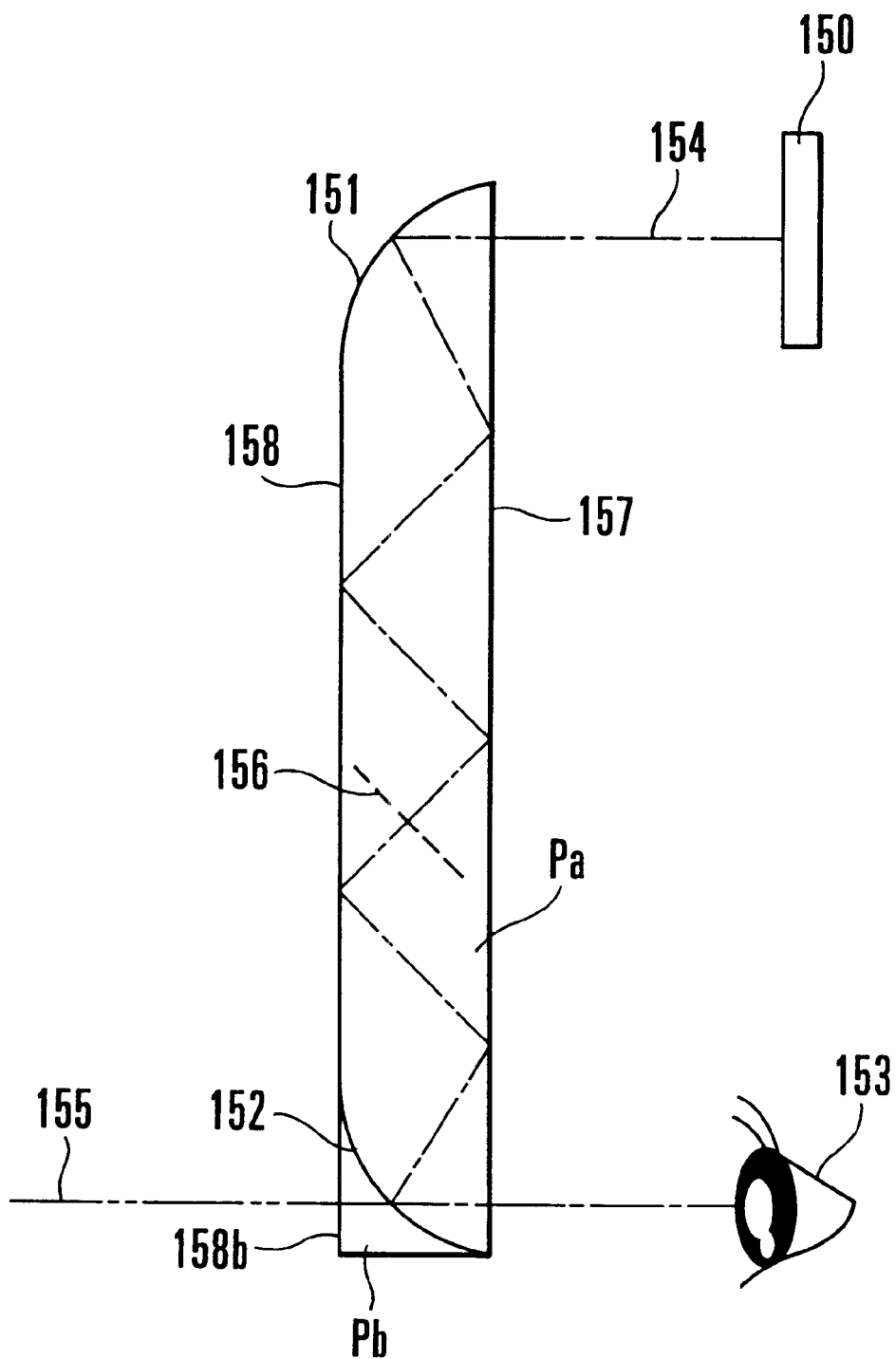
FIG. 28 is a diagram of another observing optical system using a prism having two curved reflecting surfaces.

The lateral aberrations of the zoom optical system of the present embodiment are shown in the graphs of FIGS. 20, 21 and 22.

For the focusing purposes, either the second lens unit (the fourth and fifth optical elements B4 and B5) or the third lens unit (the sixth optical element B6) moves to suit different object distances.

An advantage of the present embodiment arises from the facts that the stop R1 is disposed on the object side of the zoom optical system and that an object image is formed in the interior of the second optical element B2. By this arrangement, the effective diameter of each of the surfaces of the second optical element B2 and those that follow is shortened. This leads to minimize the dimension in the X axis. The optical elements of compact form are thus obtained.

Another advantage arises from the fact that the second and fifth optical elements B2 and B5 each are provided with a plurality of reflecting surfaces which are given proper refractive powers and arranged in decentered relation. This allows the light beam inside the zoom optical system to be folded to a desired shape without causing the light beam to be blocked off in any part. The total length in the Z direction is thus shortened.

Yet another advantage arising from the fact that the second and fifth optical elements B2 and B5 each have its two surface mirrors formed in unison on one member is that the reflecting surfaces can be positioned in a uniform tolerance (assembling tolerance) which greatly affects the optical performance. The optical system thus little suffers any loss of positioning accuracy with aging.

Further, the zoom optical system of the present embodiment is made up by employing a number of optical elements of two types in good combination, one of which has a plurality of reflecting surfaces formed in unison and the other of which is constructed with the coaxial refracting surfaces (coaxial optical element). As compared with the case where the zoom optical system is constructed only with the reflecting surfaces arranged in decentered relation, therefore, the produced amount of decentering aberrations is more suppressed by having the coaxial optical element made to share the refractive power. The use of the optical element which is composed of coaxial refracting spherical surfaces facilitates the easiness of correcting all aberrations.

Furthermore, such an optical element of coaxial refracting spherical surfaces is easy to manufacture.

It is to be noted that, since, in the present embodiment, the sixth optical element B6 is a refractive lens, the direction of the exiting reference axis from the sixth optical element B6 is the same as the direction of the entering reference axis to the sixth optical element B6. However, it is to be understood that the direction and angle of the exiting reference axis are not confined as such. For example, the space between the sixth optical element B6 and the image plane R14 may be provided with an additional mirror inclined 45° to the YZ plane so that the exiting reference axis is bent to the perpendicular direction (parallel to the X axis) to the paper.

Also, for the entering reference axis to the optical system, a mirror, for example, may be disposed on the object side of the stop R1 and inclined 45° to the YZ plane so that the reference axis enters from the perpendicular direction (parallel to the X axis) to the paper. The use of such a mirror can even more increase the degree of freedom for the design of cameras.

Of the above-described embodiments, the embodiments 1 to 4 each provide a zoom optical system comprising a plurality of optical elements including an optical element having two refracting surfaces and a plurality of reflecting surfaces formed in a transparent body, being arranged such that a light beam enters an inside of the transparent body from one of the two refracting surfaces and, after being successively reflected from the plurality of reflecting surfaces, exits from the other of the two refracting surfaces, and an optical element composed of a plurality of coaxial refracting surfaces, wherein an image of an object is formed through the plurality of optical elements, and zooming is effected by varying relative positions of at least two optical elements of the plurality of optical elements. The embodiment 5 provides a zoom optical system comprising a plurality of optical elements including an optical element having a plurality of surface mirrors integrally formed and decentered relative to one another, being arranged such that an incident light beam exits therefrom after being successively reflected from reflecting surfaces of the plurality of surface mirrors, and an optical element composed of a plurality of coaxial refracting surfaces, wherein an image of an object is formed through the plurality of optical elements, and zooming is effected by varying relative positions of at least two optical elements of the plurality of optical elements.

Besides these, according to the invention, the fourth optical element B4 and/or the fifth optical element B5 in the embodiment 4 may be otherwise constructed with a plurality of surface mirrors decentered from one another and made up in unison, such that the entering light beam repeats reflection from the successive surface mirrors, before it exits. In this case, there is produced an advantage of reducing the weight of the zoom optical system.

Also, in the invention, for the optical element which contributes to a variation of the focal length, the direction of zooming movement is not necessarily parallel to the direction of the entering reference axis to the zoom optical system. Depending on the situation of the design of the image pickup apparatus, the direction of zooming movement of the optical element may be changed to an angle of, for example, 30°, 45° or 60° with respect to the entering reference axis to the zoom optical system by inclining the exiting reference axis of the first optical element.

Next, another form of the zoom optical system will be described below.

When defining, as a reference axis ray, a ray of light which comes from an object, enters the zoom optical system, passes the center of a stop and reaches the center of a final image plane, defining, as an entering reference axis of each surface, each optical element or each lens unit, the reference axis ray which enters each surface, each optical element or each lens unit of the zoom optical system, defining, as an exiting reference axis of each surface, each optical element or each lens unit, the reference axis ray which exits from each surface, each optical element or each lens unit of the zoom optical system, defining, as a reference point, an intersection point of the entering reference axis and each surface, defining, as a direction of the entering reference axis and a direction of the exiting reference axis, directions in which the reference axis ray advances from an object side to an image side in the entering reference axis and the exiting reference axis, respectively, the zoom optical system comprises the stop, at least one off-axial optical element having an off-axial reflecting surface inclined with respect to the reference axis ray, and at least one coaxial optical element composed only of surfaces of revolution symmetry with respect to the reference axis ray, wherein zooming is effected by moving the at least one off-axial optical element and the at least one coaxial optical element.

In particular, the zoom optical system has the following features.

The off-axial optical element is an optical element having two refracting surfaces and one or more off-axial reflecting surfaces integrally formed in a transparent body.

The off-axial optical element is disposed immediately before and/or immediately behind the stop along the reference axis ray.

The stop moves in unison with the off-axial optical element which moves during zooming.

The coaxial optical element is a single lens.

The direction of the reference axis ray passing through the coaxial optical element is orthogonal or inclined to the direction of the reference axis ray passing through the stop.

Further, when defining, as a reference axis ray, a ray of light which comes from an object, enters the zoom optical system, passes the center of a stop and reaches the center of a final image plane, defining, as an entering reference axis of each surface, each optical element or each lens unit, the reference axis ray which enters each surface, each optical element or each lens unit of the zoom optical system, defining, as an exiting reference axis of each surface, each optical element or each lens unit, the reference axis ray which exits from each surface, each optical element or each lens unit of the zoom optical system, defining, as a reference point, an intersection point of the entering reference axis and each surface, defining, as a direction of the entering reference axis and a direction of the exiting reference axis, directions in which the reference axis ray advances from an object side to an image side in the entering reference axis and the exiting reference axis, respectively, the zoom optical system comprises, in order from an object side along the reference axis ray, a first off-axial optical element, the stop, a second off-axial optical element and a coaxial optical element, wherein zooming is effected by moving at least one of the first and second off-axis optical element and the coaxial optical element.

In particular, the zoom optical system has the following features.

Each of the first and second off-axial optical elements is an optical element having two refracting surfaces and two off-axial reflecting surfaces integrally formed in a transparent body.

The direction of the entering reference axis and the direction of the exiting reference axis of each of the first and second off-axial optical elements are parallel to each other.

The first off-axial optical element, the stop and the second off-axial optical element move in unison during zooming.

The first off-axial optical element, the second off-axial optical element and the coaxial optical element move independent of each other during zooming.

The direction of the entering reference axis and the direction of the exiting reference axis of each of the first and second off-axial optical elements are orthogonal to each other, and the first off-axial optical element, the stop and the second off-axial optical element move in unison during zooming.

The coaxial optical element is a negative lens.

Figure 29:
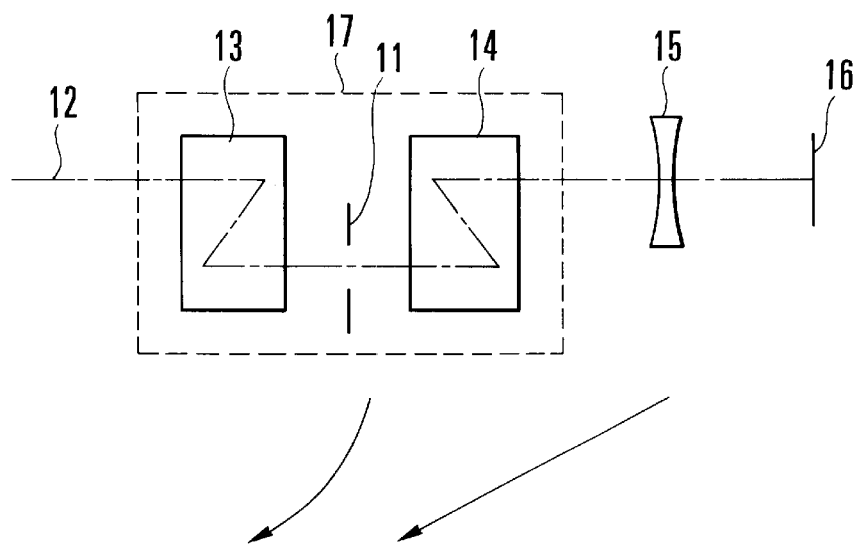
FIG. 29 is a diagram of the basic design of an embodiment 6 of the zoom optical system according to the invention.

FIG. 29 is a diagram of the basic design of an embodiment 6 of the zoom optical system according to the invention. A reference axis ray 12 passes at the center of the aperture opening of a stop 11 and arrives at the center of a final image plane 16. Optical elements 13 and 14 each have a reflecting surface (not shown) inclined to the reference axis ray 12. (The inclined reflecting surface to the entering reference axis is hereinafter called the "off-axial" reflecting surface. Also, the optical element having the off-axial reflecting surface is hereinafter called the "off-axial" optical element.) The first off-axial optical element 13 and the second off-axial optical element 14 are arranged along the reference axis ray 12 in this order from the object side.

A third optical element 15 of revolution symmetry with respect to the reference axis ray 12 (or coaxial optical element) is disposed before the final image plane 16. The first off-axial optical element 13, the stop 11 and the second off-axial optical element 14 move in unison as a front lens unit 17, during zooming. The third optical element 15 simultaneously moves as a rear lens unit.

Here, the front lens unit 17 has a positive refractive power and the rear lens unit 15 has a negative refractive power. As a whole, they constitute a 2-unit zoom lens of plus-minus power arrangement, wherein the rear lens unit 15 bears the function of varying the image magnification, while the front lens unit 17 compensates for the image shift.

The reference axis ray 12 passes at the center of aperture opening of the stop 11 and is refracted or reflected by the successive surfaces, finally arriving at the center of the final image plane 16. In the invention, the reference axis ray is used as being equivalent to the optical axis of the coaxial system. Although the reference axis ray has been defined as encountering the center of aperture opening of the stop and the center of the image plane, the invention is not confined to such a definition, provided that it is representative of the effective light beam of the optical system.

Figure 30:
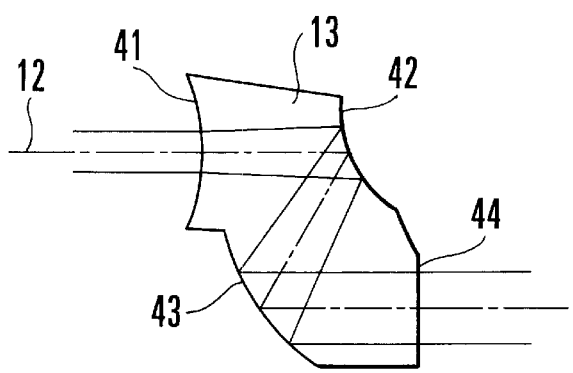
FIG. 30 is a sectional view of the form of a first optical element in the embodiment 6.
Figure 31:
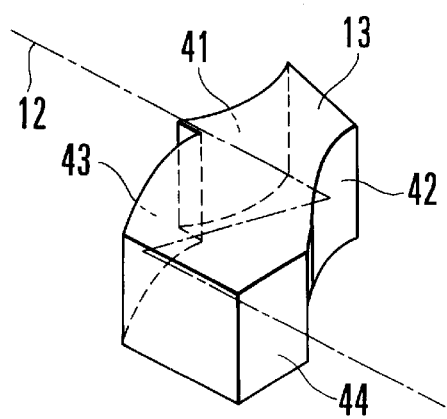
FIG. 31 is a perspective view of the first optical element in the embodiment 6.

FIG. 30 shows the structure of the first off-axial optical element 13. FIG. 31 is a perspective view of the first off-axial optical element 13. The first optical element 13 is formed with two refracting surfaces 41 and 44 and two reflecting surfaces 42 and 43 in a transparent body. Incidentally, the reflecting surfaces 42 and 43 are coated by the vacuum evaporation technique or the like to form mirrors. The refracting surface 41 is an entrance surface, and the refracting surface 42 is an exit surface.

In the front lens unit 17 of an embodiment 6 of the invention, such optical elements as the first off-axis optical element 13 are arranged on either side of the stop 11 in symmetric relation. By this arrangement, the principal ray of any angular field is guided symmetrically in respect to the stop 11 at every station in the entire zooming range, thus producing an effect of canceling the decentering distortions by each other. This would be hardly obtained if the front lens unit 17 is constructed with one off-axial optical element. The use of the unified form of a number of surfaces like the first or second optical element 13 or 14 assures a higher positioning accuracy than when the individual surfaces are set up one after another, thus obviating the necessity of adjusting the positions and the inclinations. Also, there is no need to use a member for supporting the reflecting surfaces. Therefore, the number of parts is reduced.

Another advantage arises from the main contribution of the reflecting surfaces to the required refractive power for the optical element. This allows the refracting surfaces to have a greater degree of freedom. So, despite the desired refractive power being held, it becomes possible to suppress the produced amount of chromatic aberrations.

The present embodiment employs such optical elements in the zoom optical system with an advantage of obviating the necessity of using a positive lens and a negative lens in one unit for the purpose of correcting chromatic aberrations. So, the zoom optical system can be constructed with a smaller number of optical parts.

In the present embodiment, the off-axial optical element and the coaxial optical element which is constructed only with surfaces of revolution symmetry are used in combination. This leads to achieve a zoom optical system having a smaller total number of parts. That is, in the case of FIG. 29, two off-axial optical elements are sufficient for the front lens unit and the one negative lens is sufficient for the rear lens unit. Thus, three parts constitute the zoom optical system.

Figure 32:
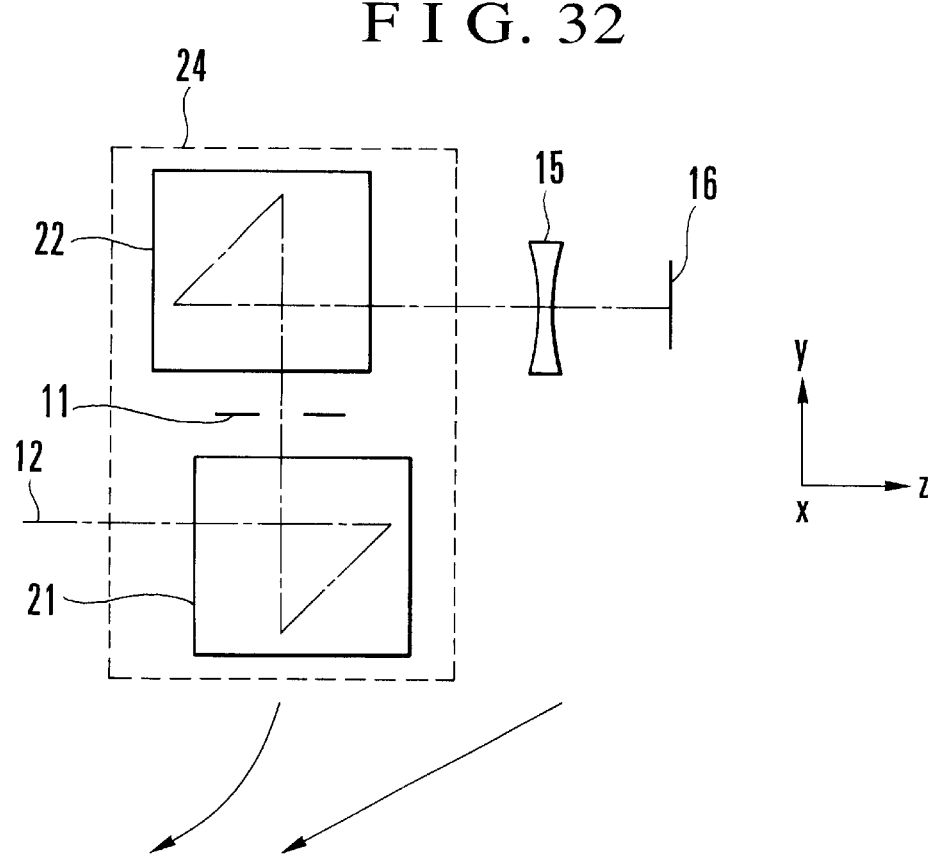
FIG. 32 is a diagram of the basic design of an embodiment 7 of the zoom optical system according to the invention.

FIG. 32 is a diagram of the basic design of an embodiment 7 of the zoom optical system according to the invention. This embodiment differs from the embodiment 6 in the construction of the front lens unit. In FIG. 32, a first optical element 21 and a second optical element 22 corresponds to the first off-axial optical element 13 and the second off-axial optical element 14 of the embodiment 6, respectively. Even in the present embodiment, the first optical element 21, the stop 11 and the second optical element 22 constitute a front lens unit 24 of a 2-unit zoom optical system, and the third optical element 15 constitutes a rear lens unit.

The zooming method of the present embodiment is the same as that of the embodiment 6.

In the present embodiment, the first optical element 21 and the second optical element 22 each are arranged so that the entering direction of the reference axis ray is orthogonal to the exiting direction thereof, thus reducing the size of the front lens unit 24 in the z direction. Therefore, the total length in this direction becomes shorter than that of the embodiment 6. Incidentally, the direction of the reference axis ray passing through the stop 11 is orthogonal to the direction of the reference axis ray passing through the third optical element 15.

Further, the basic optical arrangement of the present embodiment is the same as that of the embodiment 6. The optical elements 21 and 22 are arranged on either side of the stop 11 in symmetric relation to correct decentering distortion in particular. The other effects are the same as in the embodiment 6.

Figure 33:
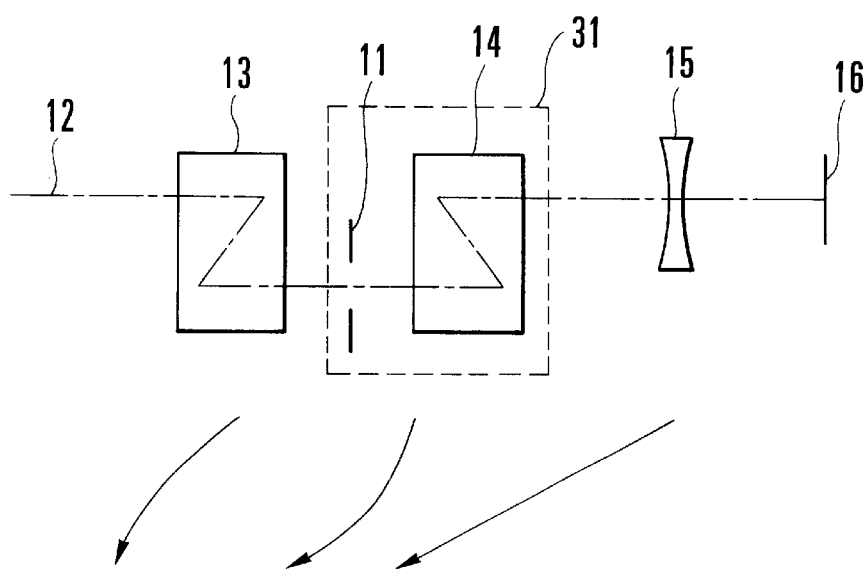
FIG. 33 is a diagram of the basic design of an embodiment 8 of the zoom optical system according to the invention.

FIG. 33 is a diagram of the basic design of an embodiment 8 of the zoom optical system according to the invention. This embodiment resembles in construction with the embodiment 6, but differs from the embodiment 6 in a point that the front lens unit shown in FIG. 29 is divided into two parts with the result that the entire system comprises three units. These three units move in differential relation during zooming. That is, the first optical element 13 is used as a first lens unit, the stop 11 and the second optical element 14 as a second lens unit and the third optical element (coaxial optical element) 15 as a third lens unit. This produces an advantage of reducing the range of variation of decentering aberrations of the optical elements 13 and 14 during zooming.

Even in the present embodiment, the off-axial optical element and the coaxial optical element of only the surfaces of revolution symmetry are used in combination, thereby producing an advantage of achieving a zoom optical system with a smaller total number of parts. In the case of FIG. 33, two off-axial optical elements and one negative lens, that is, three parts, are sufficient for constructing a 3-unit zoom optical system.

The method of expressing the design parameters for the following numerical examples is fundamentally the same as that for the numerical examples of the embodiments 1 to 5, but different points are mentioned below.

The values of the coordinate of every surface are expressed in relation of the values for the wide-angle end. For the middle position and the telephoto end, the values are expressed by the differences from those of the wide-angle end. Specifically, denoting the moved amounts from the wide-angle end (W) to the middle position (M) and the telephoto end (T) by "a" and "b", respectively, the following equations are obtained:

$$Zi(M)=Zi(W)+a$$

$$Zi(T)=Zi(W)+b,$$

where the sign of the "a" or "b" is positive when the surface moves to the plus direction, or negative when it moves to the minus direction. The ones of the separations Di which vary with this movement are variable. So, their values for each zooming station are listed together in another tabulation.

Di is a scaler quantity representing the separation between the original points of the local coordinates for the i-th and (i+1)st surfaces. Ndi and vdi are respectively the refractive index and Abbe number of the medium between the i-th and (i+1)st surfaces. Incidentally, the stop and the final image plane, too, are shown each as one plane.

The embodiments of the invention have spherical surfaces and aspheric surfaces of revolution asymmetry. Of these, the spherical ones are taken as sphere and described by the radii of curvature R1 with plus sign when the center of curvature falls on the plus side of the z axis of the local coordinates, or minus sign when it falls on the minus side.

Here, the shape of the spherical surface is expressed by the following equation:

$$z = \frac{(x^2+y^2)/Ri}{1+\sqrt{1-(x^2+y^2)/Ri^2}}$$

The optical system of the invention includes at least one aspheric surface of revolution asymmetry, and its shape is expressed by the following equation:

$$z=A/B$$

$$+C_{02}y^2 C_{11}xy+C_{20}x^2$$

$$+C_{03}y^3+C_{12}xy^2+C_{21}x^2y+C_{30}x^3$$

$$+C_{04}y^4+C_{13}xy^3+C_{22}x^2y^2+C_{31}x^3y+C_{40}x^4$$

$$+C_{05}y^5+C_{14}xy^4+C_{23}x^2y^3+C_{32}x^3y^2+C_{41}x^4y+C_{50}x^5$$

$$+C_{06}y^6+C_{15}xy^5+C_{24}x^2y^4 C_{33}x^3y^3+C_{42}x^4y^2+C_{51}x^5y+C_{60}x^6$$

where $$A=(a+b)\ (y^2\cdot\cos^2 t+x^2)$$

$$B=2a\cdot b\cdot\cos t[1+\{(b-a)\cdot y\cdot\sin t/(2a\cdot b)\}$$

$$+[1+\{(b-a)\cdot y\cdot\sin t/(a\cdot b)\}-\{y^2/(a\cdot b)\}$$

$$-\{4a\cdot b\cdot\cos^2 t+(a+b)^2\cdot\sin^2 t\}x^2/(4a^2b^2\cdot\cos^2)]^{1/2}].$$

In the surface formula described above, "A/B" shows the shape of the surface of the second order. So, this formula expresses the shape of the aspheric surface of revolution asymmetry based on the surface of the second order. In the embodiments of the invention, however, $A/B=0$ is set, in the surface formula described above. This implies that the surface is of revolution asymmetry based on the plane. Specifically, regardless of the value of "t", the following condition is obtained:

$a=b=\infty$

Further, all the surfaces of revolution asymmetry in the invention are formed to the shapes of plane symmetry with respect to the yz plane by using only the terms of even-numbered order in respect of "x" in the equation described above and putting "0" to the terms of odd-numbered order. Every surface of revolution asymmetry in the invention satisfies the following condition:

$C_{11}=C_{12}=C_{30}=C_{13}=C_{31}=C_{14}=C_{32}=C_{50}=C_{15}=C_{33}=C_{51}=0$

The term "horizontal semifield $u_Y$" means a half of the maximum angular field the system covers at the first surface R1 in the YZ plane in FIG. 5. The term "vertical semifield $u_X$" means a half of the maximum angular field the system covers at the first surface R1 in the XZ plane.

Also, the diameter of the stop is shown as the aperture diameter. This regulates the brightness of the optical system. Also, the effective area of the image plane is shown as the image size. The image area is of the rectangular shape with the horizontal sides in the y direction of the local coordinates, and the vertical sides in the x direction.

Also, for the numerical example of each of the embodiments, its lateral aberrations are graphically represented in the wide-angle end (W), the middle position (M) and the telephoto end (T), as rays of light are incident on the stop R1 at respective horizontal and vertical angles of ($u_Y$, $u_X$), (0, $u_X$), ($-u_Y$, $u_X$), ($u_Y$, 0), (0,0) and ($-u_Y$, 0). In the graphs of the lateral aberrations, the abscissa is in the height of incidence on the pupil and the ordinate is in the produced amount of aberration. In any of the embodiments, every surface is basically formed to symmetric shapes with respect to the yz plane. Even in the graphs of the lateral aberrations, therefore, the plus and minus directions of the vertical angular field become the same. So, the graphs of the lateral aberrations of the minus direction are omitted for the purpose of simplifying the drawings.

Numerical examples of embodiments 6 to 8 are shown below.

(Embodiment 6)

Figure 34:
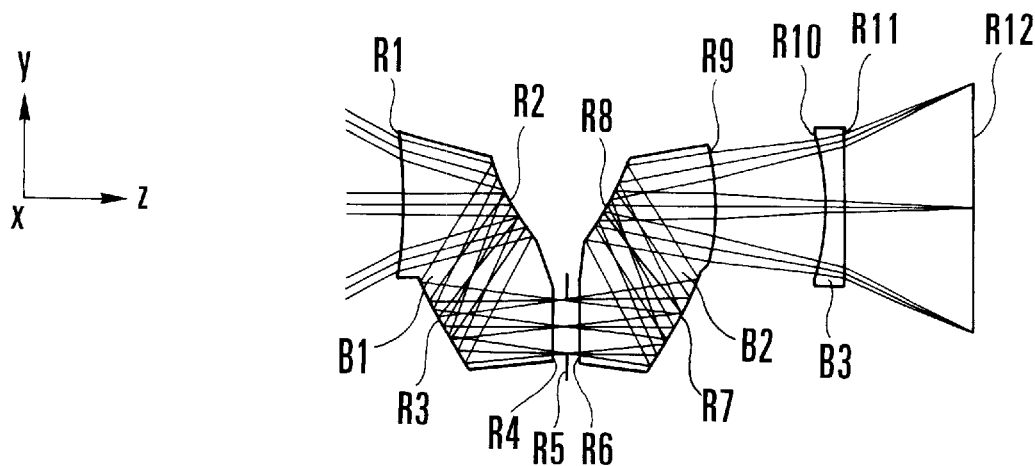
FIG. 34 is a sectional view of the optics of the embodiment 6 in the wide-angle end.
Figure 35:
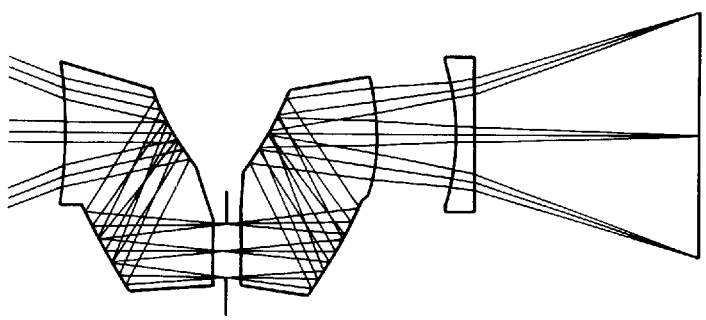
FIG. 35 is a sectional view of the optics of the embodiment 6 in a middle position.
Figure 36:
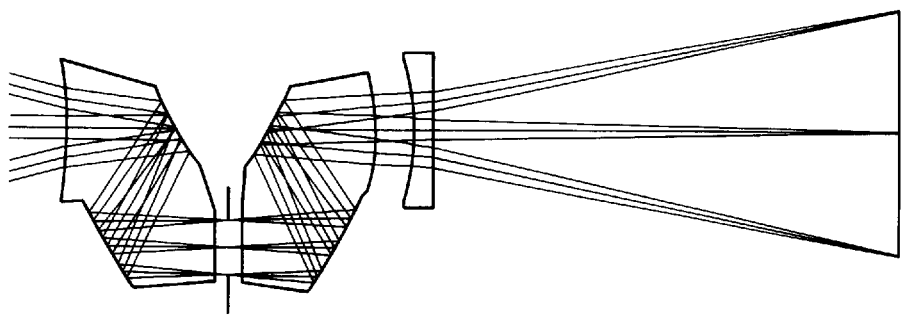
FIG. 36 is a sectional view of the optics of the embodiment 6 in the telephoto end.

This numerical example of the embodiment 6 provides a zoom optical system whose range is about 1.9. FIGS. 34, 35 and 36 are sectional views of the zoom optical system with the optical paths shown in the wide-angle end (W), the middle position (M) and the telephoto end (T), respectively.

|  | W | M | T |
|---|---|---|---|
| Horizontal Semifield | 27.2 | 21.6 | 14.4 |
| Vertical Semifield | 18.9 | 14.6 | 9.7 |
| Aperture Diameter | 8.00 | 8.00 | 8.00 |

| i | Yi | Zi (W) | θi | Di | Ndi | νdi | Sur. |
|---|---|---|---|---|---|---|---|
| First Optical Element B1: | | | | | | | |
| 1 | 0.00 | 0.00 | 0.00 | 16.00 | 1.51741 | 52.41 | R |
| 2 | 0.00 | 16.00 | 30.00 | 20.00 | 1.51741 | 52.41 | L |
| 3 | −17.32 | 6.00 | 30.00 | 16.00 | 1.51741 | 52.41 | L |
| 4 | −17.32 | 22.00 | 0.00 | 2.00 | 1 | | R |
| 5 | −17.32 | 24.00 | 0.00 | 2.00 | 1 | | Stop |
| Second Optical Element B2: | | | | | | | |
| 6 | −17.32 | 26.00 | 0.00 | 8.00 | 1.51741 | 52.41 | R |
| 7 | −17.32 | 40.00 | −30.00 | 20.00 | 1.51741 | 52.41 | L |
| 8 | 0.00 | 30.00 | −30.00 | 16.00 | 1.51741 | 52.41 | L |
| 9 | 0.00 | 46.00 | 0.00 | Var. | 1 | | R |
| Third Optical Element B3: | | | | | | | |
| 10 | 0.00 | 62.38 | 0.00 | 2.80 | 1.83480 | 42.72 | R |
| 11 | 0.00 | 65.18 | 0.00 | Var. | 1 | | R |
| 12 | 0.00 | 84.40 | 0.00 | | 1 | | I.P. |

|  | W | M | T |
|---|---|---|---|
| D9 | 16.38 | 11.60 | 5.58 |
| D11 | 19.22 | 33.77 | 69.22 |

R1 + up to R9: Zi (M) = Zi (W) − 9.76
Zi (T) = Zi (W) − 39.20
R10 + up to R11: Zi (M) = Zi (W) − 14.55
Zi (T) = Zi (W) − 50.00
R12: Zi (M) = Zi (W)
Zi (T) = Zi (W)

Shape of Spherical Surface

R1 Surface: $R_1 = -70.000$
R4 Surface: $R_4 = \infty$
R6 Surface: $R_6 = \infty$
R9 Surface: $R_9 = -30.024$
R10 Surface: $R_{10} = -34.943$
R11 Surface: $R_{11} = 262.245$ Shape of Aspheric Surface:

R2:

$C_{02} = 1.17370e - 02$  $C_{20} = 6.60704e - 03$
$C_{03} = -8.20960e - 05$  $C_{21} = 3.17239e - 05$
$C_{04} = 4.42532e - 06$  $C_{22} = 1.70696e - 05$  $C_{40} = 8.12432e - 06$
$C_{05} = -1.95325e - 07$  $C_{23} = -4.57659e - 07$  $C_{41} = 5.28528e - 08$
$C_{06} = 1.43266e - 08$  $C_{24} = 5.50930e - 08$  $C_{42} = 6.05424e - 08$
$C_{60} = 2.85711e - 08$

R3:

$C_{02} = 4.78752e - 03$  $C_{20} = 6.08577e - 03$
$C_{03} = 8.04000e - 06$  $C_{21} = -2.48947e - 05$
$C_{04} = -8.47604e - 08$  $C_{22} = 5.58110e - 06$  $C_{40} = 3.62312e - 06$
$C_{05} = 3.57983e - 09$  $C_{23} = -8.90555e - 08$  $C_{41} = -1.93993e - 08$
$C_{06} = -2.14023e - 10$  $C_{24} = 2.72588e - 09$  $C_{42} = 1.86232e - 09$
$C_{60} = 5.94017e - 09$

R7:

$C_{02} = -6.10763e - 03$  $C_{20} = 6.78303e - 04$
$C_{03} = -2.10107e - 05$  $C_{21} = -2.95023e - 05$
$C_{04} = -4.32906e - 07$  $C_{22} = 5.68199e - 06$  $C_{40} = 8.04608e - 06$
$C_{05} = -6.44143e - 09$  $C_{23} = -1.01568e - 07$  $C_{41} = -1.36560e - 07$
$C_{06} = -4.76639e - 10$  $C_{24} = 2.17578e - 09$  $C_{42} = -4.18606e - 09$
$C_{60} = -7.66468e - 09$

R8:

$C_{02} = -8.05505e - 03$  $C_{20} = 2.18969e - 03$
$C_{03} = -2.78436e - 05$  $C_{21} = -1.86649e - 05$
$C_{04} = -3.36701e - 06$  $C_{22} = 6.81965e - 06$  $C_{40} = 3.17321e - 06$
$C_{05} = 2.21811e - 08$  $C_{23} = -1.17535e - 08$  $C_{41} = 1.52834e - 08$
$C_{06} = -6.42291e - 09$  $C_{24} = 1.70935e - 09$  $C_{42} = -1.57102e - 08$
$C_{60} = -8.28707e - 09$

The constituent parts of the present embodiment are described in the order from the object side. A first optical element B1 is constructed with a first surface R1 (refracting entrance surface of concave form), a second surface R3 and a third surface R3 which are in curved form of inner reflection and decentered, and a fourth surface R4 (refracting exit surface of plane form) in one transparent body. The second surface R2 acts as a convex reflecting surface. A fifth surface R5 is a stop plane. A second optical element B2 is constructed with a sixth surface R6 (refracting entrance surface of plain form), a seventh surface R7 and an eighth surface R8 which are in curved form of inner reflection and decentered, and a ninth surface R9 (refracting exit surface of convex form) in one transparent body. The eighth surface R8 acts as a convex reflecting surface. A third optical element B3 is in the form of a negative lens with a tenth surface R10 and an eleventh surface R11 coaxial to each other. A twelfth surface R12 is the final image plane coincident with the image receiving surface of an image pickup device such as a CCD.

The first optical element B1, the stop R5 and the second optical element B2 have a positive overall refractive power and move in unison, constituting a first lens unit (front lens unit). The third optical element B3 has a negative refractive power, constituting a second lens unit (rear lens unit) which moves during zooming.

Next, the image forming function is described on the assumption that an object is at infinity. A light beam coming from an object first enters the first optical element B1, and the light beam is refracted in passing through the first surface R1, then reflected from the second surface R2 and the third surface R3 successively, and then refracted in exiting from the fourth surface R4.

The light beam, after having passed through the stop or the fifth surface R5, then enters the second optical element B2, where the light beam is refracted at the sixth surface R6, then reflected from the seventh surface R7 and the eighth surface R8 successively, and then refracted at the ninth surface R9, exiting from the second optical element B2.

The light beam then enters the third optical element B3, where the light beam is refracted at the tenth surface R10 and the eleventh surface R11 and exits from the third optical element B3.

The light beam that has exited from the third optical element B3 finally forms an image on the twelfth surface R12.

Each of the first and second off-axial optical elements B1 and B2 of the present embodiments is an off-axial optical element in which the entering reference axis and the exiting reference axis are oriented to the same direction.

Next, the function of varying the image magnification by moving the lens units is described. The present embodiment is a 2-unit zoom lens of plus-minus power arrangement in this order from the object side. During zooming from the wide-angle end to the telephoto end, the front lens unit and the rear lens unit both move to the minus direction in the Z axis, while narrowing the separation therebetween.

Figure 37:
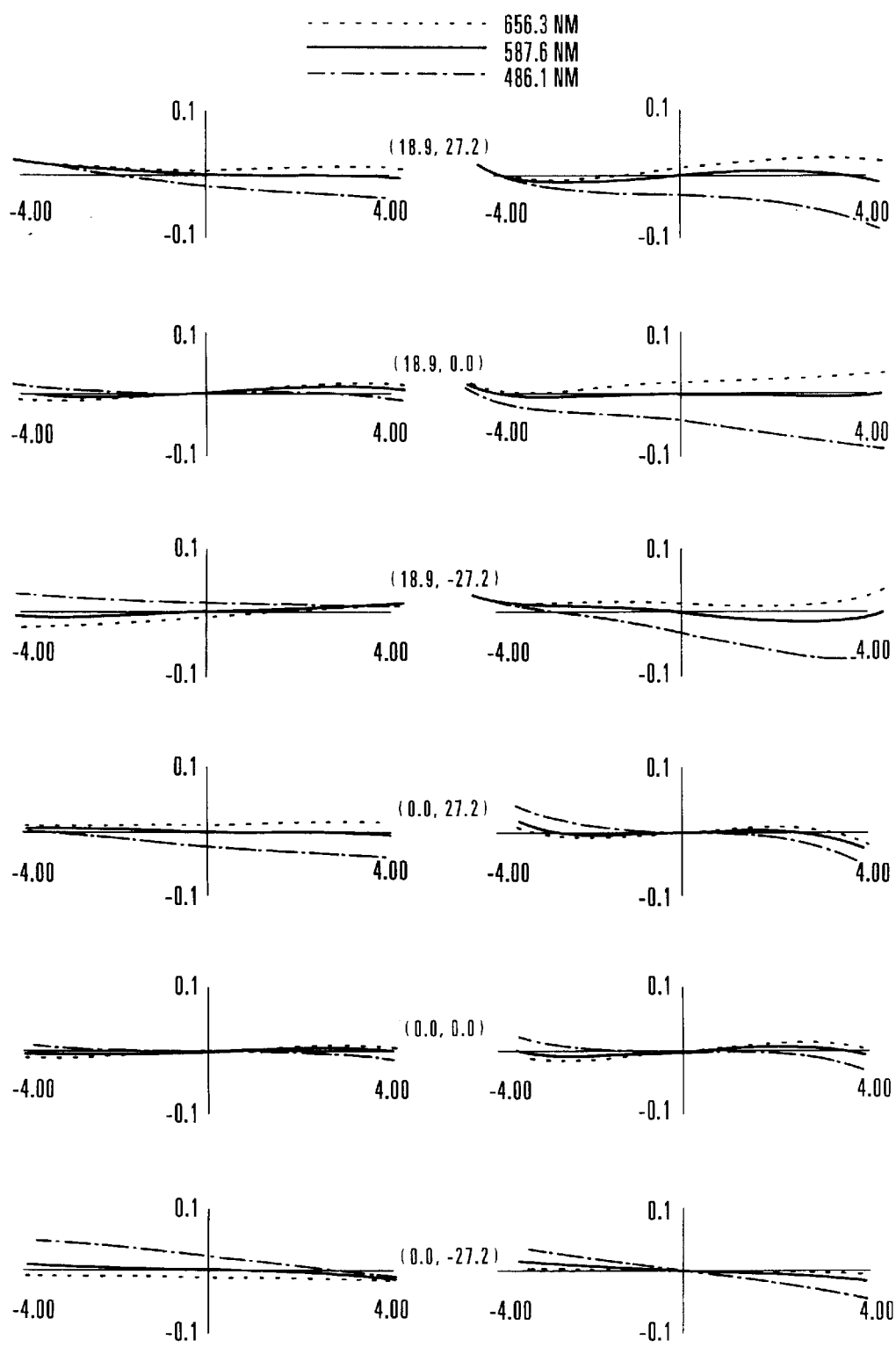
FIG. 37 shows graphs of the lateral aberrations of the embodiment 6 in the wide-angle end.
Figure 38:
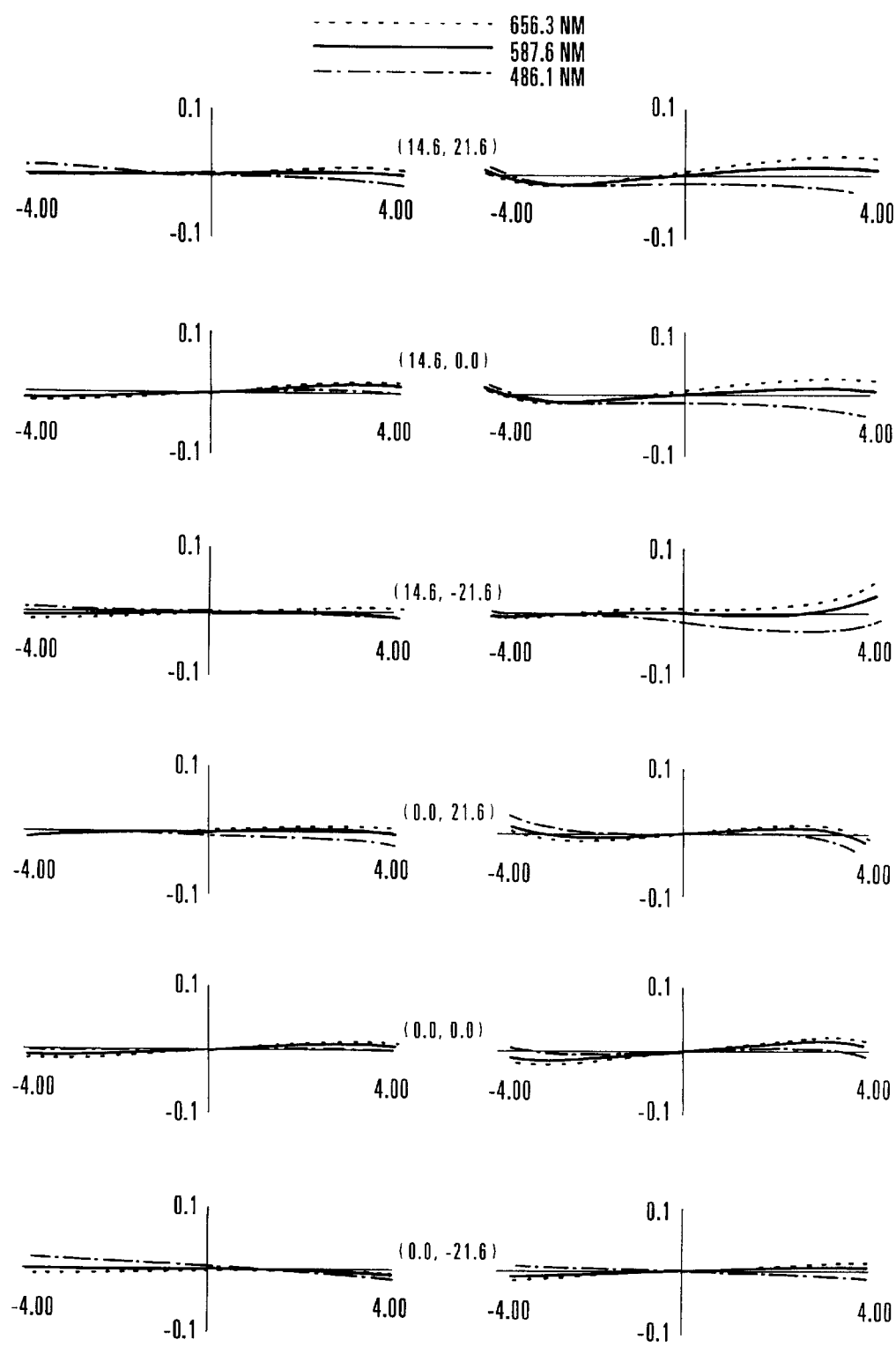
FIG. 38 shows graphs of the lateral aberrations of the embodiment 6 in the middle position.
Figure 39:
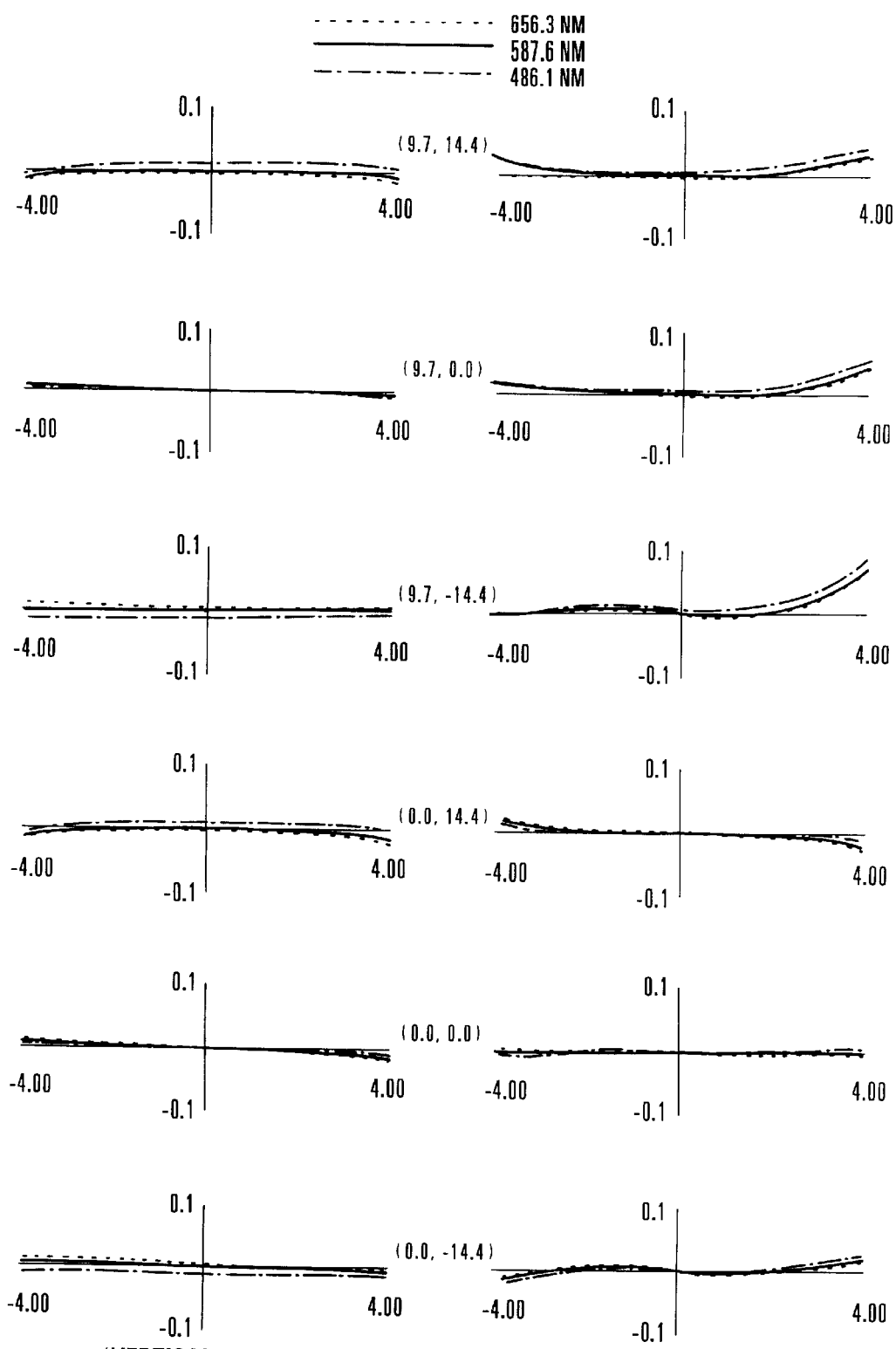
FIG. 39 shows graphs of the lateral aberrations of the embodiment 6 in the telephoto end.

FIGS. 37, 38 and 39 are graphs of the lateral aberrations of such an optical system in the wide-angle end (W), a middle position (M) and the telephoto end (T). These graphs are depicted with regard to six rays of light which enter the optical system at angles of $(u_Y, u_X)$, $(0, u_X)$, $(-u_Y, u_X)$, $(u_Y, 0)$, $(0,0)$ and $(-u_Y, 0)$ with the Y axis and the X axis. Incidentally, the abscissa of each graph is in the height of incidence of the entering ray on the stop R5 in the Y and X directions.

As can be seen from the graphs, the aberrations are corrected in good balance in each of the zooming positions.

Incidentally, it is premised in the present embodiment that the image size is 36 mm×24 mm.

(Embodiment 7)

Figure 40:
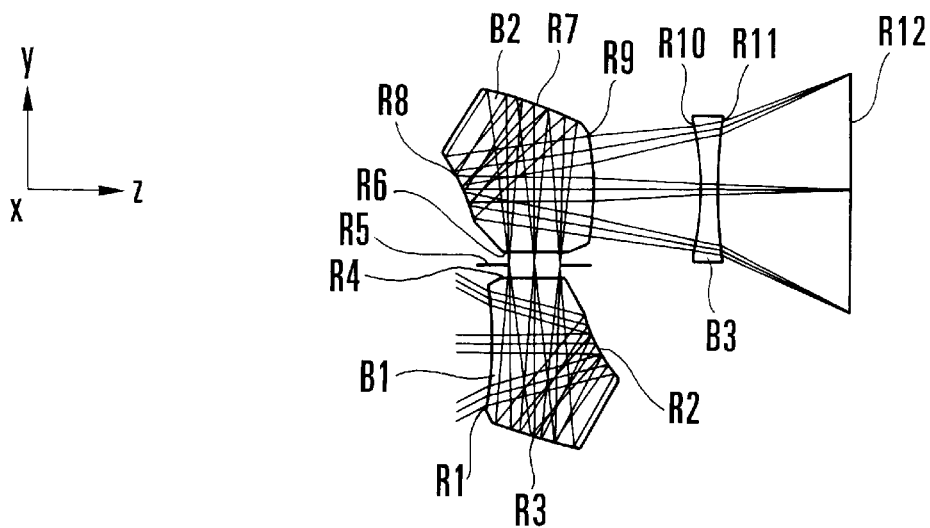
FIG. 40 is a sectional view of the optics of the embodiment 7 in the wide-angle end.
Figure 41:
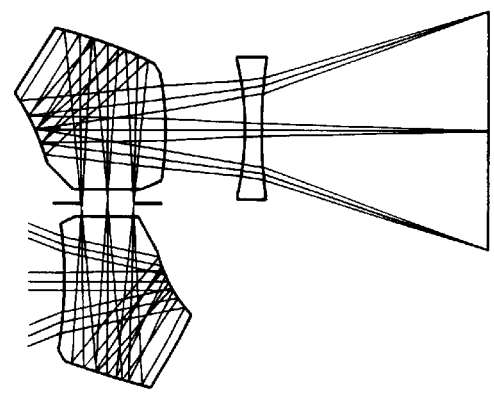
FIG. 41 is a sectional view of the optics of the embodiment 7 in a middle position.
Figure 42:
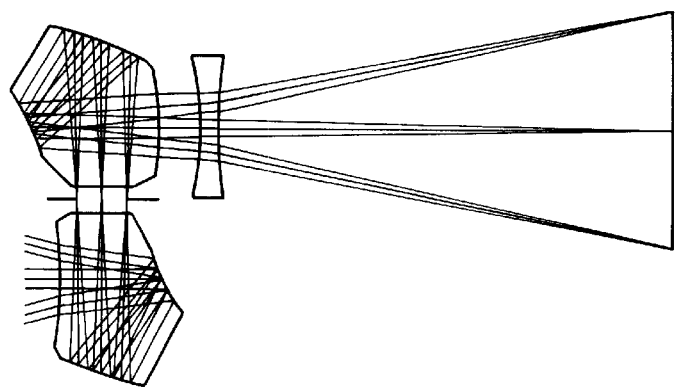
FIG. 42 is a sectional view of the optics of the embodiment 7 in the telephoto end.

The numerical example of the embodiment 7 provides a zoom optical system whose range is about 1.9. FIGS. 40, 41 and 42 are sectional views of the zoom optical system with the optical paths shown in the wide-angle end (W), a middle position (M) and the telephoto end (T), respectively.

|  | W | M | T |
|---|---|---|---|
| Horizontal Semifield | 27.2 | 21.6 | 14.4 |
| Vertical Semifield | 18.9 | 14.6 | 9.7 |
| Aperture Diameter | 8.00 | 8.00 | 8.00 |

| i | Yi | Zi (W) | θi | Di | Ndi | vdi | Sur. |
|---|---|---|---|---|---|---|---|
| First Optical Element B1: | | | | | | | |
| 1 | 0.00 | 0.00 | 0.00 | 16.00 | 1.51741 | 52.41 | R |
| 2 | 0.00 | 16.00 | 28.00 | 17.00 | 1.51741 | 52.41 | L |
| 3 | −14.09 | 6.49 | 73.00 | 24.00 | 1.51741 | 52.41 | L |
| 4 | 9.91 | 6.49 | 90.00 | 2.00 | 1 | | R |
| 5 | 11.91 | 6.49 | 90.00 | 2.00 | 1 | | Stop |
| Second Optical Element B2: | | | | | | | |
| 6 | 13.91 | 6.49 | 90.00 | 16.00 | 1.51741 | 52.41 | R |
| 7 | 35.91 | 6.49 | 70.00 | 17.00 | 1.51741 | 52.41 | L |
| 8 | 22.88 | −4.43 | 25.00 | 20.00 | 1.51741 | 52.41 | L |
| 9 | 22.88 | 15.57 | 0.00 | Var. | 1 | | R |
| Third Optical Element B3 (Negative Lens): | | | | | | | |
| 10 | 22.88 | 31.99 | 0.00 | 2.80 | 1.83480 | 42.72 | R |
| 11 | 22.88 | 34.79 | 0.00 | Var. | 1 | | R |
| 12 | 22.88 | 55.07 | 0.00 | | 1 | | I.P. |

|  | W | M | T |
|---|---|---|---|
| D9 | 16.43 | 11.93 | 6.30 |
| D11 | 20.28 | 34.79 | 70.28 |

| R1 + up to R9: | Zi (M) = Zi (W) − 10.01 |
| | Zi (T) = Zi (W) − 39.88 |
| R10 + up to R11: | Zi (M) = Zi (W) − 14.51 |
| | Zi (T) = Zi (W) − 50.00 |
| R12: | Zi (M) = Zi (W) |
| | Zi (T) = Zi (W) |

Shape of Spherical Surface

R1 Surface: $R_1 = -60.000$
R4 Surface: $R_4 = \infty$
R6 Surface: $R_6 = \infty$
R9 Surface: $R_9 = -35.226$
R10 Surface: $R_{10} = -42.989$
R11 Surface: $R_{11} = 94.318$ Shape of Aspheric Surface:

R2:

$C_{02} = 1.79244e - 02$   $C_{20} = -1.52002e - 04$
$C_{03} = 2.91478e - 04$   $C_{21} = -4.53461e - 05$
$C_{04} = -6.15025e - 06$   $C_{22} = -2.99463e - 06$   $C_{40} = -2.71165e - 07$
$C_{05} = 1.04508e - 06$   $C_{23} = 1.86002e - 07$   $C_{41} = -1.48849e - 08$
$C_{06} = 7.13288e - 08$   $C_{24} = 8.65582e - 09$   $C_{42} = -7.46787e - 09$
$C_{60} = 6.59757e - 09$

R3:

$C_{02} = 6.97073e - 03$   $C_{20} = -9.56998e - 04$
$C_{03} = 6.11813e - 05$   $C_{21} = -4.53546e - 05$
$C_{04} = -4.08851e - 06$   $C_{22} = -1.86658e - 06$   $C_{40} = -3.32310e - 07$
$C_{05} = 3.03036e - 07$   $C_{23} = 6.29105e - 08$   $C_{41} = 2.53765e - 08$
$C_{06} = -1.24765e - 08$   $C_{24} = -3.65030e - 09$   $C_{42} = -1.04366e - 08$
$C_{60} = 1.64066e - 08$

R7:

$C_{02} = -8.55985e - 03$   $C_{20} = -2.21093e - 03$
$C_{03} = 1.12454e - 05$   $C_{21} = -3.52367e - 05$
$C_{04} = -2.60229e - 07$   $C_{22} = -1.96530e - 06$   $C_{40} = 8.68966e - 07$

-continued $C_{05} = -1.79083e - 09$  $C_{23} = -4.59509e - 08$  $C_{41} = -1.05985e - 08$
$C_{06} = -1.47512e - 09$  $C_{24} = -3.24982e - 09$  $C_{42} = -3.41218e - 10$
$C_{60} = -1.94830e - 09$
R8:

$C_{02} = -1.36422e - 02$  $C_{20} = 1.92964e - 03$
$C_{03} = 2.54697e - 04$   $C_{21} = -6.64828e - 05$
$C_{04} = -9.76231e - 06$  $C_{22} = -3.77447e - 06$  $C_{40} = 1.78974e - 07$
$C_{05} = 4.48426e - 07$   $C_{23} = -1.79772e - 07$  $C_{41} = 7.87360e - 10$
$C_{06} = -4.46303e - 03$  $C_{24} = -9.64066e - 09$  $C_{42} = -4.44809e - 09$
$C_{60} = -3.30943e - 09$

The constituent parts of the present embodiment are described successively in the order from the object side. A first optical element B1 is constructed with a first surface R1 (refracting entrance surface of concave form), a second surface R3 and a third surface R3 which are in curved form of inner reflection and decentered, and a fourth surface R4 (refracting exit surface of plane form) in one transparent body. The second surface R2 acts as a convex reflecting surface. A fifth surface R5 is a stop plane. A second optical element B2 is constructed with a sixth surface R6 (refracting entrance surface of plain form), a seventh surface R7 and an eighth surface R8 which are in curved form of inner reflection and decentered, and a ninth surface R9 (refracting exit surface of convex form) in one transparent body. The eighth surface R8 acts as a convex reflecting surface. A third optical element B3 is in the form of a negative lens with a tenth surface R10 and an eleventh surface R11 coaxial to each other. A twelfth surface R12 is the final image plane coincident with the image receiving surface of an image pickup device such as a CCD.

The first optical element B1, the stop R5 and the second optical element B2 have a positive overall refractive power and move in unison, constituting a first lens unit (front lens unit). The third optical element B3 has a negative refractive power, constituting a second lens unit (rear lens unit) which moves during zooming.

Next, the image forming function is described on the assumption that an object is at infinity. A light beam coming from an object first enters the first optical element B1, and the light beam is refracted in passing through the first surface R1, then is reflected from the second surface R2 and the third surface R3 successively, and then is refracted at the fourth surface R4, exiting from the first optical element B1.

The light beam, after having passed through the stop or the fifth surface R5, then enters the second optical element B2, where the light beam is refracted at the sixth surface R6, then is reflected from the seventh surface R7 and the eighth surface R8 successively, and then is refracted at the ninth surface R9, exiting from the second optical element B2.

The light beam then enters the third optical element B3, where the light beam is refracted at the tenth surface R10 and the eleventh surface R11 and exits from the third optical element B3.

The light beam that has exited from the third optical element B3 finally forms an image on the twelfth surface R12.

Each of the first and second optical elements B1 and B2 of the present embodiment is an off-axial optical element in which the entering reference axis and the exiting reference axis are orthogonal to each other.

Next, the function of varying the image magnification by moving the lens units is described. The present embodiment is a 2-unit zoom lens of plus-minus power arrangement in this order from the object side. During zooming from the wide-angle end to the telephoto end, the front lens unit and the rear lens unit both move to the minus direction in the Z axis, while narrowing the separation therebetween.

Figure 43:
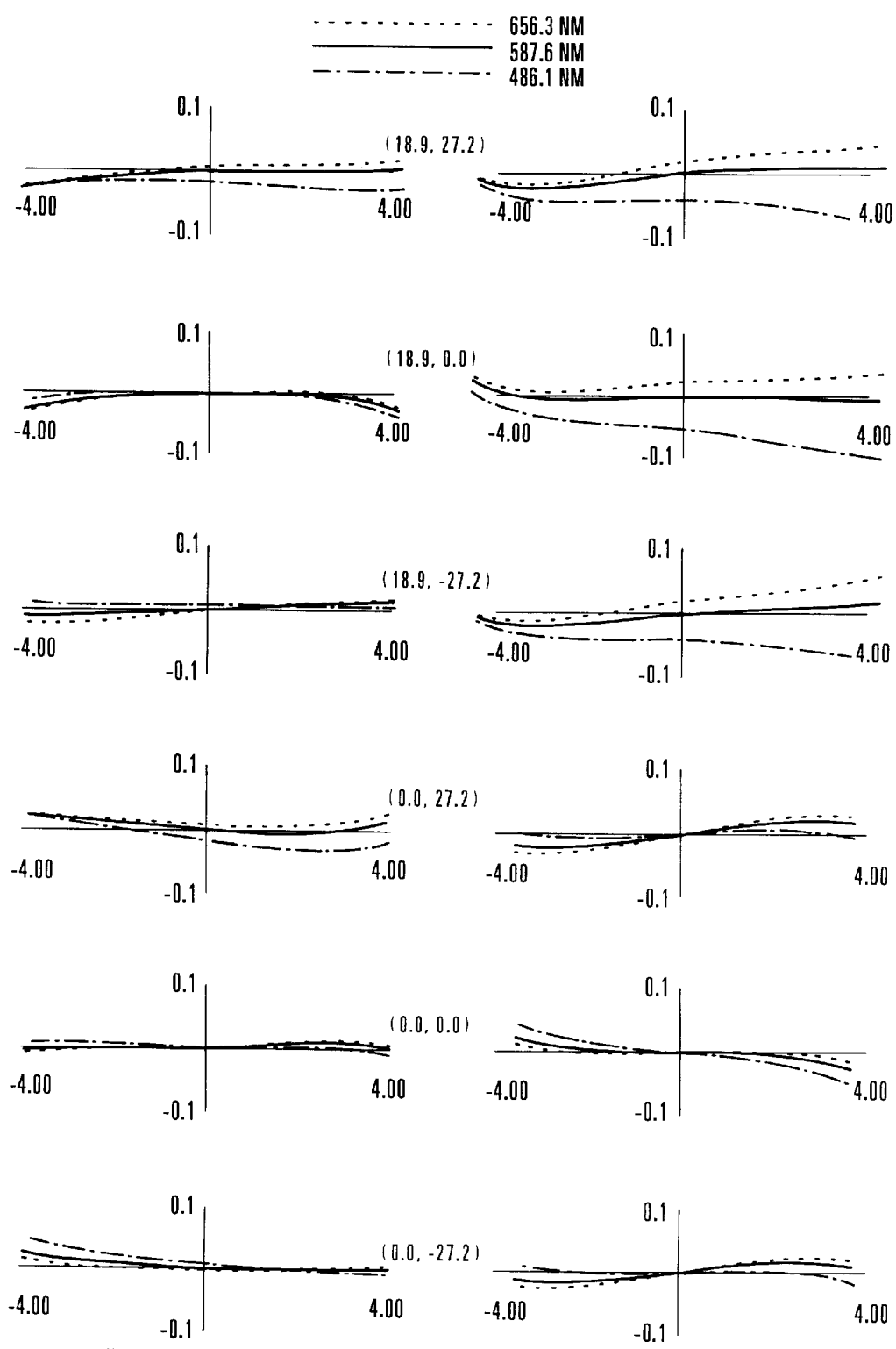
FIG. 43 shows graphs of the lateral aberrations of the embodiment 7 in the wide-angle end.
Figure 44:
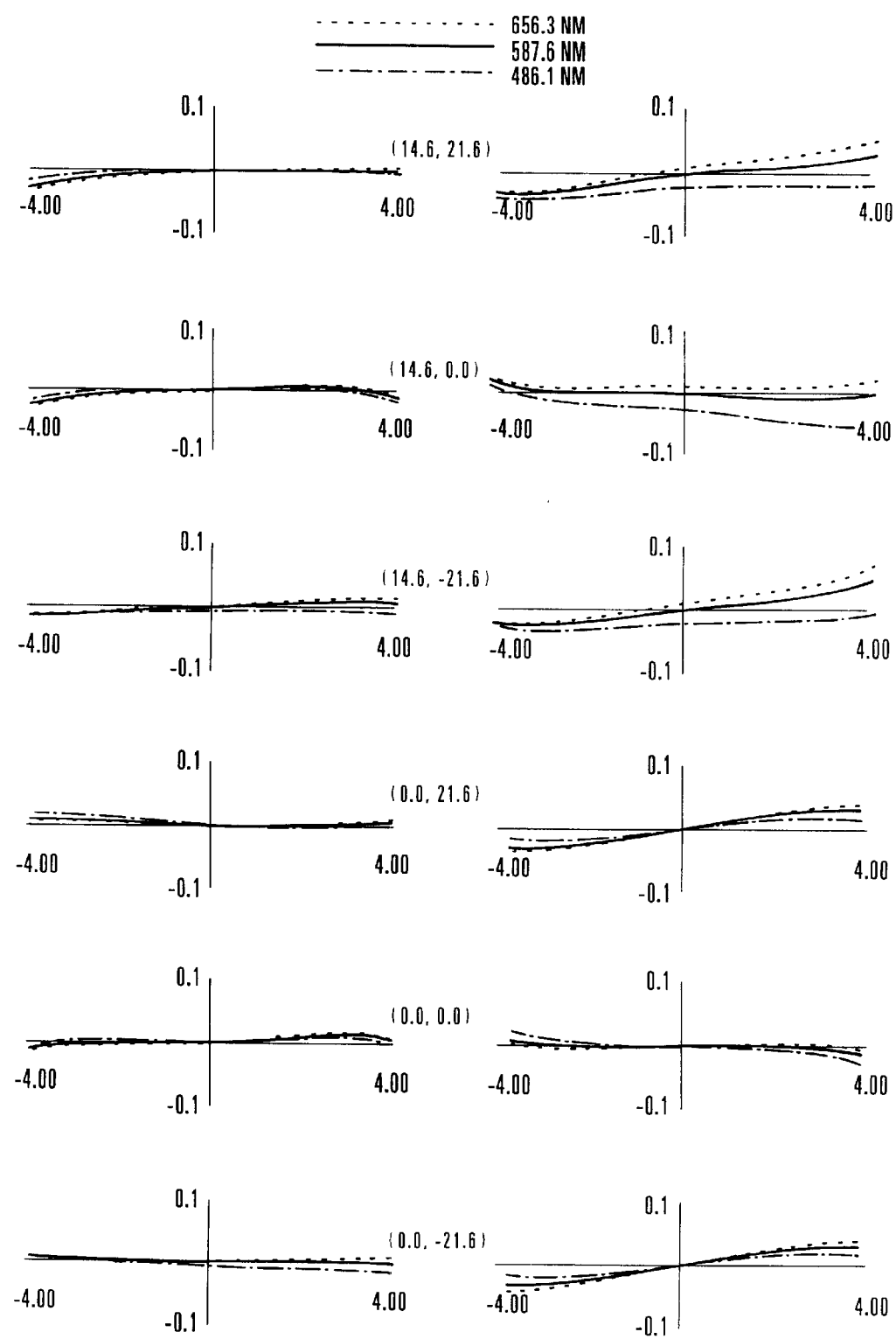
FIG. 44 shows graphs of the lateral aberrations of the embodiment 7 in the middle position.
Figure 45:
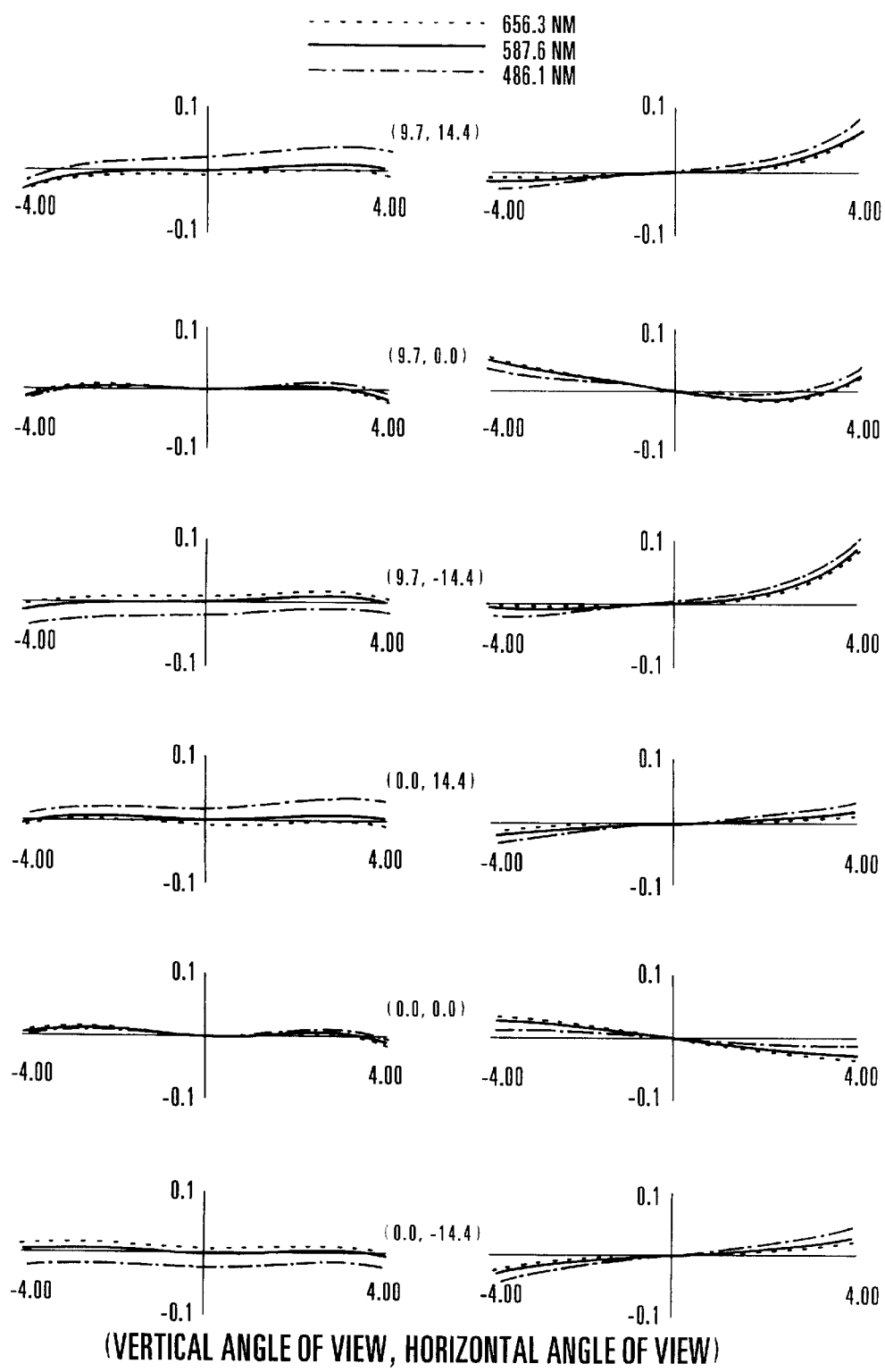
FIG. 45 shows graphs of the lateral aberrations of the embodiment 7 in the telephoto end.

FIGS. 43, 44 and 45 are graphs of the lateral aberrations of such an optical system in the wide-angle end (W), the middle position (M) and the telephoto end (T), respectively. These aberrations are produced by six rays of light which enter the optical system at angles of $(u_Y, u_X)$, $(0, u_X)$, $(-u_Y, u_X)$, $(u_Y, 0)$, $(0,0)$ and $(-u_Y, 0)$ with the Y axis and the X axis. Incidentally, the abscissa of each graph is in the height of incidence of the entering ray on the stop R5 in the Y and X directions.

As can be seen from the graphs, the aberrations are corrected in good balance in each of the zooming positions.

It is premised in the present embodiment that the image size is 36 mm×24 mm.

(Embodiment 8)

Figure 46:
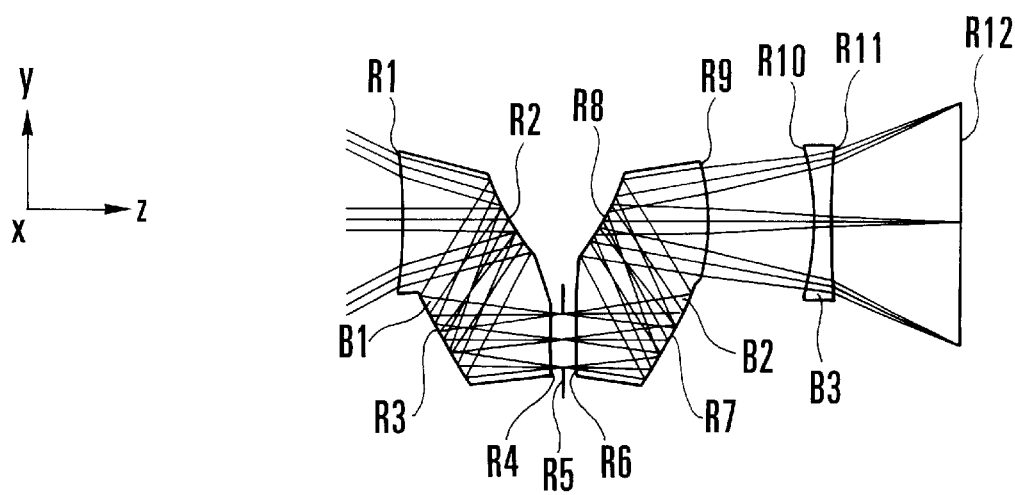
FIG. 46 is a sectional view of the optics of the embodiment 8 in the wide-angle end.
Figure 47:
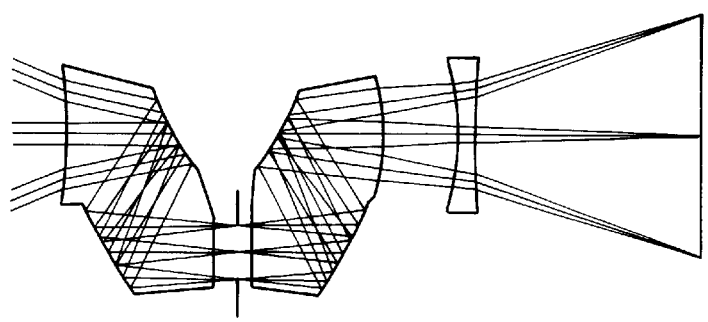
FIG. 47 is a sectional view of the optics of the embodiment 8 in a middle position.
Figure 48:
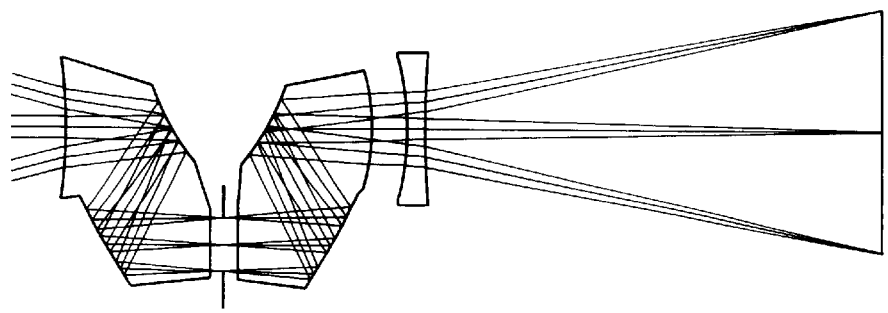
FIG. 48 is a sectional view of the optics of the embodiment 8 in the telephoto end.

A numerical example of the embodiment 8 provides a zoom optical system whose range is about 1.9. FIGS. 46, 47 and 48 are sectional views of the zoom optical system with the optical paths shown in the wide-angle end (W), a middle position (M) and the telephoto end (T), respectively.

|  | W | M | T |
|---|---|---|---|
| Horizontal Semifield | 27.2 | 21.6 | 14.4 |
| Vertical Semifield | 18.9 | 14.6 | 9.7 |
| Aperture Diameter | 8.00 | 8.00 | 8.00 |

| i | Yi | Zi (W) | θi | Di | Ndi | vdi | Sur. |
|---|---|---|---|---|---|---|---|
| First Optical Element B1: | | | | | | | |
| 1 | 0.00 | 0.00 | 0.00 | 16.00 | 1.51741 | 52.41 | R |
| 2 | 0.00 | 16.00 | 30.00 | 20.00 | 1.51741 | 52.41 | L |
| 3 | −17.32 | 6.00 | 30.00 | 16.00 | 1.51741 | 52.41 | L |
| 4 | −17.32 | 22.00 | 0.00 | Var. | 1 | | R |
| 5 | −17.32 | 24.00 | 0.00 | 2.00 | 1 | | Stop |
| Second Optical Element B2: | | | | | | | |
| 6 | −17.32 | 26.00 | 0.00 | 8.00 | 1.51741 | 52.41 | R |
| 7 | −17.32 | 40.00 | −30.00 | 20.00 | 1.51741 | 52.41 | L |
| 8 | 0.00 | 30.00 | −30.00 | 16.00 | 1.51741 | 52.41 | L |
| 9 | 0.00 | 46.00 | 0.00 | Var. | 1 | | R |
| Third Optical Element B3 (Negative Lens): | | | | | | | |
| 10 | 0.00 | 62.06 | 0.00 | 2.80 | 1.83480 | 42.72 | R |
| 11 | 0.00 | 64.86 | 0.00 | Var. | 1 | | R |
| 12 | 0.00 | 84.15 | 0.00 |  | 1 | | I.P. |

|  | W | M | T |
|---|---|---|---|
| D4 | 2.00 | 3.58 | 2.17 |
| D9 | 16.06 | 11.16 | 5.20 |
| D11 | 19.29 | 34.31 | 69.29 |

| R1 + up to R4: | Zi (M) = Zi (W) − 11.70 |
| | Zi (T) = Zi (W) − 39.31 |
| R5 + up to R9: | Zi (M) = Zi (W) − 10.12 |
| | Zi (T) = Zi (W) − 39.14 |
| R10 + up to R11: | Zi (M) = Zi (W) − 15.02 |
| | Zi (T) = Zi (W) − 50.00 |
| R12: | Zi (M) = Zi (W) |
| | Zi (T) = Zi (W) |

Shape of Spherical Surface

R1 Surface: $R_1 = -70.000$
R4 Surface: $R_4 = -1095.034$
R6 Surface: $R_6 = 1694.773$
R9 Surface: $R_9 = -30.368$
R10 Surface: $R_{10} = -39.973$
R11 Surface: $R_{11} = 142.109$ -continued Shape of Aspheric Surface:

R2:

$C_{02} = 1.14912e - 02$  $C_{20} = 6.26525e - 03$
$C_{03} = -4.77249e - 05$  $C_{21} = 8.20929e - 05$
$C_{04} = 4.10346e - 06$  $C_{22} = 1.01293e - 05$  $C_{40} = 8.27507e - 06$
$C_{05} = -1.63961e - 07$  $C_{23} = -7.02287e - 08$  $C_{41} = 1.26644e - 07$
$C_{06} = 2.44243e - 08$  $C_{24} = 3.36166e - 08$  $C_{42} = 4.61438e - 08$
$C_{60} = 1.61883e - 08$

R3:

$C_{02} = 4.89298e - 03$  $C_{20} = 5.68104e - 03$
$C_{03} = 1.68581e - 05$  $C_{21} = 1.25831e - 05$
$C_{04} = -2.55210e - 08$  $C_{22} = 3.13563e - 06$  $C_{40} = 3.87963e - 06$
$C_{05} = 4.20901e - 09$  $C_{23} = -2.17112e - 08$  $C_{41} = -2.44966e - 08$
$C_{06} = 8.49458e - 10$  $C_{24} = 1.24354e - 10$  $C_{42} = 1.62318e - 09$
$C_{60} = 4.20862e - 10$

R7:

$C_{02} = -5.69972e - 03$  $C_{20} = 3.42455e - 04$
$C_{03} = -1.25357e - 05$  $C_{21} = 1.29391e - 05$
$C_{04} = -3.47554e - 07$  $C_{22} = 2.91471e - 06$  $C_{40} = 7.06278e - 06$
$C_{05} = 6.35559e - 10$  $C_{23} = 5.06508e - 08$  $C_{41} = -8.96749e - 08$
$C_{06} = -7.42470e - 10$  $C_{24} = 3.88298e - 10$  $C_{42} = -6.12969e - 09$
$C_{60} = -2.91694e - 09$

R8:

$C_{02} = -7.33488e - 03$  $C_{20} = 2.03905e - 03$
$C_{03} = -9.78920e - 07$  $C_{21} = 1.50942e - 05$
$C_{04} = -2.79340e - 06$  $C_{22} = 2.76445e - 06$  $C_{40} = -2.81122e - 06$
$C_{05} = 5.73943e - 08$  $C_{23} = -6.48211e - 09$  $C_{41} = -3.98591e - 09$
$C_{06} = -6.05073e - 09$  $C_{24} = 1.63517e - 09$  $C_{42} = -1.14923e - 03$
$C_{60} = -6.63843e - 09$

The constituent parts of the present embodiment are described successively in the order from the object side. A first optical element B1 is constructed with a first surface R1 (refracting entrance surface of concave form), a second surface R3 and a third surface R3 which are in curved form of inner reflection and decentered, and a fourth surface R4 (refracting exit surface of almost plane form) in one transparent body. The second surface R2 acts as a convex reflecting surface. A fifth surface R5 is a stop plane. A second optical element B2 is constructed with a sixth surface R6 (refracting entrance surface of almost plane form), a seventh surface R7 and an eighth surface R8 which are in curved form of inner reflection and decentered, and a ninth surface R9 (refracting exit surface of convex form) in one transparent body. The eighth surface R8 acts as a convex reflecting surface. A third optical element B3 is in the form of a negative lens with a tenth surface R10 and an eleventh surface R11 coaxial to each other. A twelfth surface R12 is the final image plane coincident with the image receiving surface of an image pickup device such as a CCD.

The first optical element B1 constitutes a first lens unit. The stop R5 and the second optical element B2 constitute a second lens unit. The third optical element B3 constitutes a third lens unit.

Next, the image forming function is described on the assumption that an object is at infinity. A light beam coming from an object enters the first optical element B1, and the light beam is refracted at the first surface R1, then is reflected from the second surface R2 and the third surface R3 successively, and then is refracted at the fourth surface R4, exiting from the first optical element B1.

The light beam, after having passed through the stop or the fifth surface R5, then enters the second optical element B2, where the light beam is refracted at the sixth surface R6, then is reflected from the seventh surface R7 and the eighth surface R8 successively, and then is refracted at the ninth surface R9, exiting from the second optical element B2.

The light beam then enters the third optical element B3, where the light beam is refracted at the tenth surface R10 and the eleventh surface R11 and exits from the third optical element B3.

The light beam that has exited from the third optical element B3 finally forms an image on the twelfth surface R12.

Each of the first and second optical elements B1 and B2 of the present embodiment is an off-axial optical element in which the entering reference axis and the exiting reference axis are oriented to the same direction.

Next, the function of varying the image magnification by moving the lens units is described. The present embodiment is a 2-unit zoom lens of plus-minus power arrangement in this order from the object side. During zooming from the wide-angle end to the telephoto end, all of the lens units move to the minus direction in the Z axis. During this time, the separation between the first and second lens units once widens and then narrows, and the separation between the second and third lens units narrows.

Figure 49:
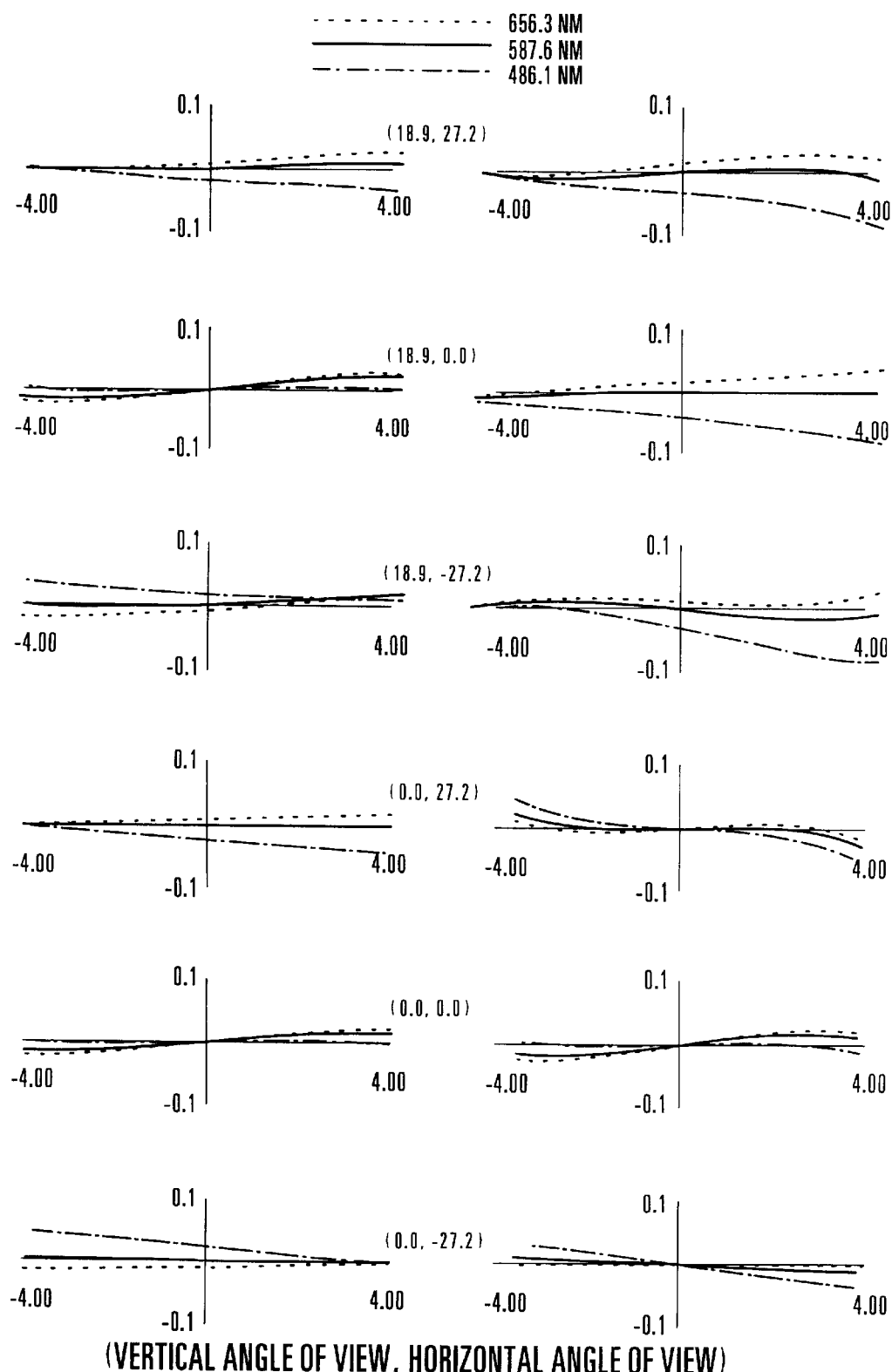
FIG. 49 shows graphs of the lateral aberrations of the embodiment 8 in the wide-angle end.
Figure 50:
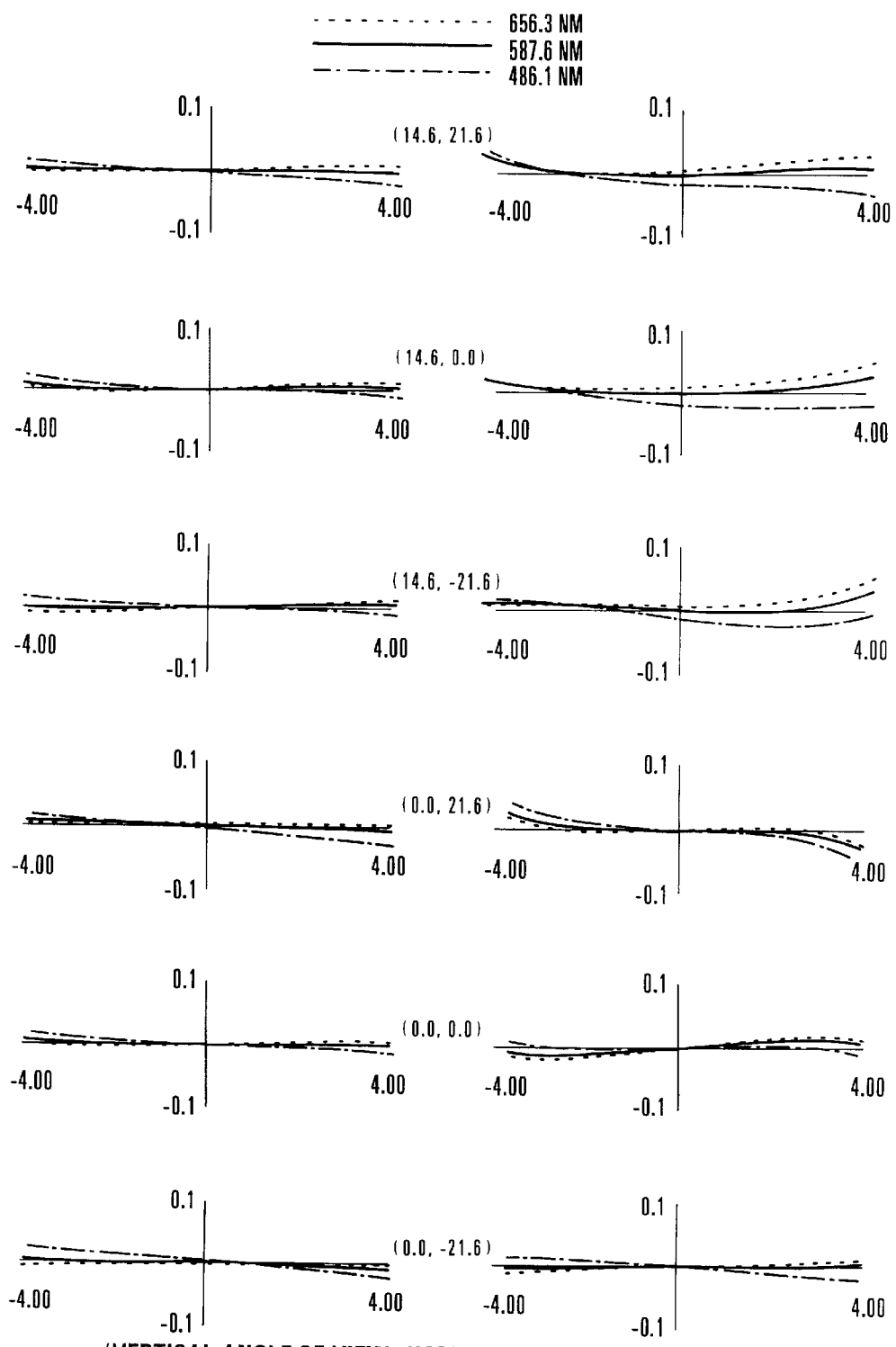
FIG. 50 shows graphs of the lateral aberrations of the embodiment 8 in the middle position.
Figure 51:
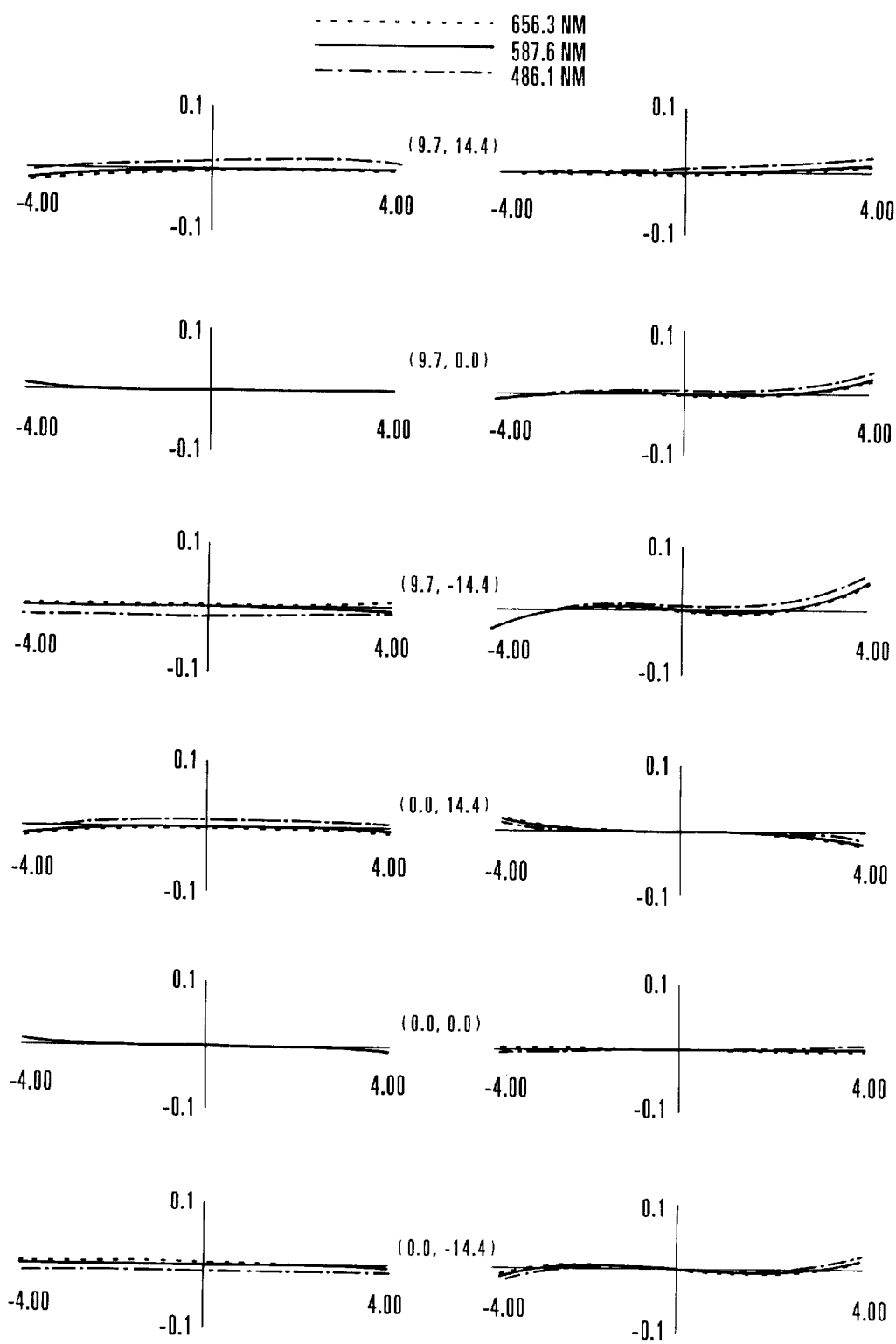
FIG. 51 shows graphs of the lateral aberrations of the embodiment 8 in the telephoto end.

FIGS. 49, 50 and 51 are graphs of the lateral aberrations of such an optical system in the wide-angle end (W), the middle position (M) and the telephoto end (T), respectively. These aberrations are produced by six rays of light which enter the optical system at respective angles of $(u_Y, u_X)$, $(0, u_X)$, $(-u_Y, u_X)$, $(u_Y, 0)$, $(0,0)$ and $(-u_Y, 0)$ with the Y axis and the X axis. The abscissa of each graph is in the height of incidence of the ray on the stop R5 in the Y and X directions.

As can be seen from the graphs, the aberrations are corrected in good balance in each of the zooming positions.

It is premised in the present embodiment that the image size is 36 mm×24 mm.

The foregoing embodiments each have achieved a zoom optical system of which the total number of parts is reduced by using the off-axial optical element and the coaxial optical element that is formed only with the surfaces of rotation symmetry with respect to the ray of reference axis.

Another advantage of the invention arising from the fact that zooming is performed by the off-axial optical element and the coaxial optical element that is formed only with the surfaces of rotation symmetry with respect to the ray of reference axis is that, despite the folding of the optical path to a desired shape in the interior of the optical system, all primary and decentering aberrations are corrected well throughout the entire zooming range. In such a manner, the zoom optical system of a smaller total number of parts and an image pickup apparatus using the same are achieved.

Another advantage arising from the use of the off-axial optical element having a number of reflecting surfaces given proper refractive power and arranged in decentered relation is that the optical path in the interior of the zoom optical system is folded to a desired polygon, thus shortening the total length of that zoom optical system in a certain direction.

Yet another advantage arising from the use of the off-axial optical element having formed in one transparent body two refracting surfaces of proper refractive powers at the entrance and exit and a number of reflecting surfaces of proper refractive powers arranged in decentered relation from the reference axis, is that all primary aberrations and decentering aberrations are corrected well throughout the entire zooming range.

A furthermore advantage arising from the off-axial optical element having two refracting surfaces and a number of reflecting curved or plane surfaces formed in unison in one transparent body, is that the entirety of the zoom optical system is reduced to a minimum in bulk and size, while still permitting the problem of the severe positioning tolerance (setup tolerance) of the reflecting surfaces which has often held in the mirror system.

What is claimed is:

1. An image pickup apparatus, comprising:
   a zoom optical system comprising:
     a plurality of optical units including:
       (1) at least one of
         a) a first optical unit being integrally formed and having two refracting surfaces and a plurality of reflecting surfaces, both of (i) the two refracting surfaces and (ii) the plurality of reflecting surfaces being formed in a transparent body, being arranged such that a light beam enters an inside of the transparent body from one of the two refracting surfaces and, after being successively reflected from the plurality of reflecting surfaces, exits from the other of the two refracting surfaces, wherein at least one of the plurality of reflecting surfaces is a curved surface; and
         b) a second optical unit being integrally formed and having a plurality of surface mirrors integrally formed and decentered relative to one another, being arranged such that an incident light beam exits said second optical unit after being successively reflected from reflecting surfaces of the plurality of surface mirrors, wherein at least one of the reflecting surfaces is a curved surface; and
       (2) a third optical unit having a plurality of coaxial refracting surfaces,
   wherein an image of an object is formed through said plurality of optical units, and zooming is effected by varying relative positions of at least two optical units of said plurality of optical units,
   wherein, for each of said first optical unit and said second optical unit, at least one said curved reflecting surface is decentered relative to a reference axis of said zoom optical system,
   wherein each of said first optical unit and said second optical unit has an aspherical surface of rotational asymmetry, and
   an image pickup medium which receives an image of an object formed by said zoom optical system and converts the image into an electrical signal.

2. An image pickup apparatus according to claim 1, wherein a stop is disposed on a light entrance side of said zoom optical system, or adjacent to a light entrance surface at which a light beam first enters.

3. An image pickup apparatus according to claim 1 or 2, wherein each of said at least two optical units of which relative positions are varied has (i) an entering reference axis and (ii) an exiting reference axis, the exiting reference axis being parallel to the entering reference axis.

4. An image pickup apparatus according to claim 3, wherein said at least two optical units of which relative positions are varied move in parallel to each other on one movement plane.

5. An image pickup apparatus according to claim 3, wherein each of said at least two optical units of which relative positions are varied has (i) an entering reference axis and (ii) an exiting reference axis, the exiting reference axis being oriented to the same direction as the entering reference axis.

6. An image pickup apparatus according to claim 3, wherein one of said at least two optical units of which relative positions are varied has (i) an entering reference axis and (ii)an exiting reference axis, the exiting reference axis being oriented to the same direction as the entering reference axis, and another of said at least two optical units of which relative positions are varied has (i) an entering reference axis and (ii) an exiting reference axis, the exiting reference axis being oriented to an opposite direction as the entering reference axis.

7. An image pickup apparatus according to claim 3, wherein each of said at least two optical units of which relative positions are varied has (i) an entering reference axis and (ii) an exiting reference axis, the exiting reference axis being oriented to an opposite direction as the entering reference axis.

8. An image pickup apparatus according to claim 1, wherein focusing is effected by moving one of said at least two optical units of which relative positions are varied.

9. An image pickup apparatus according to claim 1, wherein said plurality of optical units includes an optical unit other than said at least two optical units of which relative positions are varied, and
   wherein focusing is effected by moving said optical unit other than said at least two optical units of which relative positions are varied.

10. An image pickup apparatus according to claim 1, wherein said zoom optical system forms at least once an object image at an intermediate point in an optical path thereof.

11. An image pickup apparatus according to claim 1, herein all curved reflecting surfaces of the plurality of reflecting surfaces of said first optical unit are formed to anamorphic shapes, or wherein all curved reflecting surfaces of the reflecting surfaces of said second optical unit are formed to anamorphic shapes.

12. An image pickup apparatus according to claim 1, wherein all reference axes of said at least two optical units of which relative positions are varied lie on one plane.

13. An image pickup apparatus according to claim 12, wherein said plurality of optical units includes an optical unit other than said at least two optical unit of which relative positions are varied, and
   wherein at least one reference axis of said optical unit other than said at least two optical units of which relative positions are varied lies on the one plane.

14. An image pickup apparatus according to claim 1, wherein at least one optical unit of said plurality of optical units has a reflecting surface in which a normal line on the reflecting surface at an intersection point of a reference axis with the reflecting surface is inclined with respect to a movement plane on which said at least two optical units of which relative positions are varied move.

15. An image pickup apparatus according to claim 1, further comprising a stop disposed between said plurality of optical units.

16. An image pickup apparatus according to claim 1, wherein said third optical unit is a single lens.

17. An image pickup apparatus according to claim 1, wherein said plurality of optical units includes said first optical unit and said third optical unit, and
   wherein said first optical unit and said third optical unit move during zooming.

18. An image pickup apparatus according to claim 1, wherein said third optical unit comprises a plurality of lenses arranged on a common optical axis.

19. A zoom optical system, comprising:

a plurality of optical units comprising (a) a reflecting optical unit having a plurality of reflecting surfaces, at least one of which is a curved reflecting surface, wherein said reflecting optical unit is first among units of said zoom optical system, which light from an object enters, and (b) a refracting optical unit having a plurality of coaxial refracting surfaces, wherein said zoom optical system performs zooming by varying spacing between said reflecting optical unit and said refracting optical unit, and wherein said zoom optical system has an entrance pupil disposed near an entrance plane of said reflecting optical unit.

* * * * *

UNITED STATES PATENT AND TRADEMARK OFFICE
CERTIFICATE OF CORRECTION

PATENT NO.    : 6,522,475 B2
DATED         : February 18, 2003
INVENTOR(S)   : Takeshi Akiyama et al.

It is certified that error appears in the above-identified patent and that said Letters Patent is hereby corrected as shown below:

Column 4,
Line 24, "looking" should read -- looking at --.

Column 12,
Line 35, "($u_Y$, $u_X$)" (second occurrence) should read -- (-$u_Y$, $u_X$) --.

Column 13,
Line 35, "linage" should read -- Image --.

Column 16,
Line 18, "Stop" should be moved into the next column of the Table.

Column 19,
Line 51, "0.1D" should read -- 0.10 --.
Line 57, "N" should read -- W --.

Column 22,
Line 47, "0.0c" should read -- 0.00 --.

Column 42,
Line 63, "furthermore" should read -- further --.

Signed and Sealed this

Thirtieth Day of September, 2003

JAMES E. ROGAN
*Director of the United States Patent and Trademark Office*